United States Patent
Mithal et al.

(10) Patent No.: US 12,020,303 B1
(45) Date of Patent: Jun. 25, 2024

(54) METHOD AND SYSTEM FOR OFFERING BOOKS FOR PREVIEW IN ECOMMERCE

(71) Applicants: Ashish K. Mithal, Chelmsford, MA (US); Amad Tayebi, Westford, MA (US)

(72) Inventors: Ashish K. Mithal, Chelmsford, MA (US); Amad Tayebi, Westford, MA (US)

(*) Notice: Subject to any disclaimer, the term of this patent is extended or adjusted under 35 U.S.C. 154(b) by 0 days.

(21) Appl. No.: 18/486,922

(22) Filed: Oct. 13, 2023

Related U.S. Application Data

(60) Provisional application No. 63/422,392, filed on Nov. 3, 2022.

(51) Int. Cl.
 G06Q 30/00 (2023.01)
 G06Q 30/0272 (2023.01)
 G06Q 30/0601 (2023.01)

(52) U.S. Cl.
 CPC ..... G06Q 30/0603 (2013.01); G06Q 30/0272 (2013.01)

(58) Field of Classification Search
 CPC .............. G06Q 30/0603; G06Q 30/0272
 See application file for complete search history.

(56) References Cited

U.S. PATENT DOCUMENTS

| | | | | |
|---|---|---|---|---|
| 7,752,460 B2* | 7/2010 | Shibuya | ............... | G06F 21/10 726/28 |
| 10,210,554 B2* | 2/2019 | Linevsky | ........... | G06Q 30/0633 |
| 2007/0038669 A1* | 2/2007 | Davis | ............... | G06F 16/41 |
| 2007/0192294 A1* | 8/2007 | Ramer | ............... | G06Q 30/02 |
| 2007/0204115 A1* | 8/2007 | Abramson | ............... | H04L 67/06 711/154 |
| 2014/0193047 A1* | 7/2014 | Grosz | ............... | G06Q 10/10 382/118 |
| 2016/0012499 A1* | 1/2016 | Linevsky | ........... | G06Q 30/0633 705/27.1 |

(Continued)

OTHER PUBLICATIONS

A. Elmahdy and S. Mohajer, "On the Fundamental Limits of Coded Data Shuffling for Distributed Machine Learning," in IEEE Transactions on Information Theory, vol. 66, No. 5, pp. 3098-3131, May 2020, doi: 10.1109/TIT.2020.2964547. (Year: 2020).*

(Continued)

*Primary Examiner* — Sun M Li
(74) *Attorney, Agent, or Firm* — Ashish K. Mithal

(57) ABSTRACT

A method of providing a preview version of a book over a computer network, the method comprising: apportioning the book into a plurality of content segments; modifying the book by rearranging at least a subset of the plurality of content segments to create a shuffled configuration of the book; initiating a preview session and displaying at least a first content segment from said shuffled configuration of the book in a preview window; displaying a next group of content segments from said shuffled configuration of the book during said preview session upon receiving a prompt from user to continue browsing; and controlling the availability of said shuffled configuration of the book during said preview session. A user may further customize preview version by providing a search input or by selecting a page range. Shuffled preview version may include one or more advertisements.

48 Claims, 36 Drawing Sheets

(56) References Cited

U.S. PATENT DOCUMENTS

2017/0236039 A1* 8/2017 Funderburg .......... G06F 3/1285
358/1.18
2020/0264844 A1* 8/2020 Lindström ................ G06F 7/76

OTHER PUBLICATIONS

McFee et al."The Natural Language of Playlists", 2011, appear in 12th International Society for Music Information Retrieval Conference (ISMIR 2011). (Year: 2011).*

Sequential Modelling with Applications to Music Recommendation, Fact-Checking, and Speed Reading, by Christian Hansen, PhD Thesis, Univ of Copenhagen, Faculty of Science, arXiv:2109.06736v1 [cs. IR] for this version), https://doi.org/10.48550/arXiv.2109.06736. Submitted on Sep. 11, 2021. (Year: 2021).*

"Using Deep learning methods for generation of a personalized list of shuffled songs", by Rushin Gindra, Srushti Kotak, Asmita Natekar, Grishma Sharma, arXiv:1712.06076, [Submitted on Dec. 17, 2017 (v1), last revised Sep. 1, 2019 (this version, v2)] (Year: 2017).*

H. Kim, H. Kim and J. W. Yoon, "A New Technique Using a Shuffling Method to Protect Confidential Documents from Shoulder Surfers," 2015 1st International Conference on Software Security and Assurance (ICSSA), Suwon, Korea (South), 2015, pp. 7-12, doi: 10.1109/ICSSA.2015.012. (Year: 2015).*

* cited by examiner

203 — Page-array showing an original or sequential configuration of book 200

| | 1' | 2' | 3' | 4' | 5' | 6' | 7' | 8' | 9' | |
|---|---|---|---|---|---|---|---|---|---|---|
| | 1 | 2 | 3 | 4 | 5 | 6 | 7 | 8 | 9 | r1 |
| | 10' | 11' | 12' | 13' | 14' | 15' | 16' | 17' | 18' | |
| 205 | 10 | 11 | 12 | 13 | 14 | 15 | 16 | 17 | 18 | r2 |
| | 19' | 20' | 21' | 22' | 23' | 24' | 25' | 26' | 27' | |
| | 19 | 20 | 21 | 22 | 23 | 24 | 25 | 26 | 27 | r3 |
| | 28' | 29' | 30' | 31' | 32' | 33' | 34' | 35' | 36' | |
| | 28 | 29 | 30 | 31 | 32 | 33 | 34 | 35 | 36 | r4 |
| | 37' | 38' | 39' | 40' | 41' | 42' | 43' | 44' | 45' | |
| | 37 | 38 | 39 | 40 | 41 | 42 | 43 | 44 | 45 | r5 |
| | 46' | 47' | 48' | 49' | 50' | 51' | 52' | 53' | 54' | |
| | 46 | 47 | 48 | 49 | 50 | 51 | 52 | 53 | 54 | r6 |
| | 55' | 56' | 57' | 58' | 59' | 60' | 61' | 62' | 63' | |
| | 55 | 56 | 57 | 58 | 59 | 60 | 61 | 62 | 63 | r7 |
| | 64' | 65' | 66' | 67' | 68' | 69' | 70' | 71' | 72' | |
| | 64 | 65 | 66 | 67 | 68 | 69 | 70 | 71 | 72 | r8 |
| | 73' | 74' | 75' | 76' | 77' | 78' | 79' | 80' | 81' | |
| | 73 | 74 | 75 | 76 | 77 | 78 | 79 | 80 | 81 | r9 |
| | 82' | 83' | 84' | 85' | 86' | 87' | 88' | 89' | 90' | |
| | 82 | 83 | 84 | 85 | 86 | 87 | 88 | 89 | 90 | r10 |
| | 91' | 92' | 93' | 94' | 95' | 96' | 97' | 98' | 99' | |
| | 91 | 92 | 93 | 94 | 95 | 96 | 97 | 98 | 99 | r11 |
| | 100' | 101' | 102' | 103' | 104' | 105' | 106' | 107' | 108' | |
| | 100 | 101 | 102 | 103 | 104 | 105 | 106 | 107 | 108 | r12 |

FIG. 1

Segment-table showing an original configuration of book 200 (pages *1–108*)

204

| Display Order | Content Segments | Page Batch | Pages/ Segment |
|---|---|---|---|
| 1 | S1 | {1–9} | 9 |
| 2 | S2 | {10–18} | 9 |
| 3 | S3 | {19–27} | 9 |
| 4 | S4 | {28–36} | 9 |
| 5 | S5 | {37–45} | 9 |
| 6 | S6 | {46–54} | 9 |
| 7 | S7 | {55–63} | 9 |
| 8 | S8 | {64–72} | 9 |
| 9 | S9 | {73–81} | 9 |
| 10 | S10 | {82–90} | 9 |
| 11 | S11 | {91–99} | 9 |
| 12 | S12 | {100–108} | 9 |

207 — Page-array showing a shuffled configuration of book 200

| 1' | 2' | 3' | 4' | 5' | 6' | 7' | 8' | 9' | |
|---|---|---|---|---|---|---|---|---|---|
| 10 | 11 | 12 | 13 | 14 | 15 | 16 | 17 | 18 | r1 |

205

| 10' | 11' | 12' | 13' | 14' | 15' | 16' | 17' | 18' | |
|---|---|---|---|---|---|---|---|---|---|
| 1 | 2 | 3 | 4 | 5 | 6 | 7 | 8 | 9 | r2 |

| 19' | 20' | 21' | 22' | 23' | 24' | 25' | 26' | 27' | |
|---|---|---|---|---|---|---|---|---|---|
| 28 | 29 | 30 | 31 | 32 | 33 | 34 | 35 | 36 | r3 |

| 28' | 29' | 30' | 31' | 32' | 33' | 34' | 35' | 36' | |
|---|---|---|---|---|---|---|---|---|---|
| 19 | 20 | 21 | 22 | 23 | 24 | 25 | 26 | 27 | r4 |

| 37' | 38' | 39' | 40' | 41' | 42' | 43' | 44' | 45' | |
|---|---|---|---|---|---|---|---|---|---|
| 46 | 47 | 48 | 49 | 50 | 51 | 52 | 53 | 54 | r5 |

| 46' | 47' | 48' | 49' | 50' | 51' | 52' | 53' | 54' | |
|---|---|---|---|---|---|---|---|---|---|
| 37 | 38 | 39 | 40 | 41 | 42 | 43 | 44 | 45 | r6 |

| 55' | 56' | 57' | 58' | 59' | 60' | 61' | 62' | 63' | |
|---|---|---|---|---|---|---|---|---|---|
| 64 | 65 | 66 | 67 | 68 | 69 | 70 | 71 | 72 | r7 |

| 64' | 65' | 66' | 67' | 68' | 69' | 70' | 71' | 72' | |
|---|---|---|---|---|---|---|---|---|---|
| 55 | 56 | 57 | 58 | 59 | 60 | 61 | 62 | 63 | r8 |

| 73' | 74' | 75' | 76' | 77' | 78' | 79' | 80' | 81' | |
|---|---|---|---|---|---|---|---|---|---|
| 82 | 83 | 84 | 85 | 86 | 87 | 88 | 89 | 90 | r9 |

| 82' | 83' | 84' | 85' | 86' | 87' | 88' | 89' | 90' | |
|---|---|---|---|---|---|---|---|---|---|
| 73 | 74 | 75 | 76 | 77 | 78 | 79 | 80 | 81 | r10 |

| 91' | 92' | 93' | 94' | 95' | 96' | 97' | 98' | 99' | |
|---|---|---|---|---|---|---|---|---|---|
| 100 | 101 | 102 | 103 | 104 | 105 | 106 | 107 | 108 | r11 |

| 100' | 101' | 102' | 103' | 104' | 105' | 106' | 107' | 108' | |
|---|---|---|---|---|---|---|---|---|---|
| 91 | 92 | 93 | 94 | 95 | 96 | 97 | 98 | 99 | r12 |

FIG. 3

Segment-table showing a shuffled configuration of book 200 (pages *1–108*)

208

| Display Order | Content Segments | Page Batch | Pages/ Segment |
|---|---|---|---|
| 1 | S2 | {10–18} | 9 |
| 2 | S1 | {1–9} | 9 |
| 3 | S4 | {28–36} | 9 |
| 4 | S3 | {19–27} | 9 |
| 5 | S6 | {46–54} | 9 |
| 6 | S5 | {37–45} | 9 |
| 7 | S8 | {64–72} | 9 |
| 8 | S7 | {55–63} | 9 |
| 9 | S10 | {82–90} | 9 |
| 10 | S9 | {73–81} | 9 |
| 11 | S12 | {100–108} | 9 |
| 12 | S11 | {91–99} | 9 |

FIG. 4

Segment-table showing a random shuffled configuration of book 200 (pages 1–108)

214

| Display Order | Content Segments | Page Batch | Pages/Segment |
|---|---|---|---|
| 1 | S11 | {91–99} | 9 |
| 2 | S3 | {19–27} | 9 |
| 3 | S12 | {100–108} | 9 |
| 4 | S10 | {82–90} | 9 |
| 5 | S9 | {73–81} | 9 |
| 6 | S1 | {1–9} | 9 |
| 7 | S5 | {37–45} | 9 |
| 8 | S4 | {28–36} | 9 |
| 9 | S7 | {55–63} | 9 |
| 10 | S8 | {64–72} | 9 |
| 11 | S2 | {10–18} | 9 |
| 12 | S6 | {46–54} | 9 |

210 — Display Order
220 — Content Segments
230 — Page Batch
240 — Pages/Segment

FIG. 5

216 — Segment-table showing a shuffled configuration of selected content segments of book 200 (pages *1–108*)

| Display Order | Content Segments | Page Batch | Pages/Segment |
|---|---|---|---|
| 1 | S1 | {1–9} | 9 |
| 2 | S7 | {55–63} | 9 |
| 3 | S10 | {82–90} | 9 |
| 4 | S6 | {46–54} | 9 |
| 5 | S8 | {64–72} | 9 |
| 6 | S4 | {28–36} | 9 |
| 7 | S12 | {100–108} | 9 |
| 8 | S3 | {19–27} | 9 |
| 9 | S11 | {91–99} | 9 |
| 10 | S9 | {73–81} | 9 |
| 11 | S5 | {37–45} | 9 |
| 12 | S2 | {10–18} | 9 |

FIG. 6

Segment-table showing a shuffled configuration of book 200 (pages *1–108*)

218

| Display Order (210) | Content Segments (220) | Page Batch (230) | Pages/ Segment (240) |
|---|---|---|---|
| 1 | S1 | {SHFL (1–9)} | 9 |
| 2 | S2 | {SHFL (10–18)} | 9 |
| 3 | S3 | {SHFL (19–27)} | 9 |
| 4 | S4 | {SHFL (28–36)} | 9 |
| 5 | S5 | {SHFL (37–45)} | 9 |
| 6 | S6 | {SHFL (46–54)} | 9 |
| 7 | S7 | {SHFL (55–63)} | 9 |
| 8 | S8 | {SHFL (64–72)} | 9 |
| 9 | S9 | {SHFL (73–81)} | 9 |
| 10 | S10 | {SHFL (82–90)} | 9 |
| 11 | S11 | {SHFL (91–99)} | 9 |
| 12 | S12 | {SHFL (100–108)} | 9 |

FIG. 7

219 — Page array showing a shuffled configuration of book 200 according to segment-table 218

| 1' | 2' | 3' | 4' | 5' | 6' | 7' | 8' | 9' | |
|---|---|---|---|---|---|---|---|---|---|
| 5 | 2 | 1 | 3 | 9 | 7 | 6 | 4 | 8 | r1 |

205

| 10' | 11' | 12' | 13' | 14' | 15' | 16' | 17' | 18' | |
|---|---|---|---|---|---|---|---|---|---|
| 11 | 15 | 13 | 18 | 17 | 16 | 10 | 14 | 12 | r2 |

| 19' | 20' | 21' | 22' | 23' | 24' | 25' | 26' | 27' | |
|---|---|---|---|---|---|---|---|---|---|
| 25 | 20 | 22 | 26 | 19 | 24 | 21 | 27 | 23 | r3 |

| 28' | 29' | 30' | 31' | 32' | 33' | 34' | 35' | 36' | |
|---|---|---|---|---|---|---|---|---|---|
| 32 | 31 | 33 | 28 | 36 | 35 | 34 | 29 | 30 | r4 |

| 37' | 38' | 39' | 40' | 41' | 42' | 43' | 44' | 45' | |
|---|---|---|---|---|---|---|---|---|---|
| 39 | 43 | 44 | 37 | 45 | 40 | 42 | 41 | 38 | r5 |

| 46' | 47' | 48' | 49' | 50' | 51' | 52' | 53' | 54' | |
|---|---|---|---|---|---|---|---|---|---|
| 51 | 48 | 49 | 47 | 54 | 50 | 53 | 46 | 52 | r6 |

| 55' | 56' | 57' | 58' | 59' | 60' | 61' | 62' | 63' | |
|---|---|---|---|---|---|---|---|---|---|
| 62 | 63 | 55 | 57 | 60 | 61 | 59 | 58 | 56 | r7 |

| 64' | 65' | 66' | 67' | 68' | 69' | 70' | 71' | 72' | |
|---|---|---|---|---|---|---|---|---|---|
| 71 | 65 | 64 | 66 | 70 | 67 | 72 | 68 | 69 | r8 |

| 73' | 74' | 75' | 76' | 77' | 78' | 79' | 80' | 81' | |
|---|---|---|---|---|---|---|---|---|---|
| 77 | 81 | 75 | 76 | 74 | 78 | 73 | 80 | 79 | r9 |

| 82' | 83' | 84' | 85' | 86' | 87' | 88' | 89' | 90' | |
|---|---|---|---|---|---|---|---|---|---|
| 85 | 87 | 88 | 90 | 84 | 83 | 82 | 86 | 89 | r10 |

| 91' | 92' | 93' | 94' | 95' | 96' | 97' | 98' | 99' | |
|---|---|---|---|---|---|---|---|---|---|
| 97 | 94 | 93 | 92 | 96 | 99 | 91 | 95 | 98 | r11 |

| 100' | 101' | 102' | 103' | 104' | 105' | 106' | 107' | 108' | |
|---|---|---|---|---|---|---|---|---|---|
| 103 | 105 | 100 | 104 | 108 | 107 | 106 | 101 | 102 | r12 |

FIG. 8

Segment-table showing a shuffled configuration of book 200 (pages *1–108*)

222

| Display Order | Content Segments | Page Batch | Pages/ Segment |
|---|---|---|---|
| 1 | S1 | {1–9} | 9 |
| 2 | S2 | {10–18} | 9 |
| 3 | S3 | {SHFL (19–27)} | 9 |
| 4 | S11 | {91–99} | 9 |
| 5 | S9 | {73–81} | 9 |
| 6 | S5 | {37–45} | 9 |
| 7 | S12 | {100–108} | 9 |
| 8 | S6 | {46–54} | 9 |
| 9 | S8 | {64–72} | 9 |
| 10 | S4 | {28–36} | 9 |
| 11 | S10 | {SHFL (82–90)} | 9 |
| 12 | S7 | {SHFL (55–63)} | 9 |

FIG. 9

223 — Page array showing a shuffled configuration of book 200 according to segment-table 222

| 1' | 2' | 3' | 4' | 5' | 6' | 7' | 8' | 9' | |
|---|---|---|---|---|---|---|---|---|---|
| 1 | 2 | 3 | 4 | 5 | 6 | 7 | 8 | 9 | r1 |

205

| 10' | 11' | 12' | 13' | 14' | 15' | 16' | 17' | 18' | |
|---|---|---|---|---|---|---|---|---|---|
| 10 | 11 | 12 | 13 | 14 | 15 | 16 | 17 | 18 | r2 |

| 19' | 20' | 21' | 22' | 23' | 24' | 25' | 26' | 27' | |
|---|---|---|---|---|---|---|---|---|---|
| 22 | 25 | 20 | 26 | 19 | 24 | 21 | 27 | 23 | r3 |

| 28' | 29' | 30' | 31' | 32' | 33' | 34' | 35' | 36' | |
|---|---|---|---|---|---|---|---|---|---|
| 91 | 92 | 93 | 94 | 95 | 96 | 97 | 98 | 99 | r4 |

| 37' | 38' | 39' | 40' | 41' | 42' | 43' | 44' | 45' | |
|---|---|---|---|---|---|---|---|---|---|
| 73 | 74 | 75 | 76 | 77 | 78 | 79 | 80 | 81 | r5 |

| 46' | 47' | 48' | 49' | 50' | 51' | 52' | 53' | 54' | |
|---|---|---|---|---|---|---|---|---|---|
| 37 | 38 | 39 | 40 | 41 | 42 | 43 | 44 | 45 | r6 |

| 55' | 56' | 57' | 58' | 59' | 60' | 61' | 62' | 63' | |
|---|---|---|---|---|---|---|---|---|---|
| 100 | 101 | 102 | 103 | 104 | 105 | 106 | 107 | 108 | r7 |

| 64' | 65' | 66' | 67' | 68' | 69' | 70' | 71' | 72' | |
|---|---|---|---|---|---|---|---|---|---|
| 46 | 47 | 48 | 49 | 50 | 51 | 52 | 53 | 54 | r8 |

| 73' | 74' | 75' | 76' | 77' | 78' | 79' | 80' | 81' | |
|---|---|---|---|---|---|---|---|---|---|
| 64 | 65 | 66 | 67 | 68 | 69 | 70 | 71 | 72 | r9 |

| 82' | 83' | 84' | 85' | 86' | 87' | 88' | 89' | 90' | |
|---|---|---|---|---|---|---|---|---|---|
| 28 | 29 | 30 | 31 | 32 | 33 | 34 | 35 | 36 | r10 |

| 91' | 92' | 93' | 94' | 95' | 96' | 97' | 98' | 99' | |
|---|---|---|---|---|---|---|---|---|---|
| 85 | 88 | 84 | 83 | 87 | 90 | 82 | 86 | 89 | r11 |

| 100' | 101' | 102' | 103' | 104' | 105' | 106' | 107' | 108' | |
|---|---|---|---|---|---|---|---|---|---|
| 59 | 63 | 55 | 57 | 60 | 62 | 61 | 56 | 58 | r12 |

FIG. 10

Segment-table showing an original configuration of book 200 with 4-pages long content segments.

224

| Display Order | Content Segments | Page Batch | Pages/ Segment |
|---|---|---|---|
| 1 | T1 | {1–4} | 4 |
| 2 | T2 | {5–8} | 4 |
| 3 | T3 | {10–12} | 4 |
| 4 | T4 | {13–16} | 4 |
| 5 | T5 | {17–20} | 4 |
| 6 | T6 | {21–24} | 4 |
| 7 | T7 | {25–28} | 4 |
| 8 | T8 | {29–32} | 4 |
| 9 | T9 | {33–36} | 4 |
| 10 | T10 | {37–40} | 4 |
| 11 | T11 | {41–44} | 4 |
| 12 | T12 | {45–48} | 4 |
| 13 | T13 | {49–52} | 4 |
| 14 | T14 | {53–56} | 4 |
| 15 | T15 | {57–60} | 4 |
| 16 | T16 | {61–64} | 4 |
| 17 | T17 | {65–68} | 4 |
| 18 | T18 | {69–72} | 4 |
| 19 | T19 | {73–76} | 4 |
| 20 | T20 | {77–80} | 4 |
| 21 | T21 | {81–84} | 4 |
| 22 | T22 | {85–88} | 4 |
| 23 | T23 | {89–92} | 4 |
| 24 | T24 | {93–96} | 4 |
| 25 | T25 | {97–100} | 4 |
| 26 | T26 | {101–104} | 4 |
| 27 | T27 | {105–108} | 4 |

Segment-table showing an original configuration of book 200 with 27 content segments of various page lengths.

| Display Order | Content Segments | Page Batch | Pages/ Segment |
|---|---|---|---|
| 1 | U1 | {1–5} | 5 |
| 2 | U2 | {6–9} | 4 |
| 3 | U3 | {10–12} | 3 |
| 4 | U4 | {13–17} | 5 |
| 5 | U5 | {18–21} | 4 |
| 6 | U6 | {22–24} | 3 |
| 7 | U7 | {25–29} | 5 |
| 8 | U8 | {30–33} | 4 |
| 9 | U9 | {34–36} | 3 |
| 10 | U10 | {37–41} | 5 |
| 11 | U11 | {42–45} | 4 |
| 12 | U12 | {46–48} | 3 |
| 13 | U13 | {49–53} | 5 |
| 14 | U14 | {54–57} | 4 |
| 15 | U15 | {58–60} | 3 |
| 16 | U16 | {61–65} | 5 |
| 17 | U17 | {66–69} | 4 |
| 18 | U18 | {70–72} | 3 |
| 19 | U19 | {73–77} | 5 |
| 20 | U20 | {78–81} | 4 |
| 21 | U21 | {82–84} | 3 |
| 22 | U22 | {85–89} | 5 |
| 23 | U23 | {90–93} | 4 |
| 24 | U24 | {94–96} | 3 |
| 25 | U25 | {97–101} | 5 |
| 26 | U26 | {102–105} | 4 |
| 27 | U27 | {105–108} | 3 |

Segment-table showing an original configuration of book 200 with 24 content segments of various page lengths.

| Display Order (210) | Content Segments (220) | Page Batch (230) | Pages/Segment (240) |
|---|---|---|---|
| 1 | Q1 | {1–7} | 7 |
| 2 | Q2 | {8–12} | 5 |
| 3 | Q3 | {13–16} | 4 |
| 4 | Q4 | {17–20} | 4 |
| 5 | Q5 | {21–24} | 4 |
| 6 | Q6 | {25–27} | 3 |
| 7 | Q7 | {28–30} | 3 |
| 8 | Q8 | {31–36} | 6 |
| 9 | Q9 | {37–41} | 5 |
| 10 | Q10 | {42–46} | 5 |
| 11 | Q11 | {47–48} | 2 |
| 12 | Q12 | {49–56} | 8 |
| 13 | Q13 | {57–59} | 3 |
| 14 | Q14 | {60} | 1 |
| 15 | Q15 | {61–69} | 9 |
| 16 | Q16 | {70–72} | 3 |
| 17 | Q17 | {73–79} | 7 |
| 18 | Q18 | {80–84} | 5 |
| 19 | Q19 | {85–90} | 6 |
| 20 | Q20 | {91–93} | 3 |
| 21 | Q21 | {94–96} | 3 |
| 22 | Q22 | {97–101} | 5 |
| 23 | Q23 | {102–106} | 5 |
| 24 | Q24 | {107–108} | 2 |

FIG. 13

Segment-table showing a shuffled configuration of book 200 with variable length content segments (pages *1–108*)

232

| Display Order | Content Segments | Page Batch | Pages/Segment |
|---|---|---|---|
| 1 | Q6 | {25–27} | 3 |
| 2 | Q23 | {102–106} | 5 |
| 3 | Q16 | {70–72} | 3 |
| 4 | Q24 | {107–108} | 2 |
| 5 | Q1 | {1–7} | 7 |
| 6 | Q17 | {73–79} | 7 |
| 7 | Q22 | {97–101} | 5 |
| 8 | Q14 | {60} | 1 |
| 9 | Q7 | {28–30} | 3 |
| 10 | Q9 | {37–41} | 5 |
| 11 | Q3 | {13–16} | 4 |
| 12 | Q8 | {31–36} | 6 |
| 13 | Q19 | {85–90} | 6 |
| 14 | Q11 | {47–48} | 2 |
| 15 | Q2 | {8–12} | 5 |
| 16 | Q5 | {21–24} | 4 |
| 17 | Q12 | {49–56} | 8 |
| 18 | Q4 | {17–20} | 4 |
| 19 | Q21 | {94–96} | 3 |
| 20 | Q15 | {61–69} | 9 |
| 21 | Q10 | {42–46} | 5 |
| 22 | Q20 | {91–93} | 3 |
| 23 | Q13 | {57–59} | 3 |
| 24 | Q18 | {80–84} | 5 |

FIG. 14

Segment-table showing a shuffled configuration of book 200 with variable length content segments (pages *1–108*)

| Display Order | Content Segments | Page Batch | Pages/ Segment |
|---|---|---|---|
| 1 | Q1 | {1–7} | 7 |
| 2 | Q2 | {8–12} | 5 |
| 3 | Q3 | {13–16} | 4 |
| 4 | Q21 | {94–96} | 3 |
| 5 | Q15 | {61–69} | 9 |
| 6 | Q9 | {37–41} | 5 |
| 7 | Q5 | {21–24} | 4 |
| 8 | Q19 | {85–90} | 6 |
| 9 | Q17 | {73–79} | 7 |
| 10 | Q4 | {17–20} | 4 |
| 11 | Q24 | {107–108} | 2 |
| 12 | Q11 | {47–48} | 2 |
| 13 | Q18 | {80–84} | 5 |
| 14 | Q20 | {91–93} | 3 |
| 15 | Q12 | {49–56} | 8 |
| 16 | Q14 | {60} | 1 |
| 17 | Q10 | {42–46} | 5 |
| 18 | Q8 | {31–36} | 6 |
| 19 | Q23 | {102–106} | 5 |
| 20 | Q16 | {70–72} | 3 |
| 21 | Q13 | {57–59} | 3 |
| 22 | Q22 | {97–101} | 5 |
| 23 | Q7 | {28–30} | 3 |
| 24 | Q6 | {25–27} | 3 |

FIG. 15

Segment-table showing a shuffled configuration of book 200 with variable length content segments (pages *1–108*)

236

| Display Order | Content Segments | Page Batch | Pages/ Segment |
|---|---|---|---|
| 1 | Q1 | {1–7} | 7 |
| 2 | Q3 | {13–16} | 4 |
| 3 | Q5 | {21–24} | 4 |
| 4 | Q7 | {28–30} | 3 |
| 5 | Q9 | {37–41} | 5 |
| 6 | Q11 | {47–48} | 2 |
| 7 | Q13 | {57–59} | 3 |
| 8 | Q15 | {61–69} | 9 |
| 9 | Q17 | {73–79} | 7 |
| 10 | Q19 | {85–90} | 6 |
| 11 | Q21 | {94–96} | 3 |
| 12 | Q23 | {102–106} | 5 |
| 13 | Q2 | {8–12} | 5 |
| 14 | Q4 | {17–20} | 4 |
| 15 | Q6 | {25–27} | 3 |
| 16 | Q8 | {31–36} | 6 |
| 17 | Q10 | {42–46} | 5 |
| 18 | Q12 | {49–56} | 8 |
| 19 | Q14 | {60} | 1 |
| 20 | Q16 | {70–72} | 3 |
| 21 | Q18 | {80–84} | 5 |
| 22 | Q20 | {91–93} | 3 |
| 23 | Q22 | {97–101} | 5 |
| 24 | Q24 | {107–108} | 2 |

FIG. 16

Segment-table showing a shuffled configuration of book 200 with variable length content segments (pages 1–108)

238

| Display Order | Content Segments | Page Batch | Pages/ Segment |
|---|---|---|---|
| 1 | Q1 | {SHFL (1–7)} | 7 |
| 2 | Q3 | {13–16} | 4 |
| 3 | Q5 | {21–24} | 4 |
| 4 | Q7 | {28–30} | 3 |
| 5 | Q9 | {37–41} | 5 |
| 6 | Q11 | {47–48} | 2 |
| 7 | Q13 | {57–59} | 3 |
| 8 | Q15 | {SHFL (61–69)} | 9 |
| 9 | Q17 | {SHFL (73–79)} | 7 |
| 10 | Q19 | {85–90} | 6 |
| 11 | Q21 | {94–96} | 3 |
| 12 | Q23 | {102–106} | 5 |
| 13 | Q2 | {8–12} | 5 |
| 14 | Q4 | {17–20} | 4 |
| 15 | Q6 | {25–27} | 3 |
| 16 | Q8 | {31–36} | 6 |
| 17 | Q10 | {42–46} | 5 |
| 18 | Q12 | {SHFL (49–56)} | 8 |
| 19 | Q14 | {60} | 1 |
| 20 | Q16 | {70–72} | 3 |
| 21 | Q18 | {80–84} | 5 |
| 22 | Q20 | {91–93} | 3 |
| 23 | Q22 | {97–101} | 5 |
| 24 | Q24 | {107–108} | 2 |

Segment-table showing a permitted portion of shuffled preview version of book 200 with Ad schedule

| Display Order (210) | Content Segments (220) | Page Batch (230) | Pages/Segment (240) | Preview Permitted (250) | Ad Lineup (260) |
|---|---|---|---|---|---|
| 1 | Q1 | {1–7} | 7 | YES | |
| 2 | Q10 | {42–46} | 5 | YES | Ad1 |
| 3 | Q12 | {49–56} | 8 | YES | Ad2 |
| 4 | Q4 | {17–20} | 4 | YES | Ad3 |
| 5 | Q13 | {57–59} | 3 | YES | |
| 6 | Q15 | {61–69} | 9 | YES | Ad4 |
| 7 | Q9 | {37–41} | 5 | YES | Ad5 |
| 8 | Q5 | {21–24} | 4 | YES | |
| 9 | Q14 | {60} | 1 | YES | |
| 10 | Q3 | {13–16} | 4 | YES | Ad6 |
| 11 | Q16 | {70–72} | 3 | YES | |
| 12 | Q8 | {31–36} | 6 | YES | Ad7 |
| 13 | Q6 | {25–27} | 3 | YES | |
| 14 | Q2 | {8–12} | 5 | YES | Ad8 |
| 15 | Q11 | {47–48} | 2 | YES | Ad9 |
| 16 | Q7 | {28–30} | 3 | YES | |
| | Q17 | {73–79} | 7 | NO** | |
| | Q18 | {80–84} | 5 | NO** | |
| | Q19 | {85–90} | 6 | NO** | |
| | Q20 | {91–93} | 3 | NO** | |
| | Q21 | {94–96} | 3 | NO** | |
| | Q22 | {97–101} | 5 | NO** | |
| | Q23 | {102–106} | 5 | NO** | |
| | Q24 | {107–108} | 2 | NO** | |

** Pages 73-108 not included in preview. May require qualifying activity.

Preview map of a shuffled configuration of book 200 integrating permitted segment/page array and schedule of ads

| Q1 | | | | | | | | Q10 |
|---|---|---|---|---|---|---|---|---|
| 1 | 2 | 3 | 4 | 5 | 6 | 7 | Ad1 | 42 |

| | | | | Q12 | | | | |
|---|---|---|---|---|---|---|---|---|
| 43 | 44 | 45 | 46 | Ad2 | 49 | 50 | 51 | 52 |

| | | | | Q4 | | | | |
|---|---|---|---|---|---|---|---|---|
| 53 | 54 | 55 | 56 | Ad3 | 17 | 18 | 19 | 20 |

| Q13 | | | | Q15 | | | | |
|---|---|---|---|---|---|---|---|---|
| 57 | 58 | 59 | Ad4 | 61 | 62 | 63 | 64 | 65 |

| | | | | Q9 | | | | |
|---|---|---|---|---|---|---|---|---|
| 66 | 67 | 68 | 69 | Ad5 | 37 | 38 | 39 | 40 |

| Q5 | | | | | Q14 | | Q3 | |
|---|---|---|---|---|---|---|---|---|
| 41 | 21 | 22 | 23 | 24 | 60 | Ad6 | 13 | 14 |

| | | Q16 | | | | Q8 | | |
|---|---|---|---|---|---|---|---|---|
| 15 | 16 | 70 | 71 | 72 | Ad7 | 31 | 32 | 33 |

| | | | Q6 | | | | Q2 | |
|---|---|---|---|---|---|---|---|---|
| 34 | 35 | 36 | 25 | 26 | 27 | Ad8 | 8 | 9 |

| | | | Q11 | | | Q7 | | |
|---|---|---|---|---|---|---|---|---|
| 10 | 11 | 12 | Ad9 | 47 | 48 | 28 | 29 | 30 |

| QuAc | | | | | | | | |
|---|---|---|---|---|---|---|---|---|

FIG. 19

METHOD AND SYSTEM FOR OFFERING BOOKS FOR PREVIEW IN ECOMMERCE

CROSS REFERENCE TO RELATED APPLICATIONS

This invention claims priority under 35 USC 119(e) to Provisional Patent Application No. 63/422,392, filed on Nov. 3, 2022, and titled METHOD AND SYSTEM FOR OFFERING BOOKS FOR PREVIEW IN AN ECOMMERCE ENVIRONMENT, which is incorporated by reference herein for all purposes.

FIELD OF THE INVENTION

This invention relates generally to a method for offering books for preview and/or sale in ecommerce. More particularly, this invention relates to a method and system for previewing, purchase evaluation, offering for sale, marketing, and/or selling of books and other information products over a computer network in a protected form that deters unauthorized distribution thereof.

BACKGROUND OF THE INVENTION

Electronic commerce (ecommerce) refers to buying and selling transactions that are conducted over the internet. Ecommerce offers some inherent advantages over traditional retailing, as an internet vendor is not restricted by physical location or regional territory and can potentially offer goods and services to consumers throughout the country or even globally. Ecommerce has seen phenomenal growth in the U.S. and international markets over the recent years and all kinds of products are sold over the internet via ecommerce; however, selling books and information products over the internet offers some unique and formidable challenges. While the internet has become the ultimate publishing medium and distribution engine for all kinds of information and digital content—it has also engendered widespread and rampant unauthorized distribution of digital content and large-scale copyright infringement.

The United States Copyright Office issued a detailed report in May 2020 on Section 512 of the 1998 Digital Millennium Copyright Act (DMCA), after several years of work and congressional hearings (Section 512 of Title 17, A Report of the Register of Copyrights, May 2020; https://www.copyright.gov/policy/section512/; hereafter "the '512 Report"). The '512 Report describes the widespread and pervasive problems of copyright infringement and internet piracy with specific evidentiary detail provided by copyright owners from a range of creative industry sectors, as strongly substantiated by the following excerpts.

"Internet piracy has evolved alongside these substantial gains in internet services, speed, and access. The technology that allows copyright owners to distribute content directly to consumers' living rooms via streaming services also enables new forms of piracy: streaming of unlicensed content . . . . The cloud also presents new challenges for combating piracy. Cyberlockers, for instance, enable a user to upload content—with or without the copyright owner's permission—that they can then access remotely or share with others . . . "; (The '512 Report, page 31, emphasis added).

The '512 Report refers to the "whack-a-mole" problem of tackling copyright infringement, " . . . the copyright holder may succeed in having the infringing content removed from a website, only to have it reposted almost immediately on the same site by a different user or even the same user, requiring the rights holder to start the process over again . . . the millions of takedown notices sent by copyright owners have seemingly 'had little impact towards reducing the volume of infringing material available'." (The '512 Report, page 81; emphasis added).

The '512 Report also cites comments by Authors Guild— "Unless an author's pirated book is published by one of the few publishers that have the means to actively address piracy, the only recourse an author has is to send fruitless DMCA notices in a never-ending game of Whac-a-Mole . . . " (The '512 Report, Footnote on page 81; emphasis added).

The '512 Report states in the conclusion section: " . . . The Copyright Office concludes that the balance Congress intended when it established the section 512 safe harbor system is askew . . . There is no doubt that the internet, in all its various component parts, has grown successfully and exponentially over the past two decades. However, despite the advances in legitimate content options and delivery systems, and despite the millions of takedown notices submitted on a daily basis, the scale of online copyright infringement and the lack of effectiveness of section 512 notices to address that situation remain significant problems . . . . While the Office is mindful of those creators who have been able to leverage new technologies to their benefit, their economic success does not provide comfort to the many other creators who have seen their livelihoods impacted drastically by ongoing infringement of their works online and for which they can achieve no relief . . . " (The '512 Report, Conclusion ¶2, page 197; emphasis added).

A comparison of book selling models in a physical bookstore (brick-and-mortar retailer) versus an internet website (ecommerce retailer) further illustrates the specific challenges of providing content online. To purchase a paper book from a physical bookstore, it is quite customary for a potential customer or reader to walk into a local bookstore and pull a book from one of the bookshelves and browse through the book and examine its contents by turning to any page or section within the book, i.e., preview the book prior to making a purchase decision. After previewing the book, the reader can then either decide to purchase the book or proceed with previewing or inspecting other books in the bookstore in a similar manner. In contrast, the current practice for selling paper books and electronic books (e-books) through ecommerce is to provide a very limited preview that may include—a brief description of the contents, table of contents, an excerpt showing a few pages from the book, front cover, back cover, and/or testimonials from other readers, while a substantial portion of the underlying content is not made available to the reader or the customer prior to purchase despite the ease with which it can be made available online.

This disparity between a physical bookstore and an ecommerce website in terms of providing a book preview, is hardly capricious or arbitrary; rather, it is rooted in the inherent properties of digital content and the ease with which digital content can be accessed, copied, and distributed to countless users on the internet in an unauthorized manner. Although digital content can be made easily available online by a vendor, the fact that be as easily copied, misused, infringed, and pirated, impels online vendors to impose data restrictions and constraints on the availability of content before receiving payment therefor.

Clearly, an ecommerce vendor cannot sustainably provide a comparable level of preview access as that available to a reader at a physical bookstore, since even when access to information is provided for inspection, preview, and purchase evaluation purposes over a computer network or the internet, the same information can be consumed, copied, and distributed to others without payment and without compensating the content creators or publishers. For these reasons, it would be commercially untenable to provide substantial preview access to a book over the internet as the reader can access the book provided for preview on the internet, as and when needed, without ever buying the book or paying for it. Apparently, providing substantial preview access to the book contents over the internet would extinguish the need for making a purchase, and would be the commercial equivalent of selling the book for free. Therefore, quite understandably, access to the contents of a book for previewing and purchase determination through an ecommerce website, is of an inferior quality and significantly limited compared to that available to a reader or customer during a physical browse-through of the book at a local bookstore, due to potential for misuse, piracy, and unauthorized distribution of online content.

As will be readily apparent, the information contained in a paper book is tied to a physical medium—paper. A paper book in a physical bookstore remains in possession of the bookstore even when an interested consumer or reader retrieves it from the bookshelf for preview, browsing, and examination purposes; furthermore, preview access to a paper book is time limited for the duration of the reader's visit. The paper book is released to the consumer only after it is purchased. Additionally, a purchased paper book in its original form can be shared only when the owner parts away from the copy in the owner's possession and can be only consumed by a singular person at a time. In contrast, digital information made available on an ecommerce website, even for preview purposes, can be readily accessed by a multitude of consumers and downloaded by them onto their local computers and retrieved at any time, and further can be mass-distributed for free even though the ecommerce website invariably remains in possession of the original.

Duplication of a paper book involves duplication costs and some deterioration in quality over successive generations of copies However, in the case of digital content, identical-to-original copies can be generated without a loss in quality and mass-distributed with the simplicity of a mouse click. In other words, there is no loss of fidelity or deterioration in quality of display or playback across generations of copies. In most instances it is almost impossible to differentiate a digital copy from its original.

Traditional impediments of time, distance, effort, and costs are involved in sharing or delivering a physical artifact such as a paper book. Any digital information product can be delivered or shared across the globe via the internet with anyone having access to the World Wide Web. Thus, physical distance is obliterated over the internet. Digital content does not have physical weight; however, it needs to be stored on either physical media or on computer hardware having storage and/or memory capabilities.

Mass distribution of a physical artifact such as a paper book, tape, or CD requires considerable resources including space, equipment, infrastructure, people, and money. In the case of digital content, multiple copies of an information product need not be stored separately, for mass distribution, and can be generated upon demand using a personal computer. The cost of carrying one copy of a digital work is practically no different than carrying thousands of copies of the same digital work. Thus, the costs of duplication, reproduction, dissemination, and distribution of digital content are considerably reduced compared to traditional methods of printing, publishing, warehousing, distributing, and shipping.

It is ironical indeed—it is the inherent characteristics and advantages of digital content and the ease with which it can be copied and distributed that pose the challenges associated with distributing digital content; and, in turn induce the content providers and ecommerce vendors to impose restrictions on availability of preview materials. Fundamentally, the problem is that any transaction involving access to digital content invariably involves copying. In fact, web pages are viewed by copying them from a remote computer (or server) to a local machine or other display or playback device(s) such as a mobile phone, a tablet, a laptop etc.

Digital content that is provided for preview can be easily captured, stored, replicated, and mass distributed, without authorization or payment of due consideration to the content provider. Unauthorized distribution of digital works results in a loss of revenue to the content provider or publisher and an unpaid royalty to the author or creator. Unauthorized distribution of analog content, such as—sharing of books, music and movies stored on traditional analog media such as paper, audio and video tapes has existed for quite some time but has been mostly confined to an individual's circle of influence. In contrast, unauthorized distribution of digital content can be significantly more damaging as identical-to-original illegal copies can be made readily available over the internet for mass consumption. For instance, an unauthorized copy of a digital work can be distributed over a social network website to millions of people within a short period of time, long before the content provider can react through lawful means. Therefore, unauthorized distribution of digital content and its misuse is of great concern to the content creators, publishers, and distributors. The '512 Report, published by the US Copyright Office, strongly establishes that online infringement and unauthorized distribution are not just theoretical problems but have widespread and damaging consequences for content creators.

The catch-22 predicament for content providers to effectively sell books via ecommerce, is that the underlying content must be offered in some form for purchase evaluation prior to its sale; and once the content is presented for preview or purchase evaluation, it can be readily misused, duplicated and distributed without rewarding or compensating the content publisher or creator. If the ecommerce seller or content provider adopts a very restrictive approach for protecting content prior to its sale, it leads to the undesirable outcome of purchase being with withheld by consumers and incites the no-preview-no-purchase behavior. Lacking access to a meaningful preview, the consumer may simply try to retrieve content from an unauthorized source and thus forgo purchase altogether.

Various techniques for preventing unauthorized distribution and use of digital products range from cryptography or encryption technologies; tamper detection mechanisms; establishing a trial period and setting a time limit for software and similar digital content; censorship of digital content; and masking of information products or superposing a masking effect on digital content.

Providing a preview of an information product inevitably involves providing some degree of access to the information product. Some of the techniques for controlling access to digital content include encrypting, garbling, or masking digital content. In some prior art techniques, access is extremely restricted by encrypting the content so that in effect a preview is simply not permitted or is limited to a selected portion of the digital work. In other cases, access to an information product can be provided in a controlled way by masking the content or superposing a masking effect (see U.S. Pat. Nos. 7,316,032, 7,562,397, and 8,069,489). These prior art techniques require that either a substantial portion of an information product is not made available to the user for previewing purposes, or the digital content is presented in a masked form. In other words, at least a portion of the digital content is withheld from the user or is provided in an altered state, and control is exercised by limiting the availability of digital content in its original form.

Despite the variety of techniques utilized for restricting or controlling access to the digital content—the overarching principle utilized in these techniques is content focused practiced by—blocking the content (encrypting); or distorting the content (garbling); or introducing an extrinsic element such as an overlay or a mask at certain portions or with certain frequency (masking). In one form or another, these techniques limit the availability or the utility of the content. Furthermore, none of these techniques offer a preview experience to a user that qualitatively resembles a browse-through in a physical bookstore.

Thus, despite all the advantages that digital distribution has to offer, the real possibility of widespread copyright infringement and unauthorized distribution of content, results in a consumer being only offered a limited preview of a book that he/she would like to purchase.

Thus, it would be clear from the above that unauthorized distribution and copyright infringement of digital information products pose significant challenges and there is a need for providing a preview of books and information products in ecommerce without compromising their sale value, and without substantially withholding content from potential customers for previewing and purchase determination purposes. These and other needs, as shall hereinafter appear, are met by the method and system of the present invention.

SUMMARY OF THE INVENTION

As mentioned above, the threat of rampant and pervasive unauthorized distribution and copyright infringement on the internet has engendered guarded and restrictive practices by ecommerce vendors and copyright holders that preclude offering a meaningful preview of books that are sold online. Book previewing functionality available on an ecommerce website is substantially limited and inferior to a reader's experience at a physical bookstore due to valid concerns regarding unauthorized distribution of online content, since providing a substantial preview of a book on a website may practically eliminate the need for purchasing it.

A noteworthy understanding that led to the present invention is that the challenges in distributing and selling books and information products via ecommerce or over the internet, arise not because of a particular technological inadequacy or lack of the distribution medium or the computer network (i.e., the internet), but precisely because of the vast networking power of the internet coupled with the inherent characteristics of the digital content. The advancements in computer technology have actually enabled more copyright infringement. The challenge of—providing a meaningful preview of an information product to a user over the internet while at the same time deterring unauthorized distribution thereof—cannot be addressed with simply providing better or faster computers or computer networks with greater connectivity or speed. Therefore, improving the information carrying capacity or the speed capabilities of a computer network that is already quite powerful is more likely to compound and exacerbate the problem of unauthorized distribution and copyright infringement rather than help solve it. A different approach is needed.

At the heart of the present invention is the insight that a fundamental property of a book or an information product, in addition to its content, is the order of the content or the content segments therein, which makes it meaningful and valuable. In broad terms, a book or an information product is a series or sequence of pages, sections, or content segments arranged in a particular order; or a plurality of content segments arranged or stringed in a sequential order. This insight led to the recognition that varying the order or sequence of content segments or presenting the preview content in an out-of-sequence manner can provide a novel and useful system and method for providing a preview version of an information product in a protected manner without the need for—distorting content by garbling, incorporating extrinsic elements (such as masks or masking effects), or blocking content by encrypting.

In addition, it was also realized that consumers utilize different reading modes when they are consuming a book for intensive study, learning, and assimilation, versus when they are skimming through or leafing through the contents of the book and evaluating it for further reading, research, or making a purchase decision. The quick read-through or inspection of digital content for previewing and purchase evaluation is also referred to herein as "skim-reading" of "skimming-through" the contents of a book or an information product. This led to the recognition that providing an online previewing experience of a book that is analogously as satisfying as that in a physical brick-and-mortar bookstore can be effectuated by presenting the book content in a rearranged or reorganized form.

Accordingly, an object of the present invention is to address the heretofore conflicting needs of consumers for previewing or examining book content prior to purchasing a book, and those of content creators, copyright owners, publishers, and ecommerce providers for protecting against unauthorized use or infringement of digital content once it has been made available for previewing purposes.

According to an embodiment of the present invention, a preview version of a book is provided by presenting content in a "shuffled", "rearranged", "reorganized", or "out-of-sequence" configuration for a reader or consumer to preview and make a purchase decision. The shuffling or rearrangement can be accomplished in a variety of ways according to various embodiments of the invention; for example, the shuffled arrangement may be rule based, selective, arbitrary, or random. The preview version of the book is presented in a rearranged or shuffled format and affects the order of at least one of—viewing, displaying, and reading of the book. The shuffled version of the book is substantially representative of the content or content segments in the original book, but the content segments are not in sequential order. The preview version according to the present invention thus provides high content fidelity to the original work or book but not in the exact sequence of the original work; additionally, the preview version is configured for quickly skimming-through the contents of the book for previewing and purchase evaluation purposes. Thus, the shuffled version of the book allows the user to inspect, preview or skim-read various sections or areas of the book but not necessarily in a sequential order. According to the present invention, the preview version of an information product does not require that large portions of the content be withheld from a user.

In general, a preview version of a book or an information product is made available to a user for reviewing, skimming-through, examining or making a purchase decision, by displaying a preview version of the original information product in a shuffled or out-of-sequence configuration. The preview version of a book according to the present invention offers a significant improvement over the limited preview functionality currently offered in an ecommerce setting due to concerns of unauthorized distribution. This allows a user the option of examining or previewing a substantial portion of the content of an information product, such as a book, albeit in a shuffled or rearranged form.

According to an exemplary embodiment of the invention, a preview version of a book is made available to a user by providing the user an opportunity to browse and inspect a substantial number of pages from the book albeit in a shuffled or reorganized form. In this embodiment, the shuffled preview version provides the user the facility to scroll, skim-read, or preview a substantial portion of the book but not necessarily in a sequential order. This allows a content provider to offer the user an online previewing experience that almost simulates user-experience in a physical bookstore without compromising the sale value of the book while also enabling the user to make a purchase decision.

According to an embodiment of the invention, a preview version of a book is derived by rearranging or shuffling of the original version of the book by providing a random or pseudo-random arrangement of various sections, segments, pages, or portions of the book.

According to another embodiment of the invention, a shuffled preview version of a book is derived by modifying an original configuration of the book. The original configuration of the book is deconstructed or apportioned into a plurality of content segments that are arranged in an original or sequential order. The shuffled preview version of the book is derived by modifying the original order of the plurality of content segments by rearranging or shuffling at least a subset of the plurality of content segments, to create a shuffled arrangement of the plurality of content segments. It will be realized that while the shuffled preview version may not retain the original order of the content segments, the individual content segments may still maintain internal sequential integrity for intelligible review or readability.

The length of the individual content segments within the plurality of content segments may be equal or unequal and may be configured according to criteria established by the content provider. For example, a content segment may comprise—a paragraph, a single page, a plurality of pages, a plurality of paragraphs, a portion of a chapter, or an entire chapter. Similarly, a content segment of an audio book may include reading or recitation of—a paragraph, a single page, a plurality of pages, a plurality of paragraphs, a portion of a chapter, or an entire chapter, or may be apportioned based on time interval or duration such as, 30 seconds, one minute, five minutes, and/or several minutes.

According to still another exemplary embodiment of the invention, a preview version of a book is made available to a user by presenting a plurality of content segments from the book wherein each content segment includes pages or sections from the book in a shuffled or out-of-sequence form. The shuffled preview version is configured for scrolling, skimming, or previewing the contents or pages of the book but not necessarily in a sequential order. In other words, the shuffled preview version allows the user to read or have substantial access to the original book but not in the original reading order.

According to an embodiment of the present invention, controlling access to a book is exercised by providing a preview version of the book in a shuffled or rearranged configuration to enable a user to examine the shuffled content for making a purchase decision, without providing access to the original configuration of the book.

In embodiments, the shuffled preview version, obtained by shuffling or rearranging content segments or portions of a book, may be strategically utilized for a variety of purposes. According to an embodiment, a shuffled preview version of a book is offered to consumers for free for making a purchase decision and serving as a marketing tool for the book. In other embodiments, a shuffled preview version is offered or made available to a user upon watching an advertisement. According to another embodiment, the shuffled preview version of a book includes a plurality of content segments, wherein an advertisement is inserted or positioned between two adjacent content segments, i.e., the advertisement is inserted between a preceding content segment and a following content segment. According to another embodiment of the invention, the shuffled preview version of a book is generated in response to an input from a user with provision for including a limited page range or content segment(s).

The present invention contemplates a variety of commercial approaches and embodiments for providing a shuffled preview version of a book. According to an embodiment of the invention, a preview version of an original book is made available to a user in a shuffled form for free, i.e., without requiring a payment from the user, for facilitating a purchase decision about the original book. According to another embodiment of the invention, the availability of a shuffled preview version may be time limited; for example, a shuffled preview version of a book may be made available to a consumer for an hour, a few hours, a day or 24 hours, or for another preset time interval established by the content provider. According to still another embodiment of the invention, the shuffled preview version of a book may be made available or sold at a certain price that is substantially lower than the price of the original book. In still another embodiment of the invention, the paid shuffled preview version may be accompanied with a time-limited discount offer for purchasing the original book to incentivize the user in making a timely purchase decision rather than delaying or forgoing purchase. According to another embodiment of the invention, access to a shuffled preview version may require buying a subscription.

In still other embodiments of the invention, the shuffled preview version is customizable and is generated in response to a request or input from a user. The input provided by a user may include a search term, a key phrase, a content tag, or other relevance criteria. For instance, upon providing a search term the user may receive a shuffled preview version of an information product, wherein the most relevant content segments (i.e., relevant search hits) from the information product may be included in the shuffled preview version of the information product. The relevant content segments may further be arranged in accordance with their relevance rating or generally in a shuffled form. Thus, a plurality of customized shuffled preview versions of a book can be generated in response to various search term inputs received from one or more users.

According to an embodiment of the invention, a shuffled preview version of a book is generated in response to a user's request for a specific section or page range of a book for previewing and inspection. This feature may be applicable, for example, in situations where a user initially examines a shuffled preview version of a book and finds a particular section or page range that is of particular interest, which the user may want to explore further before making a purchase commitment. According to an embodiment of the invention, a user-specified page range may be made available for a modest fee to allow the user to make a purchase decision for a small investment relative to the price of the entire book, while at the same time the content provider is able to realize at least a minor benefit rather than losing a sales opportunity.

In alternate embodiments of the invention, access to a shuffled preview version of an information product may require a user to buy a subscription. Once the subscription is purchased the user may access shuffled preview versions of the books included in the content provider's catalog. The shuffled preview versions may include other features including search functionality and/or ability to request specific page ranges.

According to another embodiment of the invention, shuffled preview functionality is combined with a request feature wherein the user may request access to specific pages, page range(s), or section of a book for previewing. The requested sections or pages may be made available to the user in a shuffled form or a sequential form subject to certain restrictions or limitations established by the content provider. For example, the content provider may limit—the total number of sequential pages to be included with each content request, or the total number of sequential content requests for a given book title, or the total duration of preview for a given title. If the user exceeds the content request limitations established by the content provider, the content provider may decline the content request or continue to provide a shuffled preview version of the book.

In still other embodiments, the user may request access to specific pages, page ranges, or sections of a book albeit within certain allowable limits established by the content provider. The requested sections or pages may require at least one of—watching an advertisement, completing a survey, reviewing a prior purchase, responding to a commercial offer, paying a modest fee, and buying a subscription.

An important aspect of the invention is to protect the original book by presenting the preview version in a shuffled form and preventing operations that would enable a user to reassemble or derive the original information product. Accordingly, operations such as saving large portions of material and/or printing may be disabled when offering a shuffled preview version of an information product. In other embodiments, the shuffled preview version of the information product is generated dynamically by randomly selecting content segments from the shuffled configuration of the book. A few specific embodiments and variations thereof are detailed below:

Specific embodiment #1 recites: A computer implemented method for providing a preview version of a book, over a computer network, the method comprising the steps of: receiving a request from a user, over the computer network, for examining the preview version of the book; deconstructing or configuring the book into a plurality of content segments, each content segment in the plurality of content segments comprising at least one page, wherein a sequential arrangement of the plurality of content segments defining an original configuration of the book; modifying the original configuration of the book by rearranging at least a subset of the plurality of content segments to create a shuffled configuration of the book, the shuffled configuration of the book comprising a shuffled arrangement of the plurality of content segments; initiating a preview session and displaying at least one content segment from the shuffled configuration of the book in a preview window in response to said request; displaying another content segment from the shuffled configuration of the book, subject to at least one preview criterion, during the preview session upon receiving a prompt from the user to continue browsing; and, controlling the availability of the shuffled configuration of the book, over said computer network, during said preview session.

The above specific embodiment is capable of various modifications to yield a variety of other embodiments as detailed in the following description. In addition, any of the following features can be combined with other specific embodiments described herein as the context permits. At least one content segment (e.g., first content segment) in the shuffled configuration of the book is retained at an original position in accordance with said original configuration of the book. The first content segment may comprise a title page and a table of contents section of the book. The preview session may include a group of randomly selected content segments from said plurality of content segments. The shuffled configuration of the book modifies an order of reading said original configuration of the book. Each content segment in the plurality of content segments may comprise an equal number of pages or a variable number of pages. At least one content segment may include a plurality of pages or subsegments arranged in a sequential order. At least one content segment in the shuffled configuration may include constituent pages or subsegments arranged in a shuffled order. The content segments in the shuffled configuration of the book may be represented by image batches wherein each page of the book is represented by an image thereof. The preview window may comprise scrolling means for navigating through said shuffled configuration of the book. In some variants the shuffled configuration of the book is dynamically generated during the preview session by randomly selecting content segments from the plurality of content segments. The preview session may include an advertisement, an infomercial, a commercial offer, a campaign message, or a sales promotion. The ad may be shown at the beginning or during the preview session or at predetermined frequency. A group of content segments in the shuffled configuration of the book may be tagged for display with an advertisement. The availability of a specific content segment in the shuffled configuration of the book or its inclusion in the preview version during the preview session is determined in accordance with a permissions protocol. A group of content segments in the shuffled configuration of the book may be stipulated as unavailable-for-preview by a content owner.

The preview session may be subject to a time limitation. The preview session may also be subject to a preview limitation with respect to a percentage of overall pages of the book that can be made available to the user during the preview session. The invention contemplates a provision for extending the preview session after a preview limitation is reached in exchange for—watching an advertisement, completing a qualifying activity, buying a subscription, and making a purchase. The qualifying activity for extending the preview session may include at least one of—participating in a survey, watching an infomercial, writing a book review, recommending a book, responding to a sales promotion, accepting a marketing offer, making a purchase, buying a subscription, redeeming a coupon, redeeming an award, redeeming loyalty points, and redeeming a credit.

According to an embodiment, each content segment in the original configuration of the book is assigned a numerical value and the original configuration is represented by a consecutive numerical series; and wherein, a subset of the consecutive numerical series is subjected to a computer-generated randomization to derive a shuffled numerical series representing a shuffled arrangement of the content segments. The original, sequential arrangement of the content segments is designated by a sequential array, and the shuffled arrangement of the content segments is designated by a shuffled array. The shuffled array is one of a plurality of permutations for modifying the original configuration of the book. The shuffled array defines a set of content segment attributes including—content segment position, number of constituent pages per segment, arrangement of constituent pages, permission for preview, copresence of an advertisement, and display behavior during said preview session. The shuffled array is referentially linked to a plurality of subarrays corresponding to the plurality of content segments, each subarray defining an arrangement of pages in a corresponding content segment. The shuffled array could serve as a generic template for creating a plurality of shuffled configurations corresponding to a plurality of book titles.

The original configuration of the book is configured for rearrangement in a plurality of shuffled permutations defining a plurality of shuffled configurations of the book. The shuffled configuration of the book being created by one or more of—relocating, substituting, swapping, and randomizing—a subset of content segments. The term randomizing includes pseudo-randomization and computer-generated randomization. The shuffled configuration of the book is further customizable in accordance with an input received from said user. The steps for displaying a customized shuffled configuration of the book comprising: receiving a search term input from said user for searching through said preview version of the book; identifying a plurality of relevant content segments corresponding to the search term input in the shuffled configuration of the book and forming the customized shuffled configuration of the book; displaying at least one relevant content segment from the customized shuffled configuration of the book in response to the search term input. The customized shuffled configuration of the book may include an advertisement.

According to a feature of the invention, the user can preview a specific content section of the book. The method comprising the steps of: receiving a request from the user for inspecting a user-defined content section from the book, the user-defined content section including a beginning page and an ending page; displaying a set of content segments corresponding to the user-defined content section from the shuffled configuration of the book. The user-defined content section may also be apportioned into a set of page batches that are then displayed in a shuffled form to the user. As before, an advertisement may be included with content segments displayed in response to the request for inspecting user-defined content section.

According to another featured variation, each content segment in the plurality of content segments is stored in a corresponding digital file in a plurality of digital files, the plurality of digital files is retrieved during the preview session in accordance with a shuffled array, the shuffled array defining a shuffled arrangement of the plurality of digital files. The shuffled array may be configured as a shuffled data index that may be searchable. The shuffled configuration of the book is subject to a set of control attributes determining—inclusion of a specific content segment during said preview session, presence of an advertisement with the specific content segment, arrangement of constituent pages in the specific content segment. The preview version of the book is configured in accordance with a preview map, the preview map integrating—a permitted portion of the shuffled configuration of the book, a predefined arrangement of constituent pages in each of the content segments included in the preview session, and a schedule of advertisements to be shown during the preview session. The preview session may include a listing of hyperlinks referencing a corresponding listing of content segments from the book. A shuffled configuration of the book comprises a subplurality of odd-numbered content segments followed by a subplurality of even-numbered content segments.

Specific embodiment #2 recites: A computer implemented method for providing a preview version of a book, over a computer network, said method comprising the steps of: structuring the book into a plurality of page batches, each page batch in the plurality of page batches comprising at least one page of the book; providing a sequential array defining a sequential arrangement of the plurality of page batches, said sequential arrangement of the plurality of page batches representing an original configuration of the book; providing a shuffled array defining a shuffled arrangement of the plurality of page batches, said shuffled arrangement of the plurality of page batches representing a shuffled configuration of the book; receiving a request from a user, over said computer network, for examining said preview version of the book; initiating a preview session and displaying at least a first page batch from said shuffled configuration of the book in a preview window; controlling the availability of a next page batch from said shuffled configuration of the book, over said computer network, during said preview session.

The above specific embodiment is capable of various modifications and features to yield multiple additional embodiments. Accordingly, at least one page batch in the shuffled configuration of the book is retained at an original position in accordance with said original configuration of the book. The first page batch comprises a title page and a table of contents section of the book. The next page batch from the shuffled configuration of the book is displayed in the preview window upon receiving a prompt from the user. The next page batch may be randomly selected from the plurality of page batches. The shuffled configuration of the book modifies an order of reading or viewing the original configuration of the book. Each page batch in the plurality of page batches may comprise an equal number of pages. Each page batch in the shuffled configuration of the book may include a plurality of pages arranged in a sequential order. The plurality of pages in a page batch may be determined by a content provider or owner. In some embodiments page batches range from 2-15 pages. In an embodiment, the availability of the next page batch from said shuffled configuration of the book, during said preview session, is determined based on a permissions protocol.

At least one page batch in the shuffled configuration of the book may comprise a plurality of pages arranged in a shuffled order. Each page batch may be configured as an image batch. Each image batch may comprise a plurality of image that may be arranged in a sequential order. According to a variation, at least one page batch in the shuffled configuration of the book comprises a plurality of images arranged in a shuffled order. The preview window may comprise scrolling means for navigating through the shuffled configuration of the book. A major portion of the shuffled configuration of the book may be made available to the user during the preview session. According to an alternate embodiment, a set of page batches in said plurality of page batches are stipulated as unavailable-for-preview by a content owner.

The preview session may include at least one of—an advertisement, an infomercial, a commercial offer, a campaign message, and a sales promotion. The advertisement may be shown at the beginning of the preview session or at a predetermined frequency during the preview session. The advertisement may also be tagged to a page batch or content segment. The preview version of the book displayed during the preview session may be limited to a subplurality of page batches from the shuffled configuration of the book.

The preview session may be subject to a time limitation, or a preview limitation with respect to a percentage of overall pages of the book that can be made available to the user during the preview session. The method may further comprise the step of: extending the preview session after a preview limitation is reached in exchange for at least one of—watching an advertisement, completing a qualifying activity, buying a subscription, and making a purchase. The qualifying activity may comprise at least one of—participating in a survey, writing a book review, recommending a book, responding to a sales promotion, accepting a marketing offer, making a purchase, buying a subscription, registering as a member, redeeming a coupon, redeeming an award, redeeming points, and redeeming a credit.

The page batches according to the shuffled array can be arranged in a random order, wherein each page batch in the plurality of page batches is assigned a numerical identifier, the plurality of page batches according to the sequential array are represented by a consecutive series of numerical identifiers; and wherein, at least a subset of the consecutive series of numerical identifiers are subjected to a computer-generated randomization to derive a shuffled series of numerical identifiers corresponding to the shuffled array. The sequential arrangement of the plurality of page batches is designated by a consecutive series corresponding to the sequential array, and at least a portion of the consecutive series is randomly rearranged to form a shuffled series corresponding to the shuffled array. Accordingly, the shuffled configuration of the book may comprise a random arrangement of at least a subplurality of page batches. The random arrangement may also be pseudo-random. The shuffled array represents one of a plurality of permutations for modifying the original configuration of the book. The plurality of permutations defining, at least potentially, a plurality of shuffled configurations of the book. The shuffled array in some instances is based on a generic shuffled template, the generic shuffled template is configured for providing a plurality of shuffled configurations corresponding to a plurality of book titles. The generic shuffled template represents a shuffled configuration of a generic book, the generic book may comprise a larger plurality of page batches so that only a subset of the larger plurality suffices for arranging a smaller plurality of page batches of a specific book.

The shuffled arrangement of page batches represented by the shuffled array may be created by one or more of—relocating, swapping, substituting, and randomizing at least a subset of the plurality of page batches. The shuffled configuration of the book may be created by a cumulative rearrangement comprising any combination of relocating, swapping, substituting, and randomizing the subset of the plurality of page batches. The shuffled array may be configured as a searchable index to facilitate processing of a search request by the user and providing a customized shuffled configuration of the book. The shuffled array may comprise or refer to a plurality of subarrays, wherein each subarray defines a predetermined arrangement of the constituent pages in a page batch. A subarray may denote a shuffled or a sequential arrangement of the constituent pages within a page batch.

According to a further embodiment, the preview version of the book is made available to the user in accordance with a preview map, the preview map integrating—a permitted portion of the shuffled configuration of the book (per a permission protocol), the shuffled arrangement of the page batches or content segments (shuffled array), a predefined arrangement of constituent pages for each content segment included in the preview session (defined by plurality of subarrays), and a schedule of advertisements interspersed during the preview session (ad placements).

In some embodiments, the user can customize the structuring of the book into the plurality of page batches and can select a page batch length from a range of page batch lengths for structuring the book into a plurality of page batches. The preview version of the book can be deliberately metered during the preview session, wherein only one page batch from the shuffled configuration of the book is displayed in the preview window for browsing at a given time during the preview session, and wherein a next page batch is displayed in the preview window upon receiving a prompt from the user to continue browsing. In an embodiment, each page of the book is represented by an image thereof, each page batch in the plurality of page batches is represented by an image batch; and the shuffled configuration of the book comprising a shuffled arrangement of a plurality of image batches. Each page batch in the plurality of page batches may comprise a set of attributes, including—page batch size, arrangement of constituent pages, designation for inclusion in the preview version, copresence of an advertisement, and display behavior during the preview session. The preview session may include a set of hyperlinks referencing a corresponding set of page batches from the book.

Each page batch in the plurality of page batches may be stored in a corresponding data container in a plurality of data containers. Alternately, each page batch in the plurality of page batches may be stored in a corresponding computer file in a plurality of computer files, and wherein the plurality of computer files is retrieved during the preview session in accordance with the shuffled array (or defined by the shuffled array). The shuffled array may be configured as a shuffled data index defining a shuffled arrangement of the plurality of data containers. The shuffled data index may be searchable. In one embodiment, the plurality of page batches is congruently populated into a series of concatenated data containers in accordance with the shuffled array.

According to an embodiment, the plurality of page batches comprises a subplurality of odd-numbered page batches and a subplurality of even-numbered page batches, wherein the subplurality of odd-numbered page batches is antecedent to the subplurality of even-numbered page batches in the shuffled configuration of the book. The shuffled configuration of the book may be made available on a reading app installed on a computer device of the user.

Specific embodiment #3 recites: A computer implemented method for providing a preview version of a book, over a computer network, the method comprising the steps of: deconstructing the book into a plurality of content segments, each content segment in the plurality of content segments comprising at least one page, wherein a sequential arrangement of the plurality of content segments representing an original configuration of the book; storing each content segment in the plurality of content segments in a data container, the plurality of content segments being stored in a plurality of data containers, wherein a sequential arrangement of the plurality of data containers being represented by a sequential data index, the sequential data index referentially indicating the sequential arrangement of the plurality of content segments representing the original configuration of the book; providing a shuffled data index representing a shuffled arrangement of the plurality of data containers, the shuffled arrangement of the plurality of data containers referentially denoting a shuffled arrangement of the plurality of content segments, wherein the shuffled arrangement of the plurality of content segments representing a shuffled configuration of the book; receiving a request from a user, over the computer network, for examining the preview version of the book; initiating a preview session and displaying, in a preview window, at least a first content segment stored in a first data container from the shuffled configuration of the book for browsing by the user; controlling the availability of a next set of content segments from the shuffled configuration of the book during the preview session.

The above specific embodiment can be combined with previously listed features of the invention to yield additional embodiments. A description of some of the additional features follows. The plurality of data containers may be stored in a single cloud repository or in a group of cloud repositories. According to an alternate embodiment, each data container in the plurality of data containers is a computer file, the plurality of content segments being stored in a plurality of computer files, and wherein the plurality of computer files is retrieved for display in the preview window during the preview session in accordance with the shuffled data index. The availability of the next set of content segments from the shuffled configuration of the book, during the preview session, is determined based on a permissions protocol. In a particular embodiment, each data container in the plurality of data containers is assigned a numerical identifier corresponding to its position according to the sequential data index, the sequential arrangement of the plurality of data containers according to the sequential data index being represented by a consecutive series of numerical identifiers; and wherein, at least a subset of the consecutive series of numerical identifiers being subjected to a computer-generated randomization to derive a shuffled series of numerical identifiers corresponding to the shuffled data index. A major portion of the consecutive series may be randomly rearranged to form a shuffled series corresponding to the shuffled data index.

The sequential data index is configured for rearrangement into a plurality of shuffled data indices, the plurality of shuffled data indices representing a plurality of shuffled configurations of the book. The plurality of shuffled data indices corresponding to a plurality of permutations of rearranged sequential data index. The shuffled data index may represent a random arrangement of at least a subset of the plurality of data containers. The shuffled data index may comprise a generic template that is applicable to a plurality of book titles in creating a corresponding plurality of shuffled configurations.

According to an aspect of the specific embodiment, the shuffled configuration of the book is created by rearranging at least a subset of the plurality of data containers by one of—relocating, swapping, substituting, and randomizing the subset of the plurality of data containers. Alternately, the shuffled configuration of the book is created by a cumulative rearrangement comprising any combination of—relocating, swapping, substituting, and randomizing of at least a subset of the plurality of data containers.

The shuffled data index may be configured as a searchable index to effect creation of customized shuffled configuration of the book. The shuffled data index defining the shuffled arrangement of the plurality of data containers includes a set of attributes, the set of attributes including at least one of—content segment size, arrangement of constituent sub-segments, designation for inclusion in the preview version, copresence of an advertisement, and display behavior during the preview session. The shuffled configuration of the book is made available on a mobile reading app. The method according to specific embodiment may further comprise the steps of: identifying a set of anticipatory search terms of potential interest to the user with reference to the book; creating a set of customized shuffled configurations of the book corresponding to the set of anticipatory search terms; displaying at least one customized shuffled configuration of the book in response to a selection of a corresponding search term from the set of anticipatory search terms by the user.

Specific embodiment #4 recites: A computer implemented method for providing a preview version of a book, over a computer network, said method comprising the steps of: receiving a request from a user, over said computer network, for examining said preview version of the book; configuring said book into a plurality of content segments, each content segment in the plurality of content segments comprising at least one page, wherein a sequential arrangement of the plurality of content segments defining an original configuration of the book; initiating a preview session and displaying a first-selected content segment from said plurality of content segments in a preview window in response to said request; displaying a second-selected content segment from said plurality of content segments, subject to at least one preview criterion, during said preview session upon receiving a prompt from the user to continue browsing; controlling the availability of a next set of successively-selected content segments from said plurality of content segments during said preview session.

The above specific embodiment can be combined with previously listed features of the invention to yield additional embodiments. A description of some of the additional features follows. The first-selected content segment, the second-selected content segment, and/or any of the successively-selected content segments may be randomly selected from the plurality of content segments. The second-selected may not be in sequential order to the first-selected content segment with reference to the original configuration of the book. Alternately the second-selected content segment may be consecutive to the first-selected content segment according to the original configuration of the book. The preview criterion may comprise displaying an advertisement or may require completion of a qualifying activity such as—watching an advertisement, participating in a survey, writing a book review, recommending a book, responding to a sales promotion, accepting a marketing offer, making a purchase, buying a subscription, redeeming a coupon, redeeming an award, redeeming loyalty points, and redeeming a credit.

Depending on context, any of the features listed under one specific embodiment may be combined with other features or other specific embodiments to yield additional embodiments. Additional advantages and benefits of this invention will become apparent from the accompanying drawings and the ensuing description.

BRIEF DESCRIPTION OF THE DRAWINGS

FIG. 1 is a structural illustration of a book (book 200) in the form of a page-array 203 showing the book in its original configuration wherein the 108 pages of the book are arranged in sequential or consecutive order within the cells of the page-array;

FIG. 2 is a structural illustration of book 200 in the form of a segment-table 204 showing the original configuration of book 200 as a compilation of a plurality of content segments (12 content segments), wherein each content segment includes a plurality of pages (9 pages), and wherein the content segments and the pages in each content segment are arranged in a sequential or a consecutive order;

FIG. 3 illustrates a shuffled configuration of book 200 in the form of a page-array 207 wherein the adjacent content segments (or page batches) have been swapped;

FIG. 4 illustrates a shuffled configuration of book 200 in the form of a segment-table 208 wherein the content segments have been swapped, while the pages comprising each content segment retain their sequential order;

FIG. 5 shows another shuffled configuration of book 200 in the form of a segment-table 214 wherein the content segments are shuffled in a random order;

FIG. 6 shows still another shuffled configuration of book 200 in the form of a segment-table 216 wherein the first content segment is retained in its original position and the remaining content segments are shuffled in a random order;

FIG. 7 shows yet another shuffled configuration of book 200 in the form of a segment-table 218 wherein the content segments are retained in their original sequential order but the constituent pages comprising each content segment have been shuffled in a random order;

FIG. 8 shows a page-array 219 displaying an exemplary shuffled configuration of book 200 with the rearranged or shuffled pages according to the segment-table 217 shown in FIG. 7.

FIG. 9 shows another shuffled configuration of book 200 in the form of a segment-table 222, wherein a subset of the content segments is retained in its original position and the remaining content segments have been shuffled in a random order;

FIG. 10 shows a page-array 223 displaying an exemplary shuffled configuration of the book 200 according to the segment-table 222 shown in FIG. 9.

FIG. 11 shows the original configuration of book 200 in the form of a segment-table 224 as a compilation of a plurality of content segments (27 content segments), the content segments comprising 4-pages each, and wherein the content segments and the pages in each content segment are arranged in sequential or consecutive order;

FIG. 12 shows the original configuration of book 200 in the form of a segment-table 226 representing a compilation of plurality of content segments (27 content segments) of variable length, wherein the 27 content segments have segment lengths ranging from 3-pages to 5-pages, and wherein the content segments and the pages in each content segment are arranged in sequential or consecutive order;

FIG. 13 shows the original configuration of book 200 in the form of a segment-table 228 as a compilation of plurality of content segments (24 content segments), wherein the 24 content segments have segment lengths ranging from 1-page to 9-pages, and wherein the content segments and the pages in each content segment are arranged in sequential or consecutive order;

FIG. 14 illustrates a shuffled configuration of book 200 in the form of a segment-table 232 wherein the 24 content segments defined in FIG. 13 are shuffled in a random order, while the pages comprising each content segment retain their sequential order;

FIG. 15 illustrates another shuffled configuration of book 200 in the form of a segment-table 234 wherein a subset of the 24 content segments defined in FIG. 13 is retained in its original order, and the remaining content segments are shuffled in a random order, while the pages comprising each of the 24 content segments being retained in their sequential order;

FIG. 16 illustrates another shuffled configuration of book 200 in the form of a segment-table 236, wherein the odd-numbered content segments (Q1, Q3, . . . Q23) are grouped together and positioned ahead of the even-numbered content segments (Q2, Q4, . . . Q24) with all the content segments comprising sequential page batches (i.e., sequentially arranged pages);

FIG. 17 illustrates another shuffled configuration of book 200 in the form of a segment-table 238, wherein odd-numbered content segments are grouped together and positioned ahead of even-numbered content segments like FIG. 16; in addition, certain content segments comprise shuffled page batches;

FIG. 18 illustrates another shuffled configuration of book 200 in the form of a segment-table 265 further defining a content segment permissions protocol, wherein certain content segments of book 200 are excluded from the shuffled configuration, and at least a portion of the permitted content segments are shuffled in random order;

FIG. 19 shows an exemplary preview map of book 200 in the form of an array 275 showing the display order of the pages in accordance with the defined attributes of FIG. 18 along with interspersed advertisements;

DETAILED DESCRIPTION OF THE INVENTION

Figure 20:
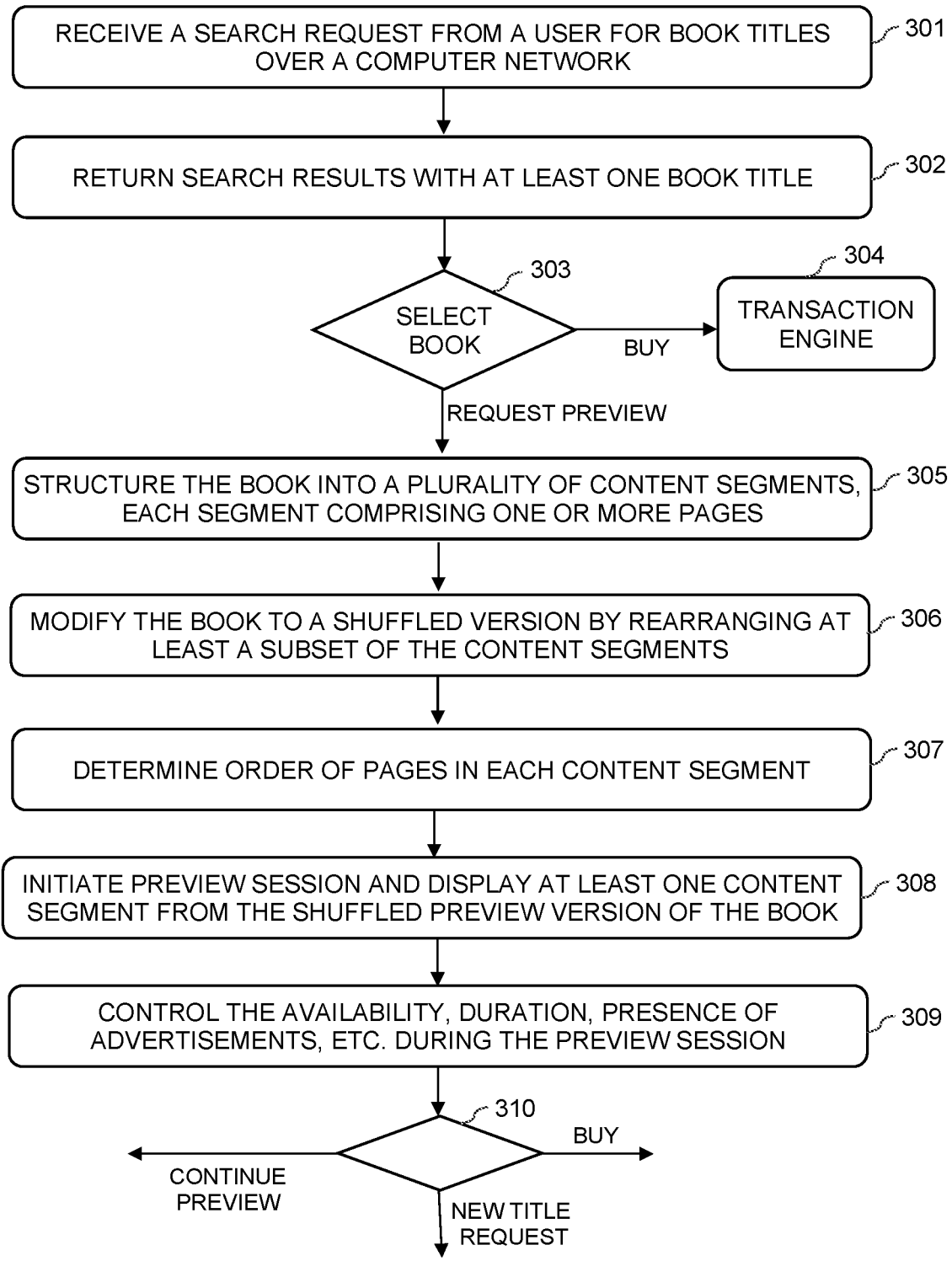
FIG. 20 is a flowchart summarizing the method steps for practicing the invention according to an embodiment thereof in displaying a preview version of a book in a shuffled configuration over a computer network along with intervening ad placements.

In the following detailed description, various aspects and features of the present invention are described by utilizing examples, figures, tables, arrays, content maps, and other concepts; however, it will be apparent to those skilled in the art that these conceptual aids are provided by way of illustration, to convey a thorough understanding of the present invention, and not by way of limitation. It will also be apparent to those skilled in the art that the present invention is applicable to a broader field than the exemplary embodiments set forth herein. It will be realized that the order of presentation for describing the invention is not necessarily the functional order for accomplishing the invention. Any mention of trade names or trademarks is done for illustration and clarification purposes, which remain the property of their respective owners.

Definitions of some of the key concepts, phrases and instrumentalities utilized in the present invention are included to provide a general understanding of the invention. The term "computer system" is used broadly as a device capable of processing, storing, accessing, and/or displaying information and includes general purpose as well as special purpose data processing machines, computing and communication devices, and computer systems that are standalone, embedded, or connected regardless of their physical size, portability, or operating system. The term computer system encompasses web servers, and client computers including desktop computers, laptop or notebook computers, mobile phones, smartphones, tablets, and electronic reader devices generally referred to as e-readers. A display device is either integrated with the computer system or hooked up peripherally through wires or wirelessly. The computer system may be programmable using various computer programming languages or may be implemented using specially programmed hardware. Computer systems may be equipped or enabled to communicate with each other over a computer network. The term "computer network" also encompasses computer network systems such as the internet; information systems; cloud computing; edge computing; and other web services.

Terms such as—data, data containers, files, programs, text, graphics, music, video, flags, bits, values, characters, strings, numbers—describing specific information types, products, representations, or elements thereof are used in consistency with their common-use by persons of ordinary skill in the art. It will be recognized by those skilled in the art that these representations of data, information, or electronic content take the form of electrical, magnetic, or optical signals capable of being stored, accessed, displayed, copied, transferred, deleted, modified, combined, reproduced, captured, and/or otherwise manipulated through mechanical, electrical, and operational components of a computer system.

Terms such as—information products, electronic content, electronic works, electronic publications, digital content, digital works, digital property, digital publications, multimedia works, multimedia content—refer broadly to all data or information that can be represented and transmitted electronically or digitally. While the invention will be described with respect to a preview version of a book, in general, information products may take the form of printable content, audio content, video content, multimedia or combinations thereof. Information products or digital works can take a variety of forms, including books, drawings, images, photographs, audio recordings, songs, music, video recordings, movies, software programs, animation, multimedia works or interactive games. The information product can be any combination of data arranged or structured in a suitable format according to content or data type, size, compression level, or other technical criteria.

The term "book" is used generically to mean—paper books, electronic books (e-books), audio books, magazines, catalogs, research papers, and other published materials that may contain—alphabets, letters, words, text, images, artwork, figures, graphs, charts, drawings, diagrams, graphics, photographs, formulae, equations, symbols, spreadsheets, tables, data, etc. in any language or combination of languages. Books and other information products may also include audio and video content such as music, songs, audio books, video clips, etc. An information product can be either homogeneous (comprising a single data or content type) or heterogeneous (comprising a plurality of data elements or content types).

The terms "original version" or "original configuration" of a book or an information product refer to an original form of the book or the information product in its unaltered or original state that was intended for consumption or distribution by its creators. All content portions in the original configuration of the book are, by definition, in an original or sequential order.

The terms "shuffled version" or "shuffled configuration" of a book or an information product refer to a modified form of the book or the information product that is rendered or displayed in an "out-of-sequence", "rearranged", or "shuffled" form relative to the original version of the book or the information product.

The shuffled version of a book implies that at least a portion of the book is not arranged in a sequential order. One approach for creating a shuffled version of a book may be to rearrange the pages of the book in a random order. In some instances, however, such an approach may not always yield a meaningful appreciation of the contents of the book or facilitate making a purchase decision. The present invention comprises the step of apportioning or deconstructing the original form of a book into meaningful and discrete chunks or content portions ("content segments") that may be read, skim-read, or reviewed independently by a user during preview. The content segments may range from one paragraph to several pages in length.

The term "shuffled preview version" of a book or an information product refers to a preview version of the book that is rendered or displayed in a modified, out-of-sequence, or shuffled form relative to the original configuration of the book. The shuffled preview version may be identical to the shuffled version of the book or may be modified further to include only certain portions from the shuffled version of the book. The shuffled preview version of the book may also include advertisements or commercial messages.

According to an embodiment of the invention, the original configuration of a book is apportioned or structured into discrete content segments or a plurality of content segments, and the shuffled configuration of the book is created by "rearranging" or "shuffling" the plurality of content segments. The terms "shuffling" or "rearranging" of content segments indicate that the sequential arrangement of the content segments representing the original configuration of the book has been modified or transformed to yield a shuffled configuration of the book. The rearranging of the content segments can be implemented by various techniques or mechanisms including—swapping relative positions of the content segments, relocating a content segment from an original position to a relocated position, substituting one content segment with another content segment, randomly or pseudo-randomly arranging a group of sequential content segments. It will be realized that relocating, swapping, substituting, and randomizing of content segments can be repeated or applied in a cumulative manner in any combination to modify the original configuration of the book to the shuffled configuration of the book. Furthermore, in addition to rearranging the content segments, the constituent subsegments or pages in each content segment may be preserved in a sequential order or may also be rearranged by relocating, swapping, substituting, and/or randomizing constituent subsegments (or pages) within the content segment.

An original configuration of the book may be modified by employing a plurality of structuring formats and a plurality of rearrangement techniques, thus yielding a plurality of shuffled configurations of the book. The publisher or the content provider may specify or establish predefined criteria for—structuring the book into a plurality of content segments, the rearranging of the plurality of content segments, and the rearranging of constituent subsegments within each content segment from the plurality of content segments.

Furthermore, the shuffled configuration of the book may be customized according to user input to yield a plurality of preview versions of the book. The terms "customized shuffled configuration" or "customized shuffled preview version" of the book, refer to the version of the book that is generated in response to a request or input from the user. The input provided by a user may include a search term, a key phrase, a specific content section, or another attribute. For instance, upon providing a content search term the user may be presented with a customized shuffled preview version of the book, wherein the most relevant content segments (i.e., relevant search hits corresponding to the search term) from the book are included. The relevant content segments may be arranged (or rearranged) in accordance with their relevance ranking or just presented in a shuffled form. Thus, a plurality of customized shuffled preview versions of the book can be generated in response to a plurality of search term inputs received from one or more users.

According to an embodiment of the invention, a customized shuffled preview version of a book is generated in response to a user's request for a specific section or page range of a book for previewing, inspection, and/or making a purchase decision. This feature may be useful, for example, in situations where the user initially examines a shuffled preview version of the book and finds a particular section or page range that is of critical interest, which the user may want to explore further before making a purchase commitment. For instance, the user-specified page range may be made available in a variety of preview formats including—the specific page range can be provided in a shuffled form, the specific page range can be provided in a sequential form with intervening advertisements, the provider may also provide the specific page range in a sequential form by charging a small fee, or by requiring a subscription, or by requiring redemption of accumulated loyalty points or credits, or by another method.

The shuffled preview version of a book can be made accessible to a user or reader in a plurality of chunks or groups, wherein only a subset of the content segments from the shuffled version of the book are loaded at a time or shown for previewing in a preview session. An additional group (or subset) of the content segments may be loaded for previewing upon receiving a prompt from the user to continue browsing.

The shuffled version of the book may be accessed on a computer system or device having a screen capable of rendering and recreating information products or digital content. Additionally, the screen can be a touchscreen operable by a human finger or a stylus pen. The term "recreation" or "rendering" of a book or information product used in this application refers broadly to render, display, read, interpret or playback of an information product using appropriate computer devices for such recreation or rendering, including for example, integrated computer devices, such as a personal computer, a notebook computer, a wearable device, a mobile device, a tablet computer, a TV, an electronic reader, and a smartphone. The terms "electronic reader", or "e-reader", or "e-book reader" in the present application refer to electronic reading devices used for downloading e-books such as those sold under the Amazon Kindle brand or the Barnes and Noble Nook brand. The terms "reader", "user", "consumer", and/or "customer" refer to a human user, reader, or person in this application. It will be realized that an e-book is capable of being stored, recreated, accessed, called, read, displayed, or played-back through an interpretive software program, web browser, or reading app, installed on suitable hardware or computer device, such as, a personal computer, a notebook, a tablet, a smartphone, or an e-reader.

To provide a clear understanding of the features and embodied principles of the invention, the ensuing description utilizes certain illustrative representations of books and information products, tables, arrays, content maps, preview maps, exemplary websites, webpages, web objects, book titles, preview versions, original configurations, shuffled configurations, and other instrumentalities. It will be realized that any descriptive examples in conjunction with any of the Figures included herein are meant as conceptual and illustrative tools and not to impart any explicit or implicit restrictions or limitations to the specific embodiments described herein, or to the broader invention, or to its field of application. Layouts of webpages shown in the Figures are provided for illustration purposes to provide a general understanding of the principles of the invention. For sake of conciseness and economy not all combinations of features have been presented in exhaustive detail. In fact, features illustrated or described as part of one embodiment may be combined with another embodiment, unless prohibited by context, to yield a still further embodiment. It will be realized that other layout variations with alternate—arrays, tables, preview maps, features, webpages, shuffled configurations, windows, elements, buttons, blocks, links, input boxes, objects, graphics, images, tiles, and/or menus are within the scope of the teaching.

It will be realized that the various page-arrays, segment-tables, webpages, and flow charts, depicted in the Figures herein in conjunction with the ensuing description are used as conceptual aids to provide a further understanding of certain principles of the invention. It will be realized that while the preview content of a book may be displayed on a computer or electronic device, the book may be sold as a physical paper book, an e-book, an audio book, or in another format.

FIG. 1 shows a page-array 203 representing an original or sequential configuration of book 200 comprising 108 pages. Page-array 203 includes twelve rows and nine columns with 108 boxed cells. The twelve rows of page-array 203 are indicated by alphanumeric references r1 through r12. The boxed cells of page-array 203 are designated with italicized reference numerals from 1' to 108' placed above the boxed cells, whereas the boxed cells themselves are populated with page numbers 1 through 108 denoting the pages of the book 200. The boxed cell designations or cell identifiers 1'-108' define the display order of the cells and the corresponding cell occupants or content therein and are designated in ascending numerical order from left to right in consistency with the traditional reading order for the English language, such that first cell 1' is displayed before second cell 2', second cell 2' is displayed before third cell 3', and so on. Indicator 205 is provided to indicate the display sequence from the preceding row to the next row in page-array 203 to graphically show that the rightmost cell or last cell in any row is followed by the first or leftmost cell in the next row. Thus, for example rightmost cell 9' in row r1 is followed by leftmost cell 10' in row r2.

Each boxed cell of page-array 203 is occupied by a page of the book 200, and the pages 1 through 108 are populated in the corresponding boxed cells 1' through 108' and displayed according to the display order of the cells in which they are domiciled. Page-array 203 shows the display order of the 108 pages of book 200 in its original configuration, where the pages are arranged in a sequential or consecutive order. Accordingly, the numerical order of the pages is consistent with the sequential display order represented by the italicized cell designations (shown above the cells), signifying the sequential nature of all the pages or content of book 200, with page 1 occupying the first cell 1', page 2 occupying the second cell 2', page 3 occupying the third cell 3', and so on, with page 108 occupying the last (or $108^{th}$) cell 108' of page-array 203. In other words, there is a one-to-one correspondence between the display order represented by the cell designations 1'-108' and the arrangement of the pages 1-108. The page order for book 200 in FIG. 1 can be expressed by page sequence notation {1-108} indicating that pages 1 through 108 are arranged in a sequential or consecutive order.

FIG. 2 shows an original configuration of book 200, in the form of a segment-table 204, showing the book apportioned into a plurality of content segments for clarifying certain aspects of the invention. The plurality of content segments comprises 12 segments numbered S1 through S12, wherein each content segment includes 9 pages. Segment-table 204 includes four columns—column 210 titled "Display Order," column 220 titled "Content Segments," column 230 titled "Page Batch," and column 240 titled "Pages/Segment." Segment-table 204 contains twelve rows labeled 1 through 12 under column 210 representing the display order or sequence of the content segments S1 through S12 in the twelve rows under column 220 titled "Content Segments." The content segments, S1 through S12 are arranged seriatim or in sequential or consecutive order in accordance with the Display Order listed in column 210, such that, S1 is displayed first, S2 is displayed second, S3 is displayed third, and so on. Thus, there is a one-to-one correspondence between the Display Order sequence (column 210) and the sequence of Content Segments (column 220). Since content segments S1 through S12 are arranged in a sequential order, the entire content segment sequence can be represented as {S1-S12} according to the consecutive or sequential notation defined above. The pages included with each content segment are listed under column 230 titled "Page Batch." Each content segment S1 through S12 in segment-table 204 comprises nine (9) pages as shown in column 240 titled "Pages/Segment." As shown in FIG. 2, in addition to the content segments being in sequential order, as denoted by the notation {S1-S12}, the constituent pages in each content segment or each "Page Batch," (or generically sub-segments comprising a content segment) are also arranged in a sequential or consecutive order, such that S1 comprises page series {1-9}, S2 comprises page series {10-18}, S3 comprises page series {19-27}, and so on as denoted in column 230. The entire sequence of the pages can still be represented by the notation {1-108} since the pages in each segment are in sequential order and the segments themselves are also in sequential order. Thus, according to segment-table 204 book 200 exhibits sequential integrity as all the content segments as well as the sub-segments (pages) are arranged in a sequential order. It will be appreciated that assigning numerical values or numbering the plurality of content segments facilitates subsequent rearrangement of the content segments, as the numerical values can be subjected to random or pseudo-random arrangement to provide a shuffled arrangement of the numbered content segments.

Nonetheless, it should be emphasized that the page-array and the segment-table representations shown in FIGS. 1 and 2, respectively, are meant as illustration aids to facilitate a better understanding of some of the aspects of the invention as will become clear from additional examples, figures, and description below. It will be realized that a book can be apportioned or structured into a plurality of content segments in a variety of potential formats and/or segmenting approaches. It will be realized that the content segments can be of any length comprising, for example, paragraphs, pages, or group of pages, or displayed screen views, or another content representation. Apportioning or deconstructing the book into plurality of content segments may involve defining content formatting variables including—determining the total number of content segments, defining the size or length of each content segment, defining the size-distribution of the content segments, incorporating content segments of equal lengths and unequal lengths, etc. In some embodiments, the length of the content segments may be assigned by a user subject to certain limitations and rules established by the content provider.

Referring to FIG. 3, there is shown an exemplary shuffled configuration of the book 200 in the form of a page-array 207 depicting the shuffled display order of the pages of the book 200. As will be apparent, page-array 207 has the same cell format as page-array 203 of FIG. 1, comprising twelve rows and nine columns with 108 boxed cells designated from 1' to 108'. Unlike page-array 203 of FIG. 1, however, the cell occupants or the pages populating the cells of page-array 207 have been rearranged or shuffled such that the page-groups are no longer in a sequential order. Page-array 207 shows a shuffled configuration wherein the page groups in adjacent rows of the original configuration have been swapped. Specifically, page series {1-9} originally in a row r1 has been swapped with the page series {10-18} that was originally in row r2, similarly, page series {19-27} that was originally in row r3 has been swapped with the page series {28-36} that was originally in row r4, and so on. It will be apparent that in the exemplary shuffled configuration represented by page-array 207, the pages from one row to another are not in sequential order due to swapping of the rows, nonetheless, the pages in each row remain in a sequential order. The shuffled configuration represented by the page-array 207 can be denoted as {10-18, 1-9, 28-36, 19-27, 46-54, 37-45, 64-75, 55-63, 82-90, 73-81, 100-108, 91-99} signifying that while the twelve page-groups are not in a sequential order, i.e. exhibit a shuffled order, the pages within each page-group or page batch are arranged in a sequential order. The non-sequential or shuffled order of the pages depicted by page-array 207 can be represented generically as {SHFL (1-108)} indicating that the pages 1-108 are not in a sequential order but have been rearranged or shuffled. The shuffled version or configuration of book 200 represented by the shuffled order depicted in page-array 207 can be utilized for previewing and purchase evaluation purposes.

FIG. 4 shows segment-table 208 featuring an exemplary shuffled configuration of book 200 derived by modifying the original configuration of book 200 shown in FIG. 2 (segment-table 204) by swapping of adjacent content segments. Segment-table 208 includes four columns titled similarly to segment-table 204 of FIG. 2. As shown in segment-table 208, the content segments displayed in column 220 are not in sequential order but adjacent content segments have been swapped. Specifically, segment S2 is displayed before segment S1, segment S4 is displayed before segment S3, segment S6 is displayed before segment S5, and so on. Accordingly, the non-sequential or shuffled order of the content segments depicted by segment-table 208 can now be represented as {S2, S1, S4, S3, S6, S5, S8, S7, S10, S9, S12, S11}. The shuffled page-groups corresponding to the shuffled sequence of content segments are presented in column 230 and the shuffled order thereof can be represented as {10-18, 1-9, 28-36, 19-27, 46-54, 37-45, 64-75, 55-63, 82-90, 73-81, 100-108, 91-99}. It will be realized that the rearranged or shuffled page order in segment-table 208 is the same as the page order shown in page-array 207 in FIG. 3. In generic terms, the shuffled arrangement of content segments can be represented as {SHFL (S1-S12)} and the shuffled arrangement of the pages can be written as {SHFL (1-108)}.

It would be thus apparent from the above that the shuffled configuration of an information product can be represented either in the form of a page-array or as a segment-table or in both formats. Assigning numerical values or numbering the content segments (e.g., S1 through S12) facilitates subsequent rearrangement of the content segments (page batches), as the numbered content segments can be subjected to various permutational arrangements to derive a plurality of shuffled configurations as will become clear from the additional embodiments described hereinafter.

FIG. 5 shows segment-table 214 presenting another exemplary shuffled arrangement of the book 200. Segment-table 214 has the same header row or column titles as the preceding segment-tables. Specifically, segment-table 214 shows a random arrangement of the content segments in column 220, wherein content segments S1 through S12 have been shuffled in a random order resulting in a segment sequence that can be represented as {S11, S3, S12, S10, S9, S1, S5, S4, S7, S8, S2, S6}. The shuffled page-groups ("Page Batch") corresponding to the respective content segments are shown in column 230 and the entire page sequence can be represented as {91-99, 19-27, 100-108, 82-90, 73-81, 1-9, 37-45, 28-36, 55-63, 64-72, 10-18, 46-54}. It will be apparent that many other randomized arrangements of the content segments S1 through S12 are possible. As noted above, in generic terms the shuffled arrangement of content segments can be represented as {SHFL (S1-S12)}, and the shuffled arrangement of the pages can be written as {SHFL (1-108)}.

FIG. 6 shows segment-table 216 presenting another exemplary shuffled version of the book 200 having the same header row or column titles as segment-tables shown in FIGS. 4-5. Specifically, segment-table 216 shows a specific arrangement of the content segments in column 220, wherein content segment S1 is assigned the first location or configured to be displayed first but content segments S2 through S12 have been shuffled in a random or pseudo-random order that can be represented as {S1, S7, S10, S6, S8, S4, S12, S3, S11, S9, S5, S2} indicating that S1 is displayed first followed by a shuffled arrangement of content segments S2 through S12. The shuffled page series corresponding to the shuffled order of content segments is shown in column 230 of FIG. 6 and can be represented as {1-9, 55-63, 82-90, 46-54, 64-72, 28-36, 100-108, 19-27, 91-99, 73-81, 37-45, 10-18}. A generic representation of the randomized sequence of content segments shown in FIG. 6 can be expressed {S1, SHFL (S2-S12)} implying that S1 is displayed first while the subsequent content segments S2-S12 are shuffled. The page order can be generically notated as {1-9, SHFL (10-108)}.

The segment-tables representing shuffled configurations of book 200 in FIGS. 4-6, exhibit exemplars wherein the constituent content segments have been rearranged and displayed in a shuffled order. It will be realized, however, that a shuffled configuration can be obtained without necessarily rearranging the content segments.

FIG. 7 shows segment-table 218, illustrating another exemplary shuffled configuration of book 200, wherein the content segments S1 through S12 are maintained in their original consecutive order, however, the sub-segments or pages comprising the content segments are arranged in a shuffled format. Segment-table 218 has the same header row or column titles as segment-tables in FIGS. 4-6. As listed in the rows under column 220, content segments S1 through S12 are retained in their original sequential order, however, the pages (or subsegments) within each of the content segments are shuffled as represented by notations {SHFL (1-9)}, {SHFL (10-18)}, {SHFL (19-27)}, . . . , {SHFL (100-108)}, in the Page Batch column 230. The pages comprising each of the content segments can be shuffled in a variety of permutational arrangements. A specific arrangement of the pages is shown in a page-array format in FIG. 8.

FIG. 8 shows page-array 219 having twelve rows and nine columns with 108 boxed cells to further illustrate an exemplary shuffled arrangement of pages implied by column 230 of segment-table 218 shown in FIG. 7. As before, the boxed 108 cells of page-array 219 are designated from 1' to 108' placed above the boxed cells, whereas the boxed cells themselves are populated with pages 1 through 108 according to their shuffled order. As shown in page-array 219, rows r1 through r12 represent content segments S1 through S12, respectively. It will be readily apparent, however, that the pages in each row are not in a consecutive or sequential order but are shuffled. The shuffled order of pages can be readily noticed by the mismatch between the page number displayed within the boxed cell and the italicized boxed cell designation displayed above the boxed cell. For example, in row r1 the consecutive cells 1' through 9', contain pages 1 through 9 in a non-sequential or shuffled order in the following order of appearance —5, 2, 1, 3, 9, 7, 6, 4 and 8. Similarly all the other rows, r2 through r12 display a shuffled page order.

FIG. 9 shows segment-table 222 illustrating another exemplary shuffled version of book 200, wherein certain content segments are arranged in a shuffled order; and in addition, certain constituent sub-segments are arranged in a shuffled order. Specifically, as shown in column 220, content segments S1-S3 are retained at their original positions while content segments S4 through S12 have been rearranged or shuffled. In addition, the page batches associated with content segments S3, S7, and S10 are shuffled as delineated in column 230. Utilizing the notation for presenting page order, the shuffled page order delineated in segment-table 222 can be represented as {1-9, 10-18, SHFL (19-27), 91-99, 73-81, 37-45, 100-108, 46-54, 64-72, 28-36, SHFL (82-90), SHFL (55-63)}. Thus, it will be apparent that at least a subset of the content segments, and at least a subset of content subsegments can be shuffled for providing a shuffled version of a book or information product.

FIG. 10 shows page-array 223 having twelve rows and nine columns with 108 boxed cells to further illustrate an exemplary shuffled arrangement of pages implied by column 230 of segment-table 222 shown in FIG. 9 and described above. As before, the boxed 108 cells of page-array 223 are designated from 1' to 108' placed above the boxed cells, whereas the boxed cells themselves are populated with the pages 1 through 108 ordered consistent with the arrangement delineated in FIG. 9. The rows r1 through r12 of page-array 223, display the order of the respective Page Batch listed under column 230 of segment-table 222. For example, row r1 of page-array 223 exhibits pages 1 through 9 arranged in a sequential order as indicated by page batch notation {1-9} in FIG. 9; row r3 exhibits pages 19 through 27 in a shuffled order as indicated by page batch notation {SHFL (19-27)} in FIG. 9; and row r12 exhibits pages 55 through 63 in a shuffled order as indicated by page batch notation {SHFL (55-63)} in FIG. 9. As shown in page-array 223, the shuffled configuration of book 200 includes a combination of—page arranged in a sequential order (in one or more rows), pages arranged in shuffled order (in one or more rows), pages in sequential order from one row to next, and pages in shuffled order from one row to next.

In the exemplary segment-tables shown in FIGS. 2, 4-7, and 9, content segments S1 through S12 comprise 9-pages each; it will be realized, however, that a variety of segmentation plans or models can be devised for book 200. FIGS. 11-13 show alternate content segmentation examples for the 108-page book 200 showing content segments of different lengths. FIG. 11 shows segment-table 224 representing book 200 in its original configuration wherein the constituent content segments are each 4-pages long. Segment-table 224 has the same header or column titles as prior segment-tables (e.g., FIGS. 4-7). As shown, segment-table 224 features twenty-seven content segments labeled T1 through T27 arranged in separate rows under the Content Segments column 220. Segment-table 224 represents the original, sequential configuration of book 200, and the content segments T1-T27 are arranged in a sequential or consecutive order, in congruence with the order listed in the Display Order column 210. The pages in each content segment are listed under the Page Batch column 230 and are also arranged in a sequential or consecutive order as shown by notations {1-4}, {5-8}, {10-12}, and so on. The number of pages in each segment are listed under the Pages/Segment column 240. As will be apparent from columns 220 and 240, the content segments T1-T27 are each 4-pages long.

FIG. 12 shows another exemplary segment-table 226 representing book 200 in its original configuration, according to another segmentation plan, wherein the constituent content segments are not necessarily of equal lengths. Segment-table 226 features twenty-seven content segments labeled U1 through U27 arranged in separate rows under Content Segments column 220. The content segments U1-U27 are arranged in sequential or consecutive order in congruence with the order listed in the Display Order column 210. The pages included with each content segment are also arranged in sequential or consecutive order and are listed under the Page Batch column 230. The number of pages in each segment are listed under the Pages/Segment column 240. As will be apparent from column 240, the content segments are of variable length including segments that are 5-pages long, 4-pages long and 3-pages long. Specifically, content segments U1, U4, U7, U10, U13, U16, U19, U22, and U25 are each 5-pages long; content segments U2, U5, U8, U11, U14, U17, U20, U23, and U26 are each 4-pages long; and content segments U3, U6, U9, U12, U15, U18, U21, U24, and U27 are each 3-pages long.

FIG. 13 shows still another exemplary segment-table 228 representing the 108-page book 200 in its original configuration wherein the content segments range from 1-page long to 9-pages long. Generically, the content segments may be sized between minimum and maximum length values. Segment-table 228 features twenty-four content segments labeled Q1 through Q24 arranged in separate rows under Content Segments column 220. Since segment-table 228 represents the original configuration of book 200, the content segments in column 220 are arranged seriatim (in sequential or consecutive order) in congruence with the Display Order column 210. In addition, the pages within each content segment shown in the Page Batch column 230, are also arranged in sequential or consecutive order as apparent by notations {1-7}, {8-12}, {13-16}, and so on. The number of pages in each content segment from Q1 to Q24 are listed under column 240. Specifically, content segment Q14 is 1-page long; content segments Q11 and Q24 are each 2-pages long; content segments Q6, Q7, Q13, Q16, Q20, and Q21 are each 3-pages long; content segments Q3-Q5 are each 4-pages long; content segments Q2, Q9, Q10, Q18, Q22, and Q23 are each 5-pages long; content segments Q8 and Q19 are each 6-pages long; content segments Q1 and Q17 are each 7-pages long; content segment Q 12 is 8-pages long; and, content segment Q15 is 9-pages long. While FIG. 13 denotes content segments of variable length in terms of number of pages, it will be realized that content segments may be defined in terms of a paragraph, a plurality of paragraphs, a single page, or a group of pages.

It will be realized that the exemplary content segmentation plans described in the Figures herein are illustrative examples, and a variety of content segment definitions (plans) may be implemented for configuring or organizing books and other information products. For instance, each page of a book can be defined as an individual content segment, or the content segment may be defined as having a certain number of pages which may be set by the publisher or randomly assigned. Furthermore, each content segment may comprise a plurality of sub-segments. Thus, the content segments comprising multiple pages of a book may be deemed as assemblage of multiple sub-segments (individual pages) of the book. As will now be apparent, structuring a book as a plurality of content segments is functionally effective in creating shuffled versions of books for previewing and purchase evaluation purposes. FIGS. 14-16 show exemplary shuffled configurations of book 200 based on the content segment definitions of FIG. 13.

FIG. 14 shows segment-table 232 illustrating an exemplary shuffled version of book 200 wherein the variable length content segments Q1 through Q24 (defined and illustrated in FIG. 13) have been rearranged in a random order. Segment-table 232 has the same header or column titles as prior segment-tables. Specifically, segment-table 232 shows a random arrangement of the content segments Q1 through Q24, wherein Q6 is displayed first, Q23 is displayed second, Q16 is displayed third and so on as listed in the Content Segments column 220 along with the corresponding display order listed in column 210. Page Batch column 230 represents the page-groups and their arrangement corresponding to the content segments. A generic representation of randomized order of content segments Q1 through Q24 can be expressed as {SHFL (Q1-Q24)}. It will be noted that while the content segments Q1 through Q4 are shuffled, the pages in a page batch corresponding to a given content segment remain in a sequential order as depicted by the page series in curly brackets in column 230. The order of the pages according to segment table 232, can be represented by the notation {25-27, 102-106, 70-72, 107-108, 1-7, 73-79, 97-101, 60, 28-30, 37-41, 13-16, 31-36, 85-90, 47-48, 8-12, 21-24, 49-56, 17-20, 94-96, 61-69, 42-46, 91-93, 57-59, 80-84}. It will be realized that segment-table 232 illustrates just one possible random or pseudo-random arrangement of the content segments in column 220, and a large number of permutations or randomized arrangements of the content segments Q1 to Q24 are possible.

FIG. 15 shows segment-table 234 illustrating another exemplary shuffled version of book 200, wherein some content segments have been retained in their original sequential order while others are displayed in a random order. Specifically, content segments Q1-Q3 have been retained in their original position while content segments Q4 through Q24 have been randomly rearranged or shuffled. Segment-table 234 has the same header or column titles as other segment-tables in the preceding Figures. The order of content segments in segment-table 234 can be expressed as {Q1-Q3, SHFL (Q4-Q24)}. While the content segments Q4 through Q24 are shuffled, the page-groups corresponding to all the content segments (Q1 through 24) are maintained in a sequential order as depicted by the page series notation in curly brackets in column 230 of segment-table 234.

FIG. 16 shows segment-table 236 illustrating yet another exemplary shuffled version of book 200, wherein odd-numbered content segments are grouped together and positioned ahead of even-numbered content segments. Segment-table 236 has the same header or column titles as segment-tables in the preceding Figures. Specifically, the order of content segments shown in column 220 comprises odd-numbered content segments followed by even-numbered content segments that can be represented as {Q1, Q3, Q5, . . . , Q23; Q2, Q4, Q6, . . . , Q24}. The order of the page-groups corresponding to the content segments is shown in Page Batch column 230. It will be noted that while the content segments are shuffled in a defined manner, the page-groups corresponding to the content segments remain in a sequential order as depicted by the page series notation in curly brackets in column 230 of segment-table 236.

FIG. 17 shows segment-table 238 illustrating still another exemplary shuffled version of book 200, wherein odd-numbered content segments are positioned ahead of even-numbered content segments like the arrangement shown in FIG. 16; however, according to segment-table 238 not all the content segments include sequential page batches. The order of the page-groups corresponding to the content segments is shown in Page Batch column 230, wherein the page-groups that are at least 7-pages long have been shuffled, i.e., page groups comprising 7-pages, 8-pages, and 9-pages have been shuffled. Thus, page-groups corresponding to content segments Q1, Q12, Q15, and Q17 have been shuffled.

The segment-tables representing shuffled configurations of book 200 in preceding Figures, exhibit exemplars wherein all the content segments comprising the original configuration are included in the shuffled configuration. It will be realized, however, that a preview version of a book may comprise a reasonable or even substantial portion of the original work in a shuffled form without necessarily including all the content segments from the book.

In embodiments, the shuffled preview version of the book may comprise an advertisement, an infomercial, a commercial message, and/or a sales promotion. An advertisement or similar content may be placed in between two adjacent content segments of the shuffled configuration of the book or may be displayed at any time during the preview session. Ads may be displayed at a predetermined frequency during the preview session. An advertisement may also be displayed at the beginning of the preview session. A set of content segments in the shuffled configuration of the book may also be tagged for display with an accompanying ad or commercial content, wherein the ad precedes the tagged content segment. In some embodiments, ads may be displayed during a preview session after an ad-free preview limit is reached.

FIG. 18 provides an illustration of a shuffled preview version of book 200 in the form of preview-table 265, wherein only a portion of the content segments are made available for display or preview to a user or requester. In essence, preview-table 265 defines a set of control attributes for providing a specific shuffled preview version of the book. The preview-table 265 has a similar structure to the segment-tables in previous figures, except that it additionally includes column 250 defining a content segment permissions protocol, and column 260 listing an ad lineup defining a schedule of advertisements that may be shown with the preview version of the book. Specifically, a substantial portion of the constituent content segments Q1-Q16, representing about two-thirds of the overall pages of the book 200, are included in the shuffled preview version. As depicted in FIG. 18, content segment Q1 has been retained in the original position, while content segments Q2 through Q16 are shown in a shuffled order per column 220. The page groups corresponding to the content segments are listed in column 230.

Preview-table 265 features "Preview Permitted" column 250 that defines a permissions protocol for the preview version of the book, wherein the permitted content segments and the corresponding page batches are designated by YES, and the content segments and the corresponding page batches not included in the preview are designated by NO. Preview-table 265 also features "Ad Lineup" column 260 that defines the schedule or placement of advertisements corresponding to a tagged content segment (i.e., content segment associated with an ad in the same row of preview-table 265). In general, the ad precedes or is displayed before the tagged content segment is made available or displayed to a reader. Specifically, content segments Q10, Q12, and Q4 are preceded by ads Ad1, Ad2, and Ad3, respectively; content segments Q15, Q9, and Q3 are preceded by ads Ad4, Ad5, and Ad6, respectively; and content segments Q8, Q2, and Q11 are preceded by ads Ad7, Ad8, and Ad9, respectively. It will be realized, however, that in other embodiments ad placement may not be necessarily tagged to a content segment but may be time based and ads may be displayed with periodic frequency or at predetermined intervals during a preview session.

A subset of the content segments in the shuffled configuration of the book may be stipulated as unavailable-for-preview by a content owner or publisher. In preview-table 265, content segments Q17-Q24 corresponding to pages 73-108 are excluded from the shuffled preview version of book 200 and are exhibited in a shaded form. Content segments Q17-Q24 are further marked with a "NO" designation in the Preview Permitted column 250. In some embodiments, at least some of the restricted or unavailable content segments may be made available to a user after the user completes a qualifying activity.

In the exemplary embodiment illustrated in FIG. 18, over 65% of the book content is included in the shuffled preview version. In some embodiments, at least a major portion (50% or greater) of the content of the book is included in the shuffled preview version thereof. In other embodiments, at least 25% of the content of the book or information product is included in the shuffled preview version thereof. The scope of the content to be included with the shuffled preview version (or "preview scope") can vary from one title to another depending on—publisher and content owner policies, legal contracts between publisher(s) and author(s), marketing policies, advertising support for the book title requested, demand or popularity of the book title requested, seasonal promotions, or customer preferences and status. As exemplified at least by FIG. 18, the introductory portions or pages of a book may be retained at their original location in the shuffled preview version to orient the reader with respect to the book title. In other embodiments, an introductory portion and a concluding portion of the book are retained at their original location while the content segments constituting the intervening portion of the book are rearranged to form a shuffled configuration of the book.

From the foregoing examples and description of accompanying illustrations, it will be clear to those skilled in the art that a shuffled configuration of an information product or a book can be derived by defining and apportioning the original work into a plurality of content segments, rearranging the content segments, and displaying the content segments in the rearranged order for previewing purposes. Furthermore, the invention allows a variety of methodologies for shuffling or rearranging a book for providing a variety of shuffled preview versions of the book. A content provider or seller may offer content from a plurality of publishers or creators according to their preferred content segmentation plan, shuffling methodology, and/or preview scope.

For instance, a first book publisher or content provider may prefer a shuffled configuration with shuffled content segments of equal length, wherein the constituent pages in each content segment retain their sequential or consecutive order (e.g., segment-tables 208, 214, and 216 shown in FIGS. 4, 5, and 6, respectively); a second publisher may prefer a shuffled configuration wherein the content segments are arranged sequentially but the constituent pages within each content segment are shuffled (e.g., segment table 218 in FIG. 7); a third publisher may prefer a hybrid approach where at least some of the content segments are shuffled along with some of the constituent page-groups (e.g., segment table 222 in FIG. 9); and a fourth publisher may prefer a shuffled version wherein the content segments are of unequal length and a selected set of content segments are shuffled in a random or pseudo-random manner (e.g., segment table 234 in FIG. 15). Similarly, a fifth publisher may prefer a shuffled version of a book with about 40% of the overall content available for preview, while a sixth publisher may provide a shuffled version of the book with 6-pages long batches and about 60% of the overall content, and yet another publisher may provide a shuffled version of the book with unequal length batches and include all of the content segments in a shuffled form. Even a single publisher may utilize a variety of shuffling approaches for different book titles depending on advertising, marketing, promotional, and legal reasons.

The preview session may be subject to a time limitation. The preview session may also be subject to a preview limitation with respect to the percentage of overall pages of the book that can be made available to the user during the preview session. While the user always has the option of purchasing the book to access the entire content, the present invention contemplates a provision for extending the preview session after a preview limitation is reached in exchange for completing a qualifying activity. The qualifying activity for extending the preview session and accessing additional content segments may include at least one of—participating in a survey, writing a book review, recommending a book, responding to a sales promotion, accepting a marketing offer, making a purchase, paying a fee, buying a subscription, redeeming a coupon, redeeming an award, redeeming loyalty points, and redeeming a credit.

In offering preview versions of books and information products some of the variables that can be controlled or established by the content providers, content creators or publishers include—the content segmentation plan (number of content segments, size of individual content segments, such as number of pages per segment), the specific portions or content segments to be shuffled or rearranged, type of shuffling of the content segments, shuffling of the sub-segments or pages within a page batch, the specific portions of the content to be left in their original order or position, presence of an advertisement or commercial content at a predetermined frequency or location, establishing a preview limit, and defining the scope of the overall content to be displayed in the shuffled version along with any qualifying actions. Thus, the preview version of a book or information product can be shuffled or rearranged according to the control attributes and preferences defined by the publisher, content owner, or content provider. Such control attributes may be listed or defined by a preview table or array.

A feature of the invention provides a shuffled preview version of the book that is configured in accordance with a preview map, the preview map integrating—the shuffled arrangement of the content segments permitted-for-preview in the shuffled configuration of the book, a predefined arrangement of constituent pages in each of the content segments included in the preview session, and a schedule of advertisements to be shown during the preview session. The preview map in essence integrates rules for: shuffled arrangement of the content segments, permissions protocol, arrangement of constituent pages in each content segment, schedule of ads or advertising events, and any qualifying activity rule set up by the content provider.

FIG. 19 shows an exemplary preview map 275 of the book 200 in accordance with the defined attributes in preview-table 265 of FIG. 18. Preview map 275 is configured in the form of an array of a plurality of cells, showing the display order during a preview session of the permitted pages along with the interspersed advertisements Ad1-Ad9, in congruency with the preview-table 265. The display order convention for preview map 275 is from left to right and from top to bottom consistent with order flow in the English language and in accord with the page-arrays shown in previous Figures (e.g., FIG. 10). Preview map 275 exhibits segment Q1 comprising pages 1-7 as the first content segment, segment Q10 comprising pages 42-46 as the second content segment, Q12 comprising pages 49-56 as the third content segment, and so on. Advertisements denoted by alphanumeric designations from Ad1 to Ad9 are included at locations prior to the respective tagged content segment. Specifically, Ad1 is displayed prior to displaying content segment Q10, Ad2 is displayed prior to displaying content segment Q12, Ad3 is displayed prior to displaying content segment Q4, and so on. After the last page (page 30) of the last content segment (Q7) in the shuffled preview version has been displayed, the preview map 275 lists a qualifying activity event denoted by QuAc, that may require completion of a specific action or transaction to continue the preview session. After completion of the qualifying activity, the user may be offered an opportunity to view additional content segments per rules set up by the content owner or publisher.

According to the preview map 275 shown in FIG. 19, ad placement is configured such that advertisements (Ad1 to Ad9) are displayed prior to displaying the tagged content segment; however, in other embodiments an advertising event could be triggered at any time during the display of the tagged content segment. Ad placement or advertising schedule could also be time based with ads being shown during the preview session at predetermined intervals or with predetermined frequency.

An exemplary method for employing the principles of the invention is illustrated in FIG. 20 in the form of a flow chart, describing the steps in displaying a preview version of a book or an information product, in a shuffled configuration, over a computer network to a user or a potential customer. The method depicted in FIG. 20 may be initiated by receiving a search request from a user for exploring book titles corresponding to the search request (step 301). The search request can be received in a variety of ways over a computer network, for instance, a user can enter a keyword, or an author's name, or a book title fragment into an input box on a website or a mobile application, or through a voice command, or by clicking on a link.

In step 302, the system returns search result(s) or at least one book title in response to the search request. It will be realized that book titles can be available in various formats such as a paperback, a hardcover, an e-book, or an audio-book. Each book title in the returned results may include preliminary information relating to the book title or title metadata such as title of the book, author, publisher, year of publication, purchase price, preview availability, and format information.

In step 303, upon receiving the search results the user may be offered the option to buy or preview a specific book. Upon receiving user selection to purchase the book the user is directed to an ecommerce transaction engine to complete the purchase transaction (step 304). Completing the purchase transaction may involve signing into a customer account, providing credit card information, or paying via a third-party network such as PayPal or other means.

Upon receiving the request for preview of the book, the system prepares the preview version of the book (steps 305-308) and displays the shuffled version of the book for previewing, browsing, or purchase evaluation. The request for preview may be initiated by the user by clicking on selection instrumentalities such as buttons or links. Alternately, the user may be presented the option to preview a book title via—a link provided on a website, an email, a text message, an advertisement, or a marketing offer. It will be realized that even when the user opts to preview the book, a BUY option through a button or link instrumentality may always be available or displayed during the preview session so that the user may exercise the purchase option at any time while previewing the book.

Configuring a preview version of the book comprises apportioning or structuring an original configuration of the book into a plurality of content segments, wherein each content segment includes at least one page (step 305). In this step, the content segment structure is defined according to the rules established by the content provider or content owner. Content segments may be of equal or unequal length as illustrated in various exemplary embodiments in the description above. In some embodiments, content segment structure may be optionally defined by the user. The content segments may themselves be further partitioned into sub-segments. It will be apparent that in the original configuration of the book the content segments are arranged in a consecutive or sequential order and each content segment is assigned a specific original position. As shown in various exemplary embodiments, the plurality of content segments (or plurality of page batches) comprising the original configuration of the book may be assigned sequential numerical values.

In the next step, the original configuration of the book is modified or transformed into a shuffled configuration of the book by rearranging at least a subset of the plurality of content segments (step 306). In the original configuration of a book, the content segments are arranged in a sequential order; whereas, in the shuffled configuration of the book, the content segments are rearranged to display a shuffled order, thereby modifying the order of viewing or reading the book. The content segments can be shuffled or rearranged according to one of the approaches described in various exemplary embodiments above. Alternatively, the original locations or display order of the content segments may be rearranged to derive a corresponding shuffled arrangement of the content segments. The plurality of content segments can be arranged in a plurality of permutations to provide a plurality of shuffled configurations of the book.

The shuffled configuration(s) of the book can be derived, for example, by one of the following approaches or combinations thereof—relocating a set of content segments from a set of original positions to a set of relocated positions, swapping a set of content segments with a corresponding set of swapped content segments, random arrangement of the content segments, pseudo-random arrangement of the content segments, and/or a selective arrangement of the content segments such as odd-even content segment grouping exemplified earlier. In the shuffled arrangement, the content segments may be rearranged to an anterior position from a posterior position or rearranged from an anterior position to a posterior position. It will be understood by those skilled in the art that content segments are representative digital entities that can be handled and displayed discretely, and that the rearrangement of content segments may be implemented by redefining the display order of the content segments.

Once the shuffled arrangement of the plurality of content segments has been determined, the next step is to determine the order of the pages (or subsegments) comprising each of the content segments (step 307). As shown in various exemplary embodiments the constituent pages of the content segments can be preserved in a sequential order, or the constituent pages may themselves be rearranged or shuffled. It will be realized that the creation of the shuffled preview version of the book may be the cumulative effect of manipulating the order of content segments (page batches) and content subsegments (pages). In fact, cumulative rearrangement may comprise multiple-shuffling cycles, swaps, substitutions, relocations, randomization cycles, and/or combinations thereof.

In the next step (step 308), a preview session is initiated in response to the book preview request and at least one of the content segments from the shuffled preview version of the book is displayed to the user for previewing, browsing, and purchase evaluation purposes.

In displaying the shuffled preview version of the book, the content provider exercises control over the preview version of the book during the preview session. The content provider may exercise control by controlling one or more attributes, including inter alia—duration of availability of the shuffled version of the book, length and size of the content segments, extent of shuffling or rearrangement of the content segments and content subsegments, ability to withhold certain content segments from inclusion in the preview version, setting a preview limit by time duration or content portions that may be displayed during a preview session, and presence or inclusion of advertisements during the preview session (step 309). According to an exemplary embodiment, the content provider may adopt a shuffled configuration that undergoes dynamic shuffling during a preview session where a shuffled version of the book is replaced with another shuffled or re-shuffled version of the book after a predetermined duration. Upon completion of the preview session, the user may be directed to purchase the book or submit a new search request for another book title (step 310). In additional embodiments of the invention—the user may be offered the option of continuing or extending the preview session upon completion of a qualifying activity; or the user may be offered the functionality of providing a search term input for searching within the shuffled preview version of the book for finding relevant content segments corresponding to a search term input.

Figure 21:
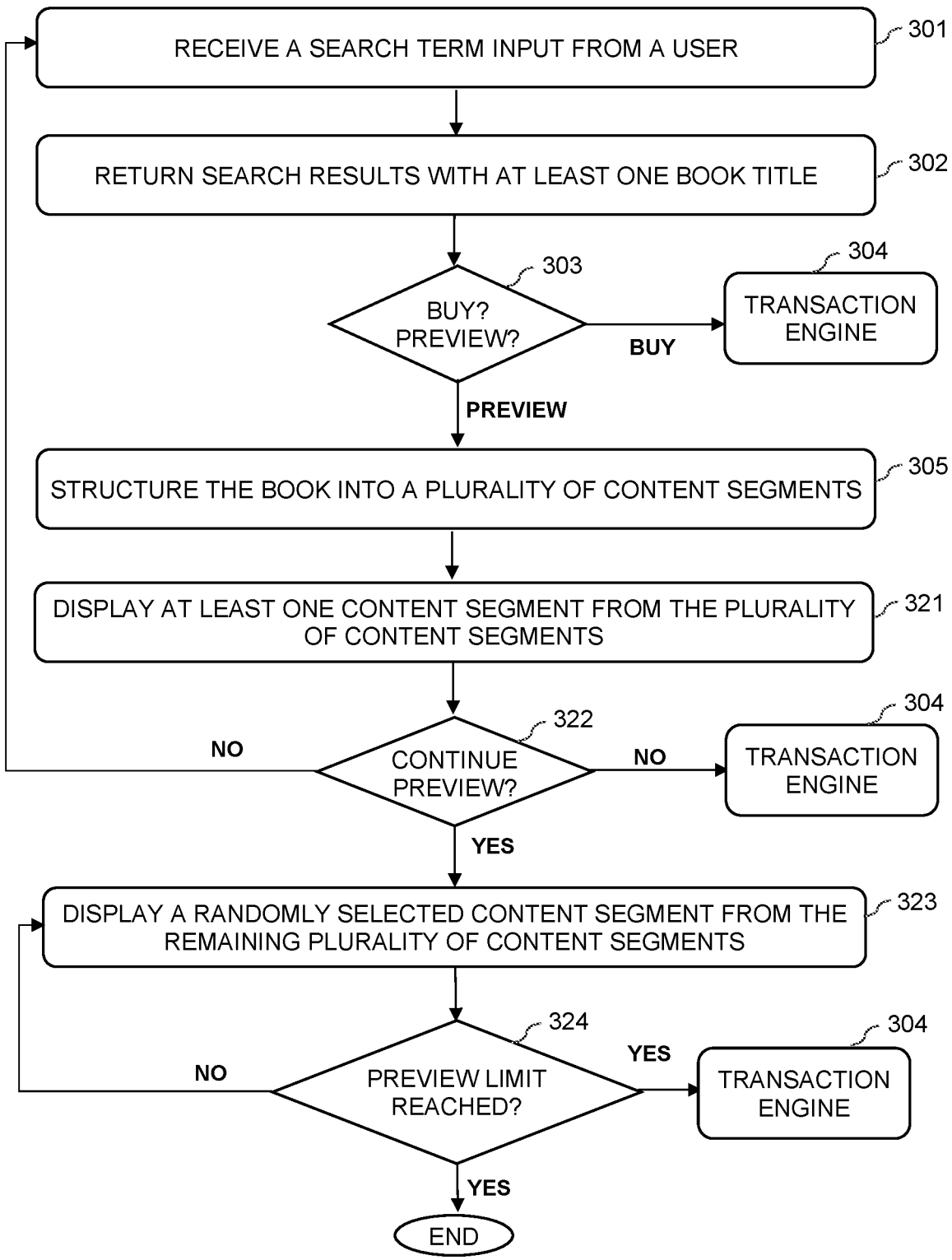
FIG. 21 is a flowchart summarizing the method steps for practicing the invention according to an embodiment thereof in displaying a preview version of a book in a shuffled configuration comprising randomly selected content segments over a computer network.

Another exemplary method for employing the principles of the invention is illustrated in FIG. 21 in the form of a flow chart, describing the steps in displaying content segments over a computer network in a shuffled form to a user or a potential customer. The process or method depicted in FIG. 21 is initiated by receiving a query or search term input from a user for requesting book titles (or information product titles) corresponding to the search term (step 301), similar to FIG. 20. In fact, steps 301-305 are identical to those discussed above in connection with FIG. 20.

In the exemplary embodiment depicted in FIG. 21, once the book has been apportioned or structured into a plurality of content segments (step 305), the system displays at least one content segment selected from the plurality of the content segments to the user for previewing purposes (step 321). The initial content segment provided for preview can be displayed to the user in a content preview window that launches as a pop-up window or as a separate browser tab. Once the user has reviewed the initial content segment(s) the user may either continue previewing or exercise the buy option (step 322). If the user desires to continue previewing, another content segment may be randomly selected from the remaining plurality of content segments and presented for preview (step 323). If the user decides not to continue previewing the user can exercise the BUY option and be directed to the transaction engine (step 304), or the user can recommence another search query for a new book title (step 301).

It will be realized that the content segment(s) selected for display in step 323, may be randomly or pseudo-randomly selected and may not necessarily be in sequential order to the preceding content segment displayed in step 321.

If after reviewing the content segment in step 323, the user desires to continue previewing the book, another content segment may then be randomly selected from the remaining plurality of content segments for displaying to the user. Thus, the user may continue previewing the book in batches of content segments until the last of the batches permitted by the content provider is displayed. Once the preview limit is reached, the user may purchase the book, or restart the search for a new book, or may terminate the session. The preview limit can be based on criteria set by the content provider or publisher including a time-limit, or the number of content segments shown in the preview, or the overall pages in the preview.

It will be realized that the segment-by-segment metering out of the plurality of content segments comprising the book in a non-sequential order in effect provides a shuffled preview version of the book and a modified order of reading, viewing, or hearing the content of the book. The successive appearance of the content segments after the initial content segment batch may be in a random order or pseudo random order or another pattern defined by the publisher or content provider.

Figure 22:
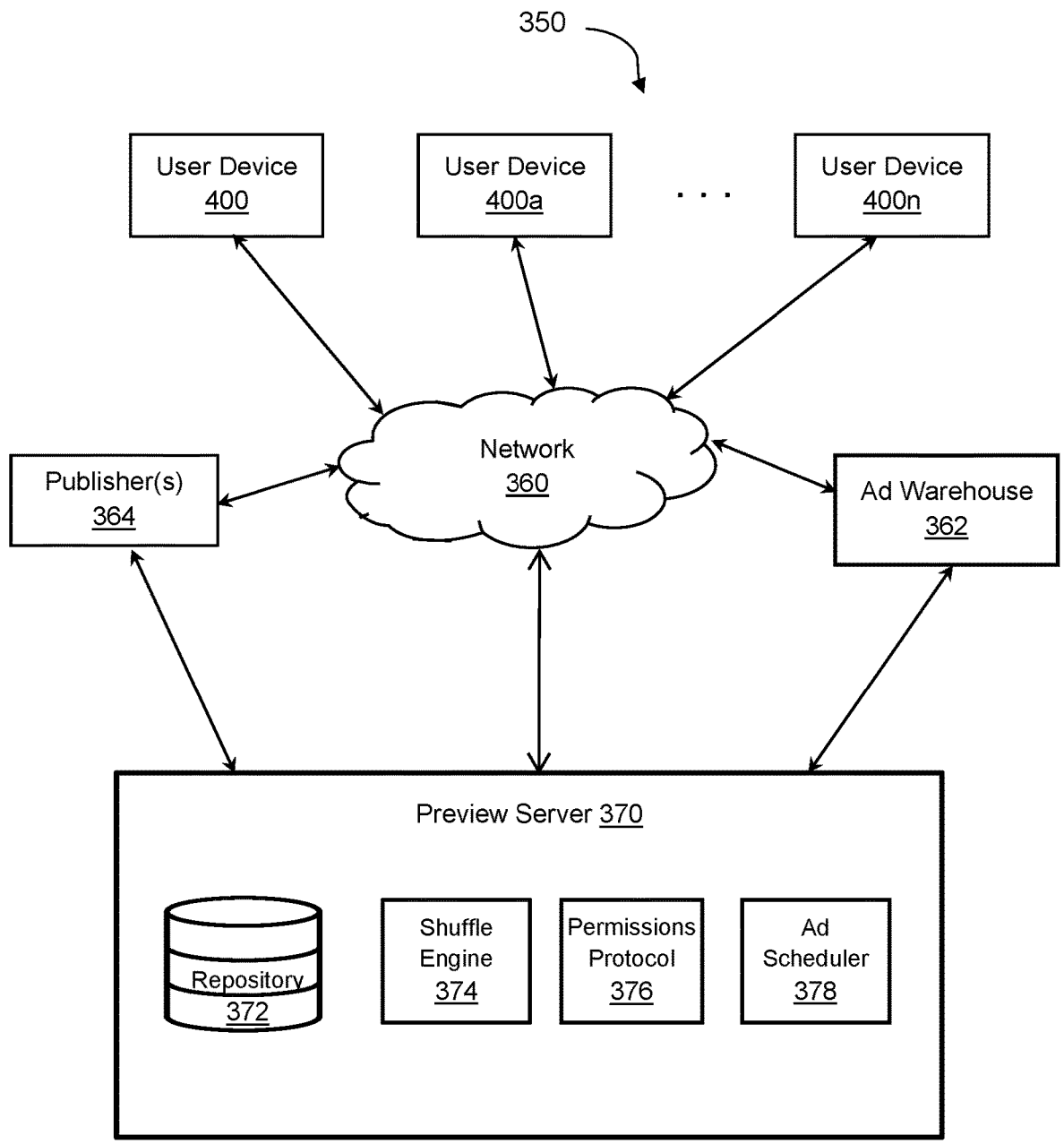
FIG. 22 shows a block diagram of a book previewing system according to an exemplary embodiment of the invention comprising a plurality of user devices connected to a preview server via a network.

A book previewing system 350 according to an exemplary embodiment of the invention is shown in the form of a block diagram in FIG. 22 to further elucidate the implementation principles of the invention. System 350 comprises a plurality of user or client devices indicated by 400, 400a . . . 440n connected to a preview server 370 via network 360. System 350 can operate in a wide variety of network environments. Accordingly in various embodiments, network 360 may be the internet, a local area network (LAN), a wide area network (WAN), a wireless network, or another network capable of connecting server and client computing devices. Although FIG. 22 shows only one instance of the preview server 370, a content provider may implement multiple servers in communication with a plurality of client or user devices. The following description particularly pertains to the specific user device 400 for the sake of example.

User device 400 may include a display means such as a screen that is configured for displaying content transmitted by the preview server 370. User device 400 may be a computing device with any form factor including a mobile phone, a tablet, a laptop, a desktop, an e-reader, or another device that is capable of running software applications including a web application, a web browser, a reading applet, or another form of software that may be installed on the user device 400. The software, applet, or application may be configured for reading or previewing books and may comprise a user interface to enable an operator of user device 400 to interact with various elements of the software or application via a touch screen, connected peripheral devices, or via voice inputs.

Preview server 370 is a computing device that is configured for communicating with the user device 400 via network 360 and displaying preview version of books on user device 400 upon receiving a request initiated from the user device 400 to preview a book. Preview server 370 may be operated by a content provider, retailer, or seller and may be communicatively connected to one or more publishers 364 either directly or via network 360. Preview server 370 may inter alia comprise a content storage repository 372, a shuffle engine 374, a permissions protocol 376, and an ad scheduler 378.

Repository 372 is configured to store deconstructed or apportioned content segments of various book titles including the apportioned content segments of the specific book requested for preview by the user device 400. It will be realized that repository 372 may store both apportioned content segments as well as the original configuration of the book so that the original configuration can be transmitted or conveyed to the reader or user device 400 upon purchase of the book by a consumer.

Shuffle engine 374 is configured for rearranging the apportioned content segments stored in repository 372 according to a variety of shuffling techniques or approaches as detailed above with specific examples and illustrations of shuffled configurations of an exemplary book. The shuffle engine 374 may define a rearranged order of content segments according to rules established by the publisher, content owner, or retailer. The permissions protocol 376 may specify content segments that are permitted for inclusion in the preview version of the book, and/or specify content segments that are marked for exclusion from the preview version of the book. In some embodiments, the permissions protocol 376 may establish preview session limitations or rules, which define the duration of the preview session, or other requirements such as qualifying activity requirements for the user for extending or continuing the preview session.

Ad scheduler 378 is provided to define the cadence of advertisements during the preview session. Ad scheduler 378 may be communicatively connected to ad warehouse 362 either directly or via network 360. The scheduling of ads during the preview session may be time based or tied to specific content segments. In some embodiments, certain content segments of the book may be tagged or marked for including a preceding advertisement depending on rules and preferences established by the content provider or the publisher.

The various elements of the preview server 370 including the repository 372, shuffle engine 374, permissions protocol 376, and ad scheduler 378 may be configured to generate a preview map for integrating—the shuffled arrangement of the apportioned content segments that are permitted-for-preview in the shuffled configuration of the book, the predefined arrangement of constituent pages in each of the apportioned content segments included in the preview session, and a schedule of advertisements to be shown during the preview session. The preview map in essence integrates rules for: shuffled arrangement of the apportioned content segments, permissions protocol, arrangement of constituent pages in each apportioned content segment, schedule of ads or advertising events, and any qualifying activity rule set up by the content provider.

To further advance an understanding of the invention an exemplary website, titled PowerPreviews.com, embodying the principles of the invention is shown in FIGS. 23-27, wherein like entities bear like reference characters. Specifically, the exemplary website is configured for providing a preview version of a book in a shuffled form and is hosted on a suitably networked computing device or server system (such as preview server 370 shown in FIG. 22 and discussed above) for enabling a plurality of remote users to access the website over the internet and browse, read, search, preview, examine and/or purchase books and information products, using computer devices equipped with display screens or other display means. The exemplary website may be operated by a book merchant, an ecommerce vendor, a content owner, a publisher, or a copyright owner.

In FIGS. 23-27, the computer system at the user's end is depicted by user device 400 which, as mentioned earlier, may be a personal computer, a desktop computer, a notebook, a tablet, a smartphone, an e-reader, or a device having another form factor that can be connected to the internet and has a display device or screen 420 capable of displaying digital content such as webpages. Display screen 420 may be an integral part of computer device 400 or linked peripherally thereto via wires or wirelessly.

Figure 23:
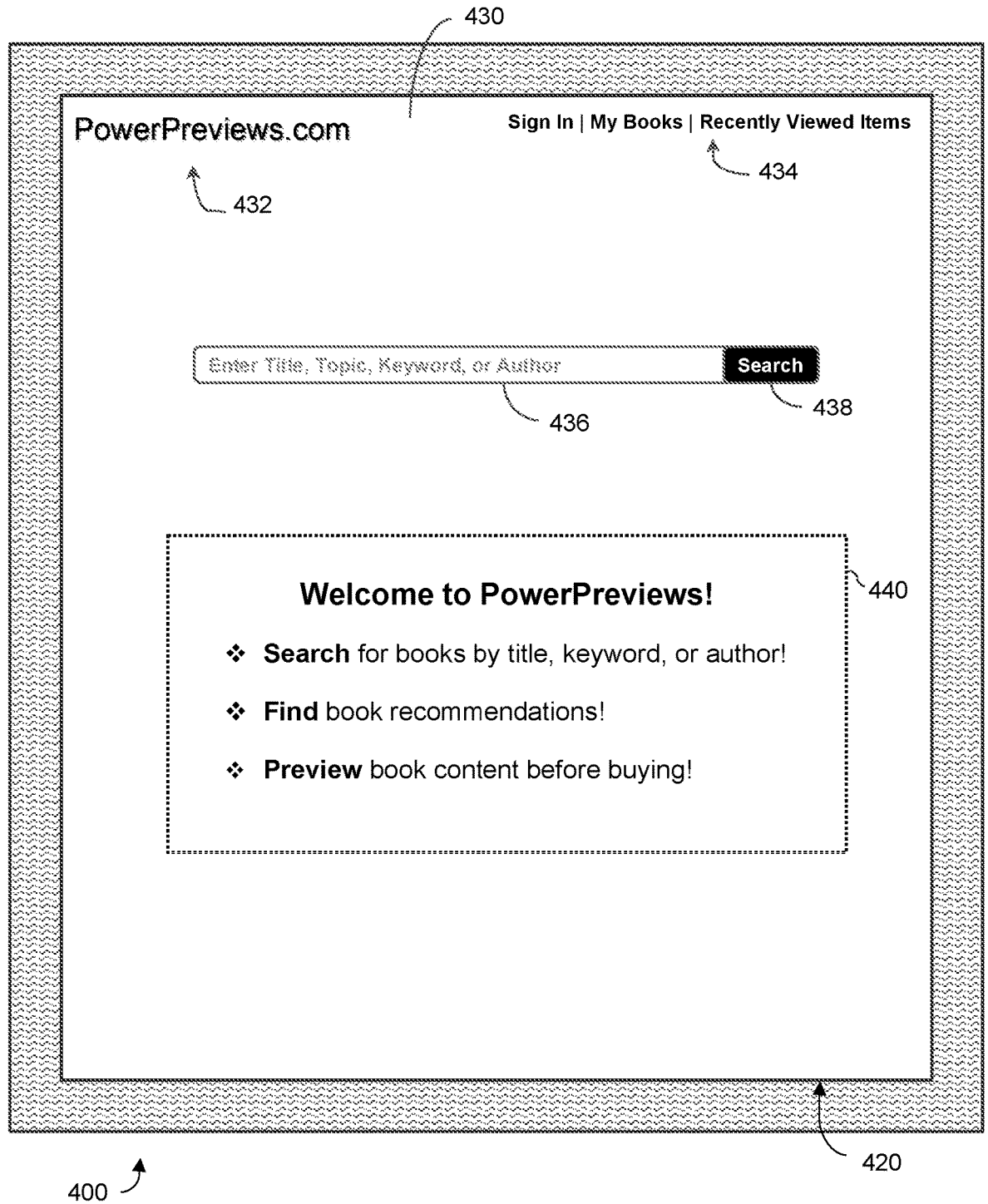
FIG. 23 illustrates an exemplary website homepage showing various links, welcome message, and a search bar for searching book titles according to a commercial embodiment of the invention.

FIG. 23 shows various elements of the introductory webpage or homepage 430, including a title block indicated by reference numeral 432 on top left of the webpage 430 showing the website operator title, namely PowerPreviews.com. The webpage 430 also features user-specific links indicated collectively by reference numeral 434. User links 434 may include various options to access user's data including a log-in facility ("Sign In"), books purchased or shortlisted by user ("My Books"), and items of interest previously viewed by the user ("Recently Viewed Items"). Webpage 430 also includes an input box 436 for entering a search term input, and a clickable search button 438 for executing the search term populated in box 436. A website visitor or the user can conduct a book search by inputting a book title, an author's name, a keyword, a topic, a subject, a category, a literary genre, or a combination of these search attributes, and then clicking on the search button 438. The webpage 430 may also include other introductory messages or content indicated by reference numeral 440, such as a welcome message and a description of the functionality available on the website to orient a first-time visitor.

It will be realized that the appearance of webpage 430 may be optimized or configured for compatibility with a range of computer devices including mobile and smartphone devices. Furthermore, links can be replaced with buttons or menus including collapsible or drop-down menus and may be displayed anywhere on the display screen 420 according to the preferences of the content provider or the type of device being used to access the website.

Figure 24:
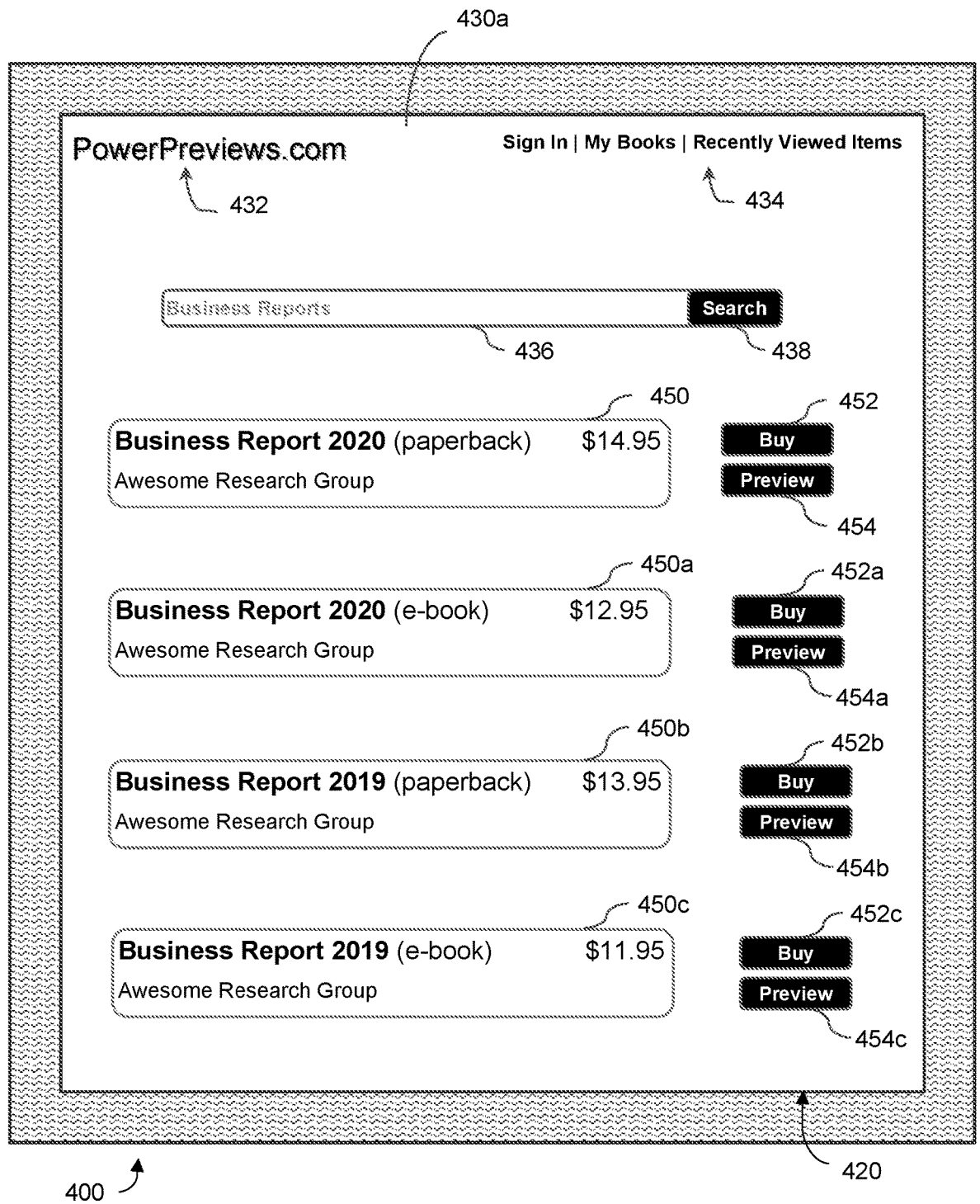
FIG. 24 illustrates an exemplary webpage according to an embodiment of the invention showing book search results generated in response to the search input along with buy and preview options next to the search results.

FIG. 24 shows an exemplary webpage 430*a*, wherein the input box 436 is populated with the exemplary book search term "Business Reports" by the user operating user device 400 and the search can be executed by clicking on the search button 438. The search button execution yields a listing four books, indicated by reference numerals 450, 450*a*, 450*b*, and 450*c*, which are shown just below the input box 436. The listed search result may include the title of the book, the format of the book (paperback or e-book), and the price of the book. It will be realized that the exemplary book search results are shown for illustration purposes and publishers and content providers may design their preferred webpage layout and include additional metadata and details about the book, publisher, author, and/or copyright information. Once the user has selected a book title of interest from the search results generated from the input term, the user may then proceed with—either buying or previewing the book. Accordingly, a pair of clickable buttons 452 and 454 are provided in conjunction with the book search result 450 (or book 450) for allowing the user or site visitor to exercise their choice for—either purchasing the book 450 by clicking on the Buy button 452 or previewing the book 450 by clicking on the Preview button 454 prior to making a purchase decision. Similarly, book search result 450a includes corresponding clickable Buy and Preview buttons 452a and 454a, respectively; book search result 450b includes corresponding clickable Buy and Preview buttons 452b and 454b, respectively; and book search result 450c includes corresponding clickable Buy and Preview buttons 452c and 454c, respectively.

To preview one of the books from the listed search results shown in FIG. 24, the user may select the appropriate option from Preview buttons 454 to 454c. Assuming for example, the user selects or clicks on Preview button 454 for previewing book 450, a next webpage 430b is generated.

Figure 25:
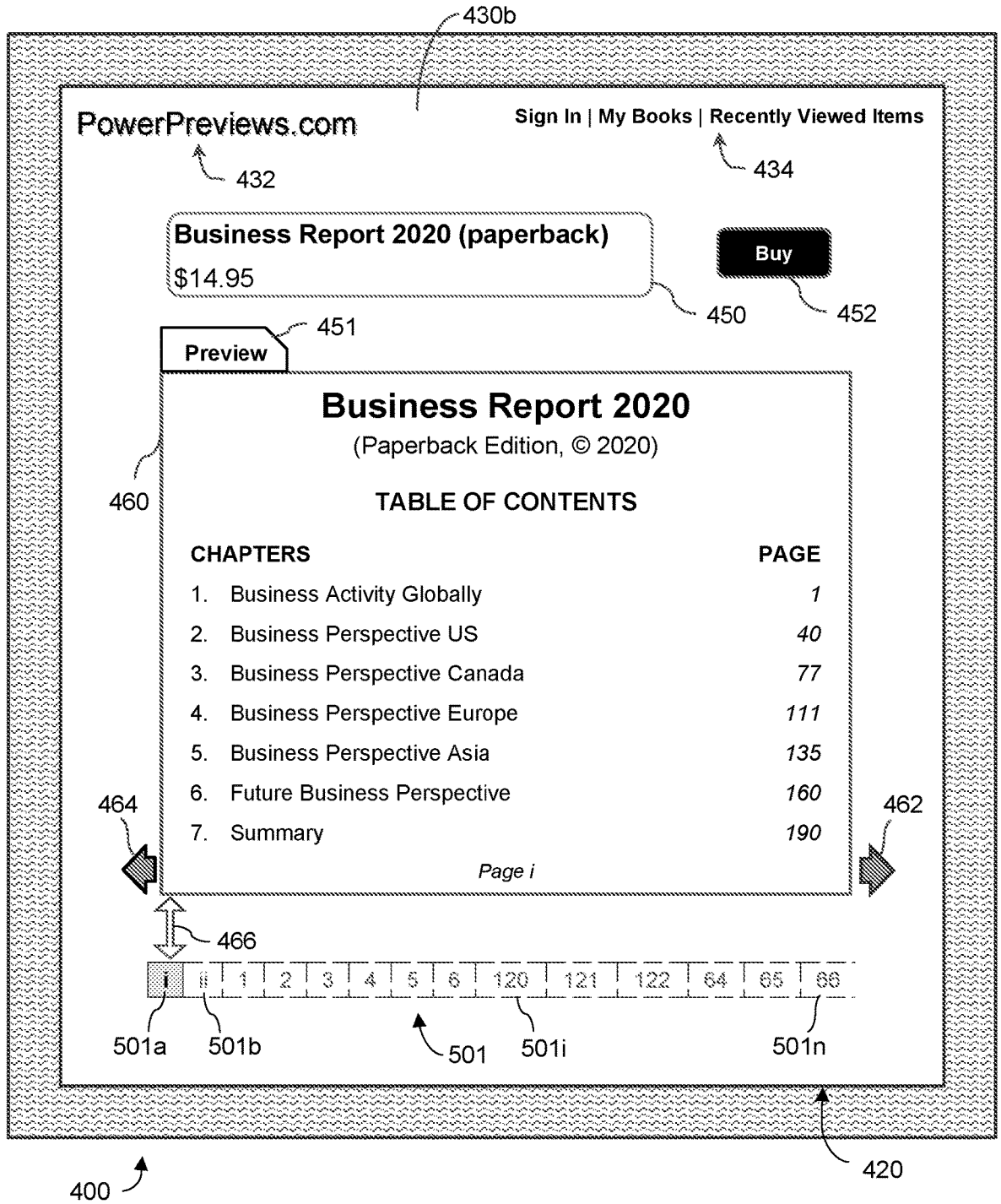
FIG. 25 illustrates an exemplary webpage showing a preview version of the selected book 450, with a content display window showing one of the pages of the selected book, and a page-array displaying the shuffled sequence of upcoming pages available for preview.

FIG. 25 shows the next webpage 430b, generated in response to the user clicking on Preview button 454 (shown in FIG. 22), expressing user's intention to inspect or preview the contents of the selected book 450, namely Business Report 2020. It will be apparent that FIG. 25 is an exemplary depiction for carrying out the invention; alternately, webpage 430b could be configured to open in a separate browser window, or as a separate tab in the web browser, or as an overlay window. The selected book search result 450 may be shown on top of the page to clarify and confirm user's selection, from previous webpage 430a (shown in FIG. 22). Buy button 452 is provided next to the search result 450 so that the user can decide to purchase the book at any time during the browsing or preview session.

Webpage 430b shows an exemplary preview version of book 450, which is referred to as Preview 451. Preview 451 is displayed in content display window 460 that is sometimes also referred to as preview window 460. Content display window 460 can be appropriately sized for displaying the content of the pages or an image thereof. A clickable forward button 462 is provided for advancing to the next page or section included in Preview 451. Similarly, a clickable back button 464 is provided for retrieving a previous page of Preview 451. Preview 451 is configured for allowing a user to inspect the contents of book 450 by presenting the content in a "shuffled", "rearranged", "reorganized", or "out-of-sequence" configuration for the user or reader to preview and make a purchase decision.

As mentioned previously, presenting preview content in a shuffled form enables a publisher or content provider to release a greater portion or percentage of the overall content to the user while still preserving the sale value of the original configuration. The shuffled preview version of the book thereby enables a content provider to offer and a consumer to receive a more comprehensive and meaningful preview of the book or its contents without compromising potential sales.

FIG. 25 shows a page-array 501 disposed proximate to the content display window 460. The page-array 501 features a plurality of cells that are populated with a page number in each cell featuring an itemized listing of the upcoming pages within the cells and the order thereof in the Preview 451. Each cell of page-array 501 is identified with an alphanumeric reference with a common prefix "501" followed by an alphabetical character signifying the position of the cell, with the first cell of page-array 501 being designated as 501a and the last cell being designated as 501n. For sake of clarity and descriptive economy, some of the intermediate cells are shown with alphabetic identifiers only. The page ranges i-ii, 1-6, 120-122, and 64-66 occupy cells 501a-501n in the page-array 501, with cells 501a, 501b, 501i, and 501n being populated by pages i, ii, 120, and 66, respectively.

As shown in FIG. 25, page "i" occupying cell 501a is shown in the display window 460, wherein page "i" includes the Table of Contents of book 450. Cell 501a of the page-array 501 and its occupant page "i" are shown in bold or highlighted format to provide a contrast against the other cells/pages that are shown in a relatively suppressed format to signify pages that have not yet been loaded in the display window. An indicator object 466 represented by a double-sided arrow may be provided to indicate the relationship between the page or content displayed in the content display window 460, and the domicile cell for the displayed page/content in the page-array 501. Thus, indicator object 466 depicts the relationship between cell 501a and its occupant page "i", with the displayed content in the content display window 460. To review additional pages the user can proceed with clicking on forward button 462 to populate the next page in the display window 460. In some embodiments of the invention, the user can simply click on a specific cell of the page-array 501 to load the page domiciled therein.

As the user or reader clicks the forward button 462 once, the page domiciled in the next cell of the page-array 501 or an image thereof is displayed in the content display window 460. It will be realized that the page numbers populated in the cells of the page-array 501 are not necessarily in sequential order thereby providing a shuffled preview version of the book 450. As will be apparent from the shuffled or out-of-sequence display order shown in FIG. 25, the page series 1-6 appears after the page series i-ii, page series 120-122 appears after page series 1-6, while page series 64-66 appears after the page series 120-122. Furthermore, the specific page values populated in page-array 501 are mere examples and Preview 451 is not limited to the exemplary rearrangement or the shuffled sequence of the pages depicted in FIG. 25 and can exhibit many variations and shuffled configurations. In fact, the order or sequence of the pages appearing in Preview 451 can be random, pseudo-random, arbitrary, or selective.

It will be realized that the page-array 501 is primarily a device for describing and illustrating the shuffled preview configuration of book 450 or Preview 451 and may be shown to the user or suppressed. The size, format, number of cells, and appearance of the page-array 501 can be established by the website owner, the publisher, or the content provider. The appearance of content display window 460 may be formatted or adjusted according to the user device settings, for example, content window 460 may include a scroll bar (not shown) if all the content on a specific page cannot be shown therein at the selected text size setting. Content display window 460 may also be in the form of an overlay of a larger size to show the pages of book 450 at appropriate zoom-setting(s) or magnification level(s).

Figure 26:
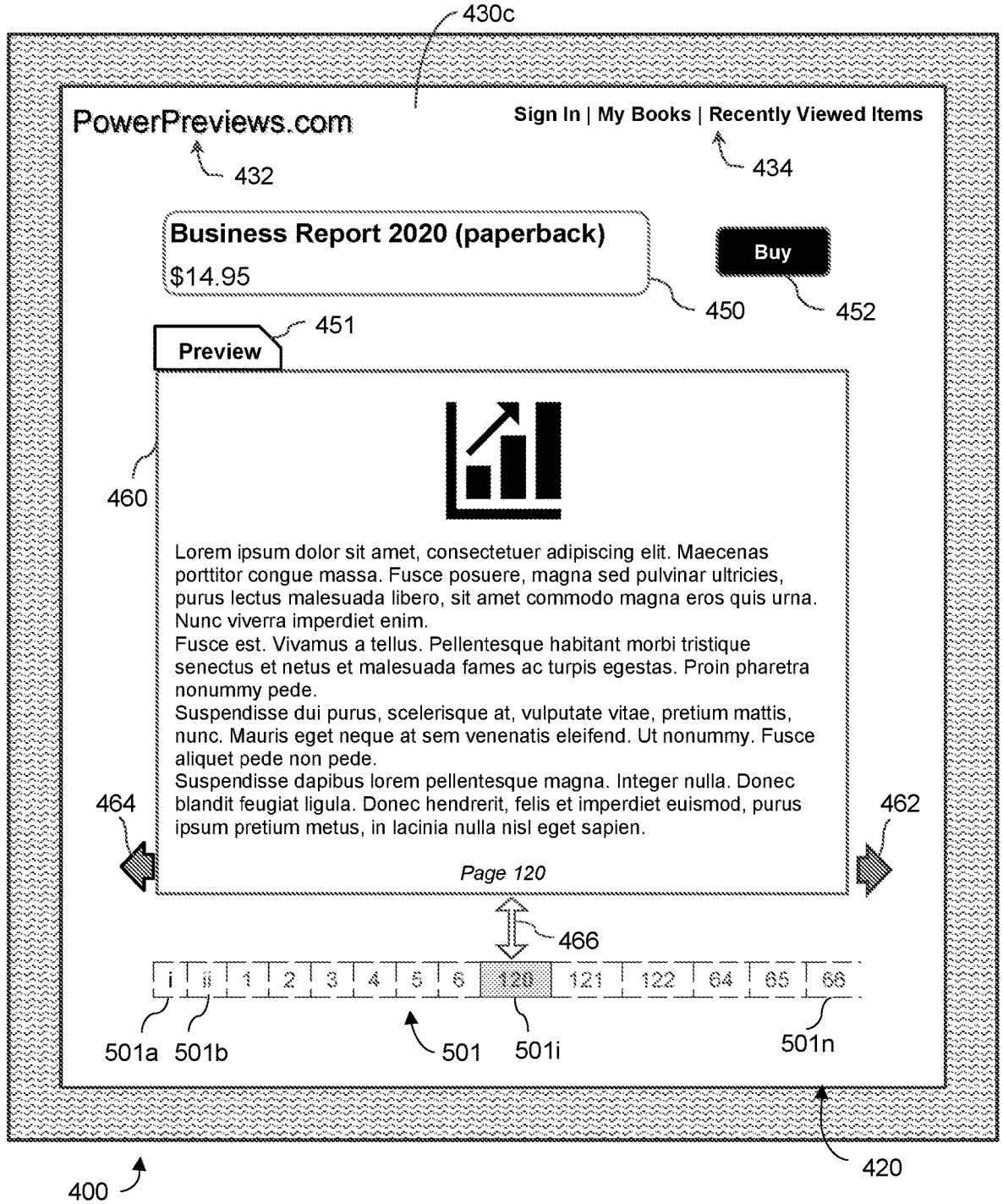
FIG. 26 illustrates an exemplary webpage showing a preview version of the selected book 450, with a content display window showing an out-of-sequence page relative to prior pages available for preview.

FIG. 26 shows an updated webpage 430c generated after a few clicks of forward button 462 (or the user clicking on cell 501i). The content display window 460 shows page "120" domiciled in highlighted cell 501i of the page-array 501 that includes a trend graph and generic text for illustration purposes. The indicator object 466 now shows the relationship between the content display window 460 and the highlighted cell 501i. As the user proceeds with clicking the forward button 462 further, the next cell of the page-array 501 is highlighted and the page domiciled in next cell (or an image thereof) gets loaded into the content display window 460. Alternately, the user may also position and align the indicator object 466 with a desired or selected cell of the page-array 501 to view the content of the page domiciled in the desired or selected cell. Once the user has advanced to the last cell 501n, occupied by page 66, the page-array 501 is configured to be replaced with the next batch or lot of shuffled pages in response to the next click of the forward button 462, so that the user can continue to inspect or read the content from book 450 included in Preview 451.

Figure 27:
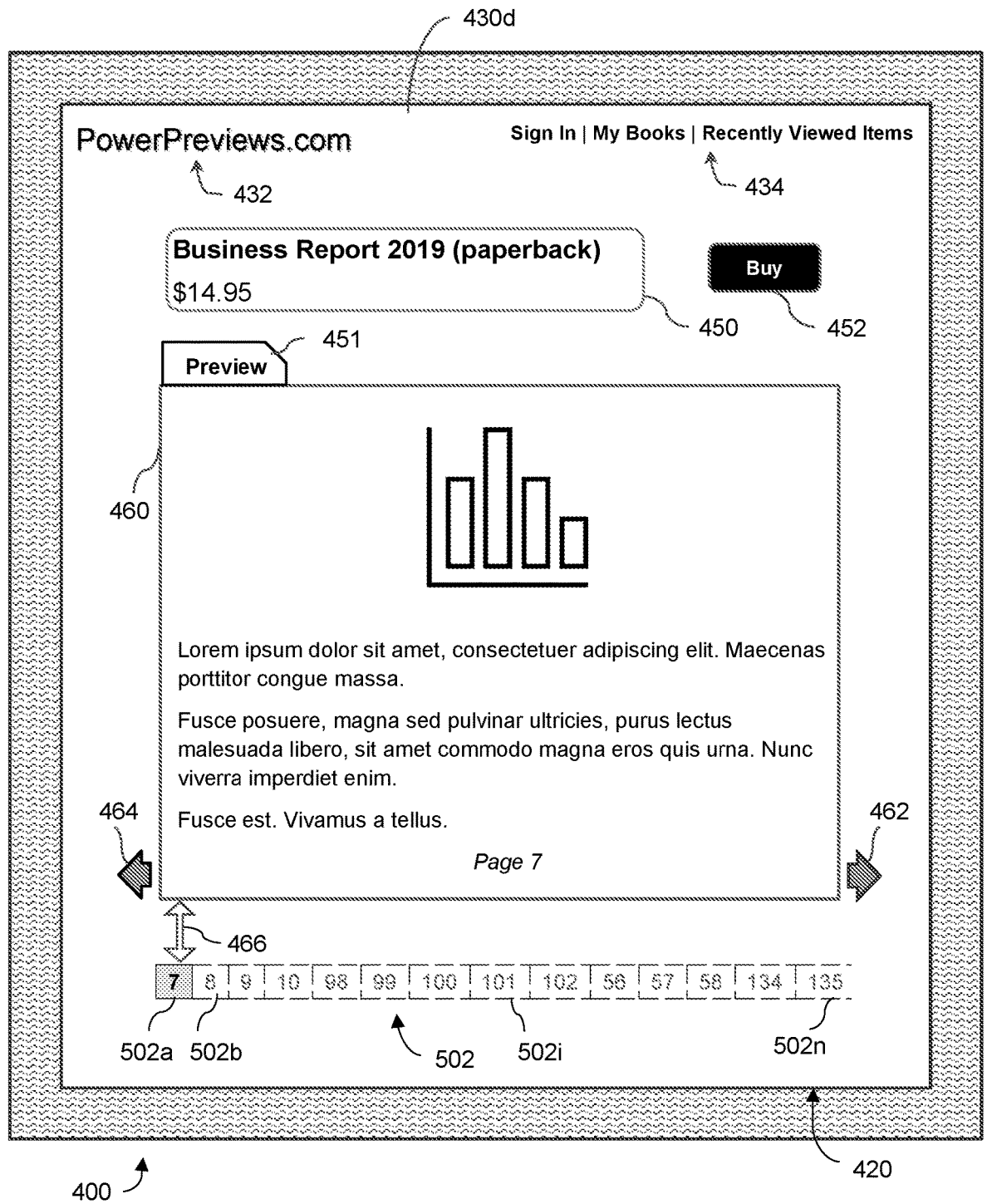
FIG. 27 illustrates an exemplary webpage showing a preview version of the selected book 450, with the page-array populated with next lot or set of shuffled pages, and the content display window showing one of the pages from the next lot.

FIG. 27 shows exemplary webpage 430d with page-array 502 which is now populated with the next lot or set of shuffled pages from book 450 available for previewing or reading by the user. As shown in FIG. 27, cells 502a-502n exhibit updated page occupants for facilitating continued reading or browsing of Preview 451. Specifically, page ranges 7-10, 98-102, 56-58, and 134-135 occupy cells 502a-502n in the page-array 502, with cells 502a, 502b, 502i, and 502n being populated by pages 7, 8, 101, and 135, respectively. As will be apparent from the shuffled or out-of-sequence display order of the occupant pages in the cells 502a-502n of the page-array 502, the user can continue to read or inspect book 450 (or Preview 451) in a shuffled form. Indicator object 466 depicts the relationship between the displayed content (page "7") in the content display window 460, and the highlighted domicile cell 502a for the page being displayed. The user can click the forward button 462 to load the page domiciled in next cell (502b) into the content display window 460. In this manner, the user can continue to click the forward button 462 to advance and read through the pages shown in cells 502a-502n of FIG. 25 and then activate yet another set or lot of shuffled pages to be loaded in the replacement page-array.

It will be apparent from the above that the page-arrays 501 and 502 shown in FIGS. 25-27 only include a small portion of the overall pages in book 450 and can be updated or replaced with the next batch of pages as the user continues to examine additional pages/content during the preview session. In this fashion page-array(s) can be updated several times until all the pages in Preview 451, or at least until all the page batches authorized by the content provider, have been loaded for display.

Figure 28:
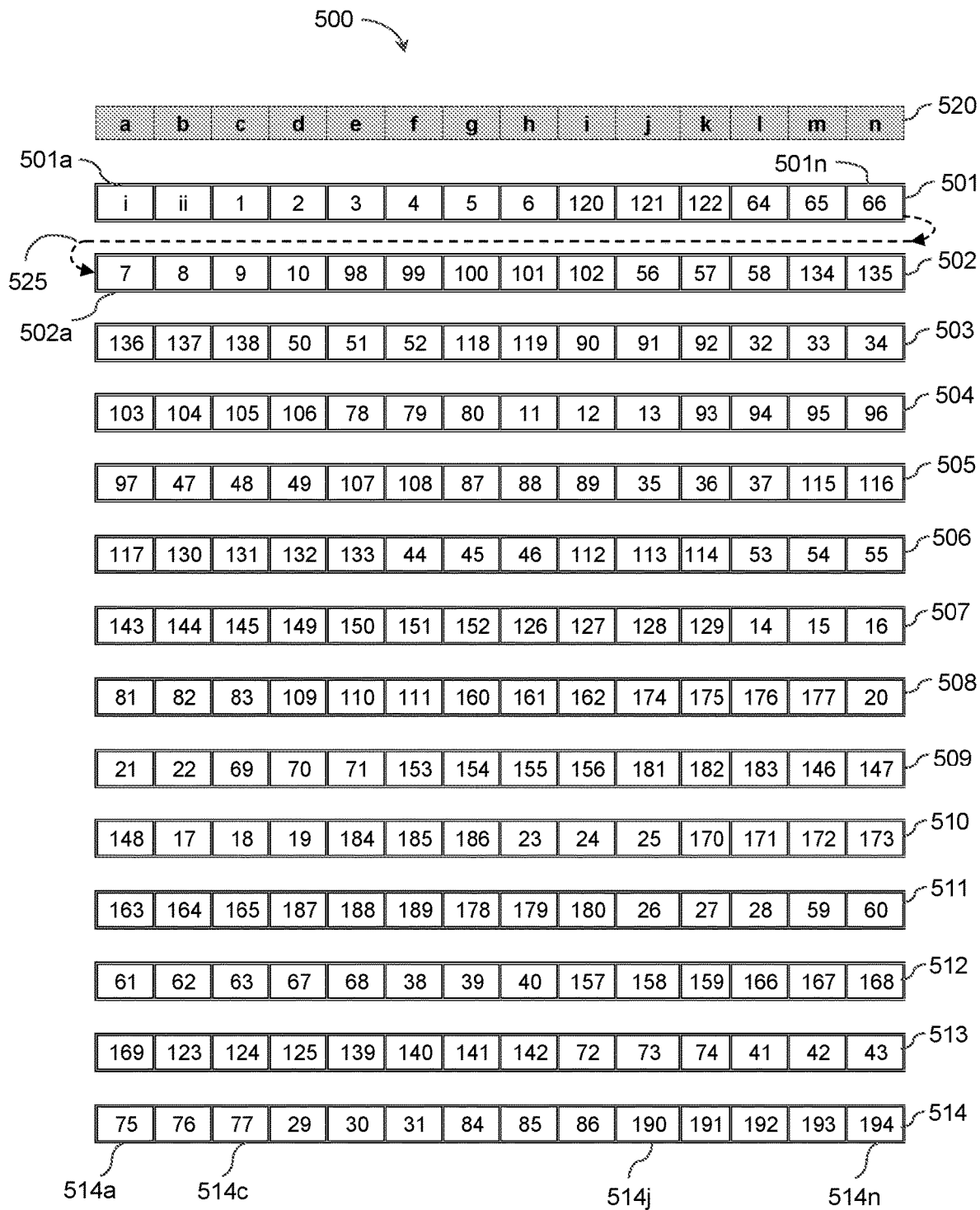
FIG. 28 illustrates a composite page-array 500 depicting a shuffled configuration of book 450 showing the order of the all the pages in the book.

FIG. 28 represents an expanded version of the shuffled configuration of book 450 depicting the shuffled or out-of-sequence order of all the pages of the book 450, namely pages i-194, in the form of a composite page-array 500 that represents the entire shuffled configuration of book 450. The composite page-array 500 includes fourteen rows or page-arrays indicated by reference numerals 501 through 514 with each row of composite page-array 500 comprising fourteen cells which are alphabetically designated by columns a-n in the highlighted reference header row 520. Each cell of the composite page-array 500 can be identified by an alphanumeric designation with a row number prefix and a column suffix. It will be realized that row 501 of composite page-array 500 in FIG. 28 is consistent with page-array 501 shown in FIGS. 25-26, while row 502 of composite page-array 500 is consistent with page-array 502 of FIG. 27. Thus, all the cells in rows 501-514 that are positioned below column "a" are designated by the appropriate row number and the suffix "a"; all the cells in rows 501-514 that are positioned below column "b" are designated by the appropriate row number and the suffix "b"; and so on. To further illustrate the identification or designation scheme for the cells in the composite page-array 500, cells 501a, 501n, 502a, 514a, 514c, 514j and 514n are shown labeled with their alphanumeric reference designations.

Each cell of composite page-array 500 from rows 501a through 514n includes a page number and each page is allocated to the appropriate cell in order of its appearance in the Preview 451. The sequence of page display is from left to right or column "a" to column "n" for each row, and from column "n" to column "a" for the successive row. Arrow indicator 525 is provided to illustrate the display sequence from the last cell or cell 501n of row 501 to first cell 502a of row 502.

Returning now to FIG. 27, once the user has previewed the last page in cell 502n (page 135), and signals intent to continue previewing and browsing the webpage is then updated with the next row of pages shown in page-array 503 shown in FIG. 28. Thus, the shuffled configuration of book 450 represented by the tabulated rows of the composite page-array 500 can be displayed for providing a comprehensive preview version or Preview 451 to the user.

Nevertheless, it would be realized that the shuffled preview version of book 450 can be made available to the user in a variety of configurations. For example, instead of loading a single page in the content display window, a group of pages or a page-batch can be loaded in the display window.

Figure 29:
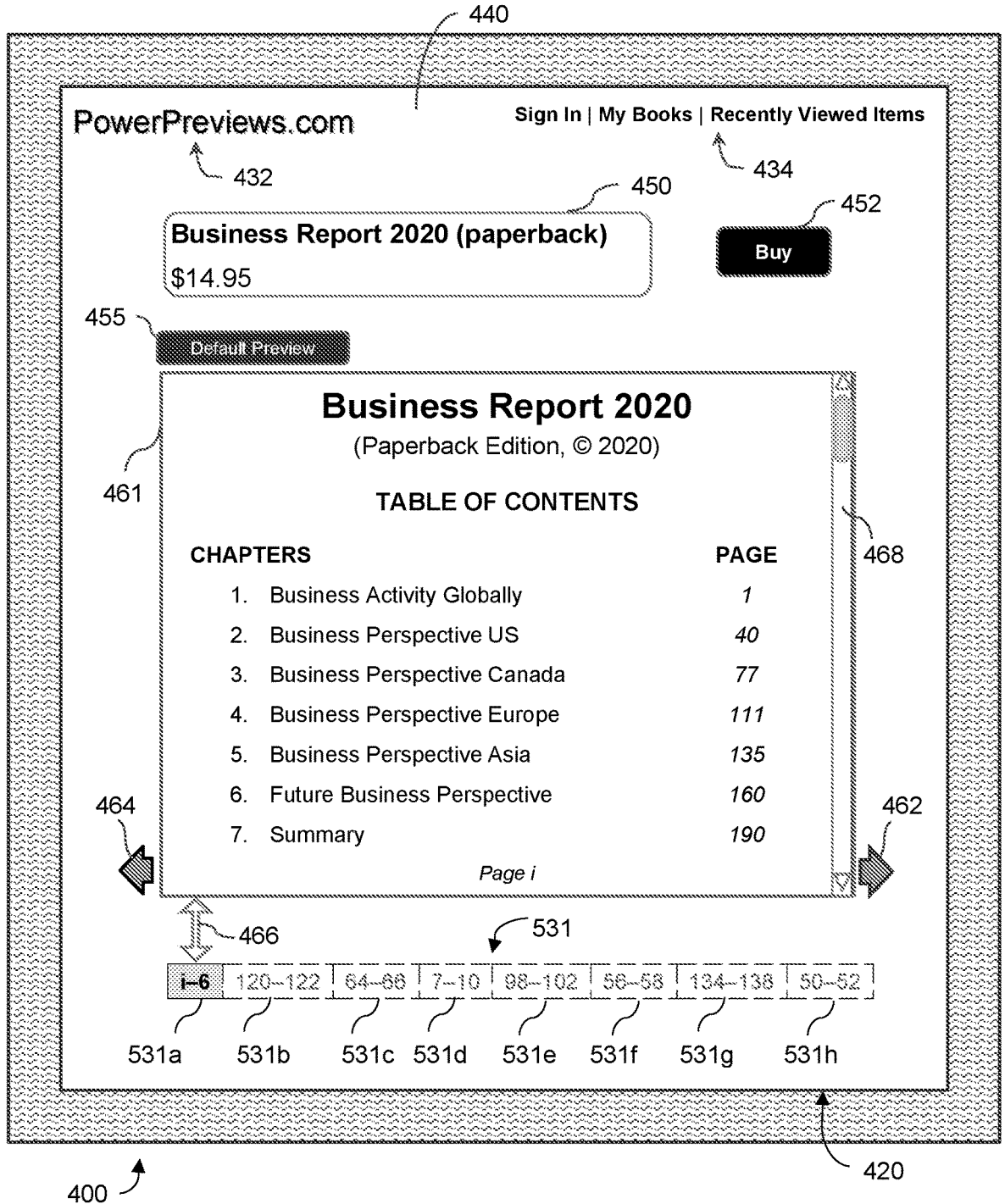
FIG. 29 illustrates an exemplary webpage showing a default preview version of the selected book 450, comprising a plurality of page-batches arranged in a shuffled order with one of the page batches loaded in the content display window.

FIG. 29 shows an alternate preview configuration to that shown in FIGS. 25-27, wherein exemplary webpage 440 features another preview version of book 450 in the form of Default Preview 455, wherein a page-batch (or a content segment comprising a plurality of pages) defined by a beginning page and an ending page in series is loaded into the content display window 461, and the user or reader can review the pages in the page-batch by using the scroll bar 468. A page-array 531 is disposed proximate to the content display window 461 and features a plurality of cells indicated by alphanumeric designations 531a to 531h, wherein each cell is populated with a page-batch or content segment. Cell 531a shows the page-batch denoted by pages "i-6" comprising a total of eight pages namely, pages i, ii, and 1-6, and is highlighted to contrast against other cells or page-batches that have not yet been loaded in the content display window 461. Indicator object 466 indicates the association between the highlighted cell 531a and the page-batch loaded in the content display window 461. Exemplary page-batches in cells 531a to 531h may be of equal or unequal length. For instance, page-batch "i-6" in cell 531a has eight pages, page-batch "120-122" in cell 531b has three pages, page-batch "64-66" in cell 531c also has three pages, page-batch "7-10" in cell 531d has four pages, and page-batch "98-102" in cell 531e has five pages.

The content display window 461 is configured to be updated in response to the user clicking the forward button 462. In this manner, subsequent page-batches in cells 531b to 531h in the page-array 531 can be loaded into the content display window 461 upon successively activating forward button 462, or the back button 464 as appropriate or desired. Once a page-batch or content segment has been loaded into the content display window, the user can review the pages constituting the page-batch by utilizing the scroll bar 468. If a particular page-batch is not of interest to the user, the user may also skip the page-batch and click the forward button 462 to advance to the next page-batch appearing in page-array 531.

As will be apparent from FIG. 29, while each page-batch populated in cells 531a-531h includes a few pages in sequential order, the adjacent page-batches are not arranged in a sequential or consecutive order and are configured for providing a shuffled preview of book 450 without making the original content available in a sequential order. The shuffled or out-of-order page-batches still allow a user to review the underlying content of book 450 for purchase evaluation purposes even though the book is not accessible in its original form. The shuffled configuration of the page-batches facilitates providing a comprehensive preview of the book while at the same time thwarting unauthorized distribution of the content or its meaningful consumption, thereby preserving the sale value of the book so that authors and publishers can be duly compensated for their creations.

Figure 30:
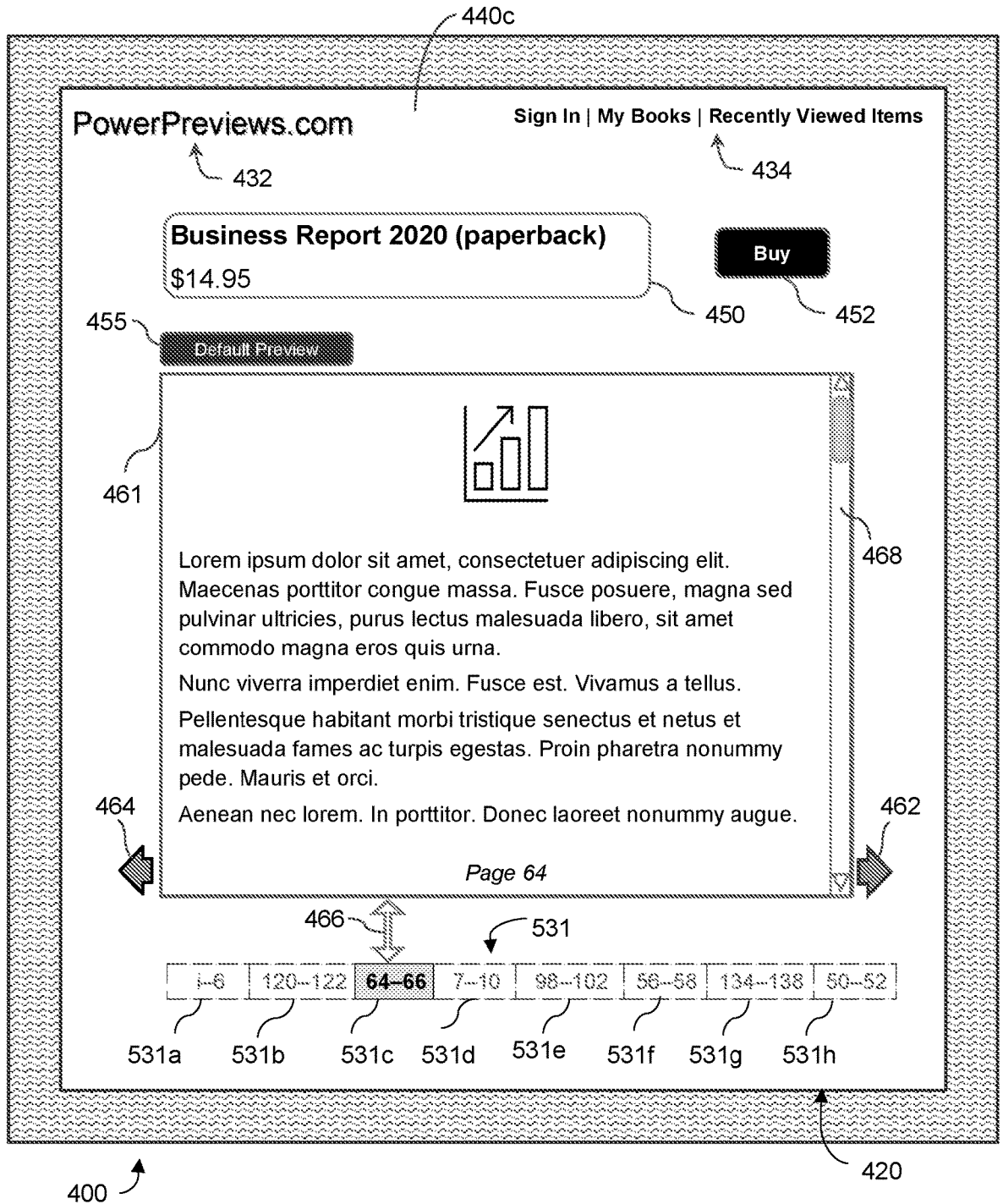
FIG. 30 illustrates another webpage showing the preview version of the selected book 450, with another page batch loaded in the content display window.

Referring now to FIG. 30, there is shown an updated webpage 440c generated after a couple of clicks of the forward button 462 (or the user clicking on cell 531c). As shown, cell 531c occupied by page-batch "64-66" is highlighted and page 64 is displayed in the content display window 461. It will be apparent from the above discussion that a shuffled preview version of a book can be made accessible to a user or reader in a series of chunks or batches wherein only a page-batch comprising a few pages is loaded in the preview window at a time and the following page-batch is not necessarily in a sequential order with the preceding page-batch.

The preview configurations of book 450 shown in FIGS. 29-30, feature a default preview 455 of the book 450, wherein the content segments are rearranged and presented in a shuffled format to the user. According to a further aspect of the invention a shuffled preview version can be customized or personalized in accordance with user or reader preferences for including more relevant content from the book. Therefore, the shuffled preview version of the book 450 may include a customization feature to enable the user or reader to search through the book content and customize the preview version of the book that includes relevant content segments corresponding to a user supplied search term for searching within the book. Once all relevant content segments are identified, the compilation of relevant content segments may be presented in a shuffled configuration to the user or consumer. According to another embodiment of the invention, a plurality of relevant content segments can be rearranged or shuffled according to their relative relevance ranking corresponding to the search term.

According to another exemplary embodiment, the shuffled preview version may include highly relevant content segments adjacent to content segments with lower relevancy. For example, the relevant content segment may be 3-pages long including the main page having the search term, the page preceding the main page, and the page following the main page. The length of the relevant content segment may be based on the frequency of the search term occurrence; for example, if multiple instances of the search term appear over three consecutive pages the relevant content segment may be 5-pages long by including the preceding and following pages to the 3-page section having the search-term.

Figure 31:
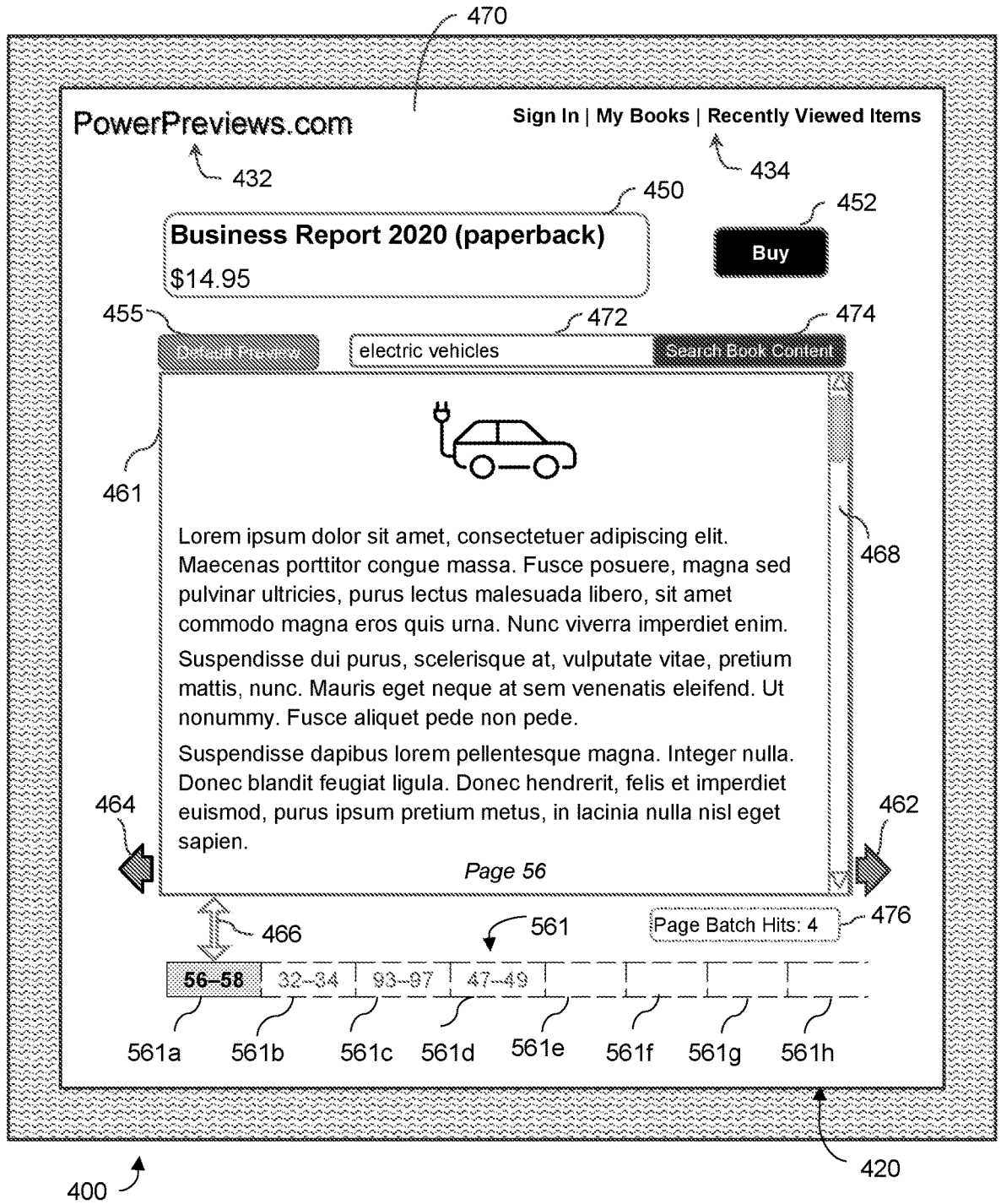
FIG. 31 illustrates an exemplary webpage showing a customized preview version of the selected book 450, wherein the page batches corresponding to a book content search input are presented in a shuffled configuration.

FIG. 31 shows webpage 470 featuring a customized preview version of book 450, wherein the Default Preview 455 described above in conjunction with FIGS. 29-30 is shown in a grayed-out condition. The customized preview version enables the user to search book content and review relevant content segments albeit in a shuffled configuration. Accordingly, an input box 472 for inputting a search term potentially related to the book content, and a clickable search-book-content button 474 are provided proximately above the content display window 461. As shown, input box 472 is populated with the exemplary term "electric vehicles" to retrieve any content segments or content "hits" that are relevant to the entered search term. Block 476 displays the total number of page-batch hits corresponding to the search term "electric vehicles" entered in input box 472. Page-array 561 is placed proximately below the content display window 461 and features a plurality of cells indicated by alphanumeric designations 561a to 561h, wherein cells 561a-561d are shown populated with page-batches corresponding to the search term hits while the remaining cells 561e-561h are shown blank. Specifically, page batches 56-58, 32-34, 93-97, and 47-49 occupy cells 561a, 561b, 561c and 561d respectively, and are arranged in a shuffled order while page-batch 56-58 is shown loaded in the display window 461. The user or reader can review all the pages of the page-batch 56-58 loaded in display window 461 by using the scroll bar 468. It will be realized that returning the page-batch hits corresponding to the book content search may include a restructuring of the page-batches, or alternatively searching within the pre-structured page-batches and returning the relevant page-batches. Thus, it is not necessary that the relevant search term appear on every single page included in the page-batch, hence a page-batch may be deemed relevant if the search input appears in or has association with any of the paragraphs or pages therein. If after examining the search results or page-batch hits the user wants to return the default preview, the user can click the Default Preview button 455 to update the page-array 561 with the page-batches corresponding to the default preview of the book.

Figure 32:
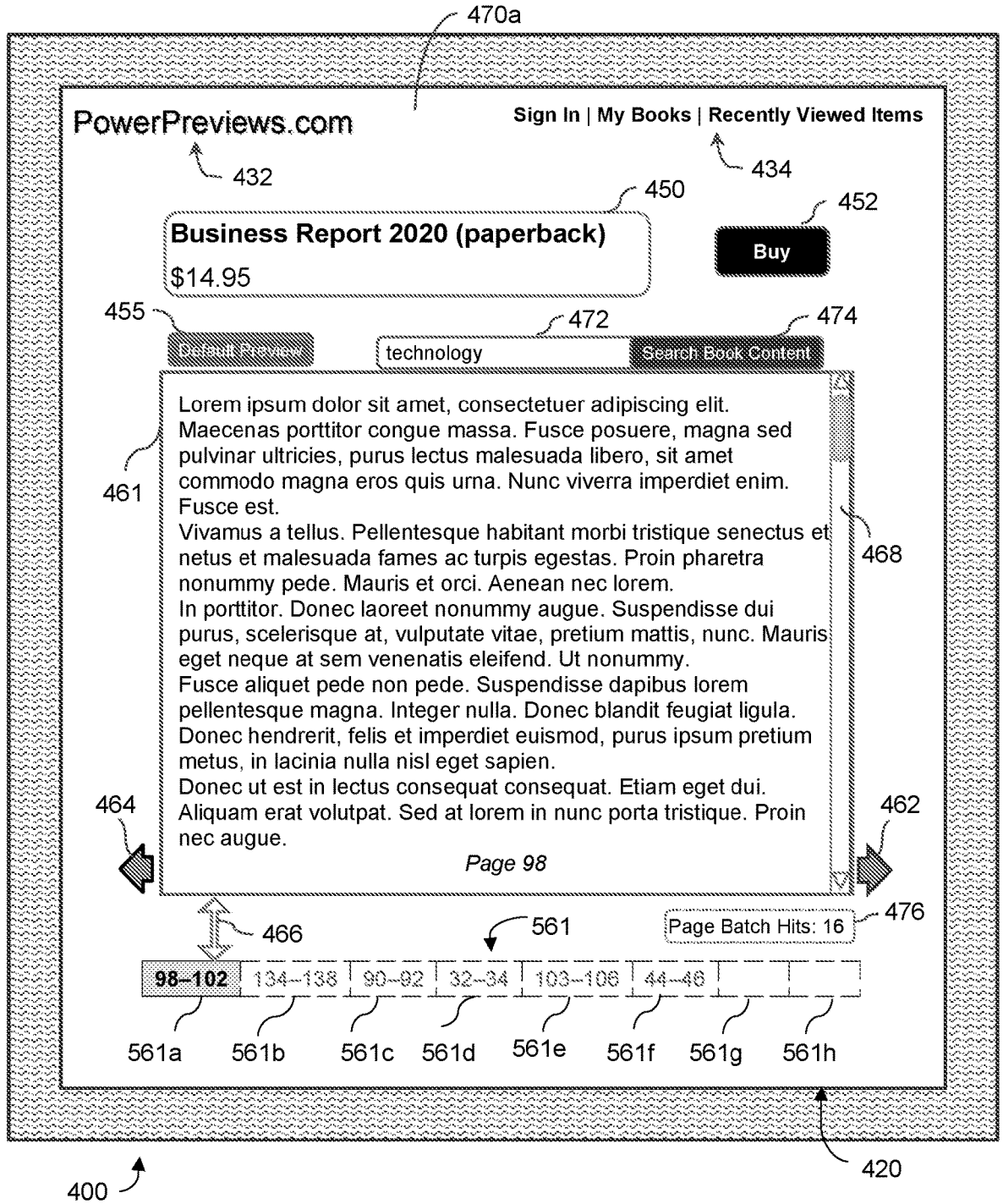
FIG. 32 illustrates an exemplary webpage showing another customized preview version of the selected book 450, wherein a subset of the page batches corresponding to another search input are presented in a shuffled configuration.

According to another embodiment of the invention, a content provider may limit the number of page-batches that are available in the shuffled preview version of a book. FIG. 32 shows webpage 470a showing another customized preview version of book 450. Herein the input box 472 is populated with the exemplary term "technology," and the total number of page-batch hits (16) are shown in block 476. However, only six of the sixteen page-batch hits are shown in the updated page-array 561, which shows page-batches 98-102, 134-138, 90-92, 32-34, 103-106, and 44-46 populated in cells 561a-561f. Page batch 98-102 is shown in the highlighted cell 561a and is loaded in the content display window 461 with the leading page 98 shown therein. The user or reader can review all the pages of the page-batch 98-102 loaded in the content display window 461 by using the scroll bar 468. The user or reader can also navigate to other page-batch hits included in page-array 561 to continue browsing and previewing book 450 to make an informed purchase decision. At any time during the inspection of the page-batches included in the page-array 561, the user can purchase the book, or input a new search term to preview additional content from the book, or switch to the default preview by clicking on the Default Preview button 455 or return to the homepage for finding another book title.

It will be realized that the number of page batch hits made available for previewing in a shuffled form may inter alia depend on rules established by the publisher or content owner, the total number of hits generated by the search term, the length of the page batches, and the time interval established for a preview session.

Figure 33:
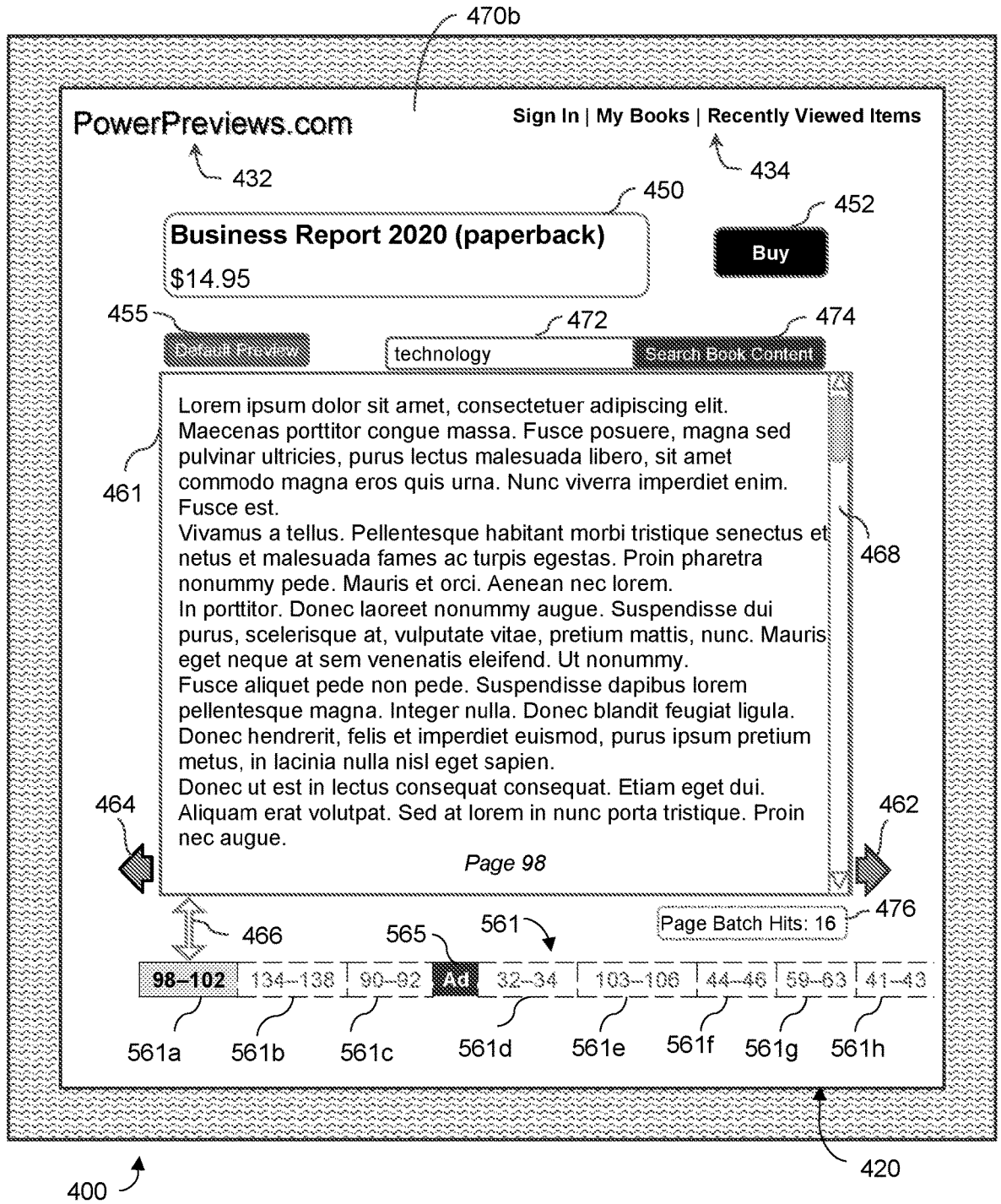
FIG. 33 illustrates an exemplary webpage showing still another customized preview version of the selected book 450, wherein the page batches corresponding to the search input are arranged in a shuffled configuration and the preview version includes an advertisement.

FIG. 33 shows an exemplary webpage 470b embodying the principles of the invention with functionality enabling the user or reader to have a more comprehensive preview of the book 450, wherein the shuffled preview version of the book includes an advertisement or commercial content. Once again, the input box 472 is populated with the exemplary term "technology," and the total number of page-batch hits (16) are shown in block 476. The page-batches corresponding to the search hits are populated in the various cells 561a-561h of the page-array 561 in a shuffled configuration along with an advertisement or ad block 565 positioned in-between cells 561c and 561d. Page batch 98-102 is shown in the highlighted cell 561a and is loaded in the content display window 461 with the leading page 98 shown therein. The user or reader can review all the pages of the page-batch 98-102 loaded in the display window 461 by using the scroll bar 468. The user may inspect or preview the next page-batch in the page-array 561 by utilizing the forward button 462 to successively load the next page-batch in the display window 461. If after examining page-batch 90-92 domiciled in cell 561c the user clicks on the forward button 462 for previewing the next page-batch, the user will be shown an advertisement (depicted by Ad block 565) prior to being able to preview the page-batch 32-34 domiciled in cell 561d. The positioning of Ad block 565 in between cells 561c and 561d is merely for illustration purposes and may be displayed to the user as pre-announcement for the Ad. The Ad position may also be withheld from the user according to the preference of the content provider. In fact, one or more advertisements, interactive objects, or other commercial messages can be interjected in between any of the page-batches with a predetermined frequency of occurrence or at predetermined intervals during the preview session. Furthermore, the advertisements, interactive objects or other commercial messages can also be integrated with or inserted within the page-batches. Advertisements, commercial messages, or interactive objects may include visual ads, audio-visual ads, survey requests and forms, book review requests, feedback on previously purchased items, etc. It would also be realized that the advertisements or commercial messages inserted during a preview session may originate from the content provider, the publisher, or a third-party source or server.

Figure 34:
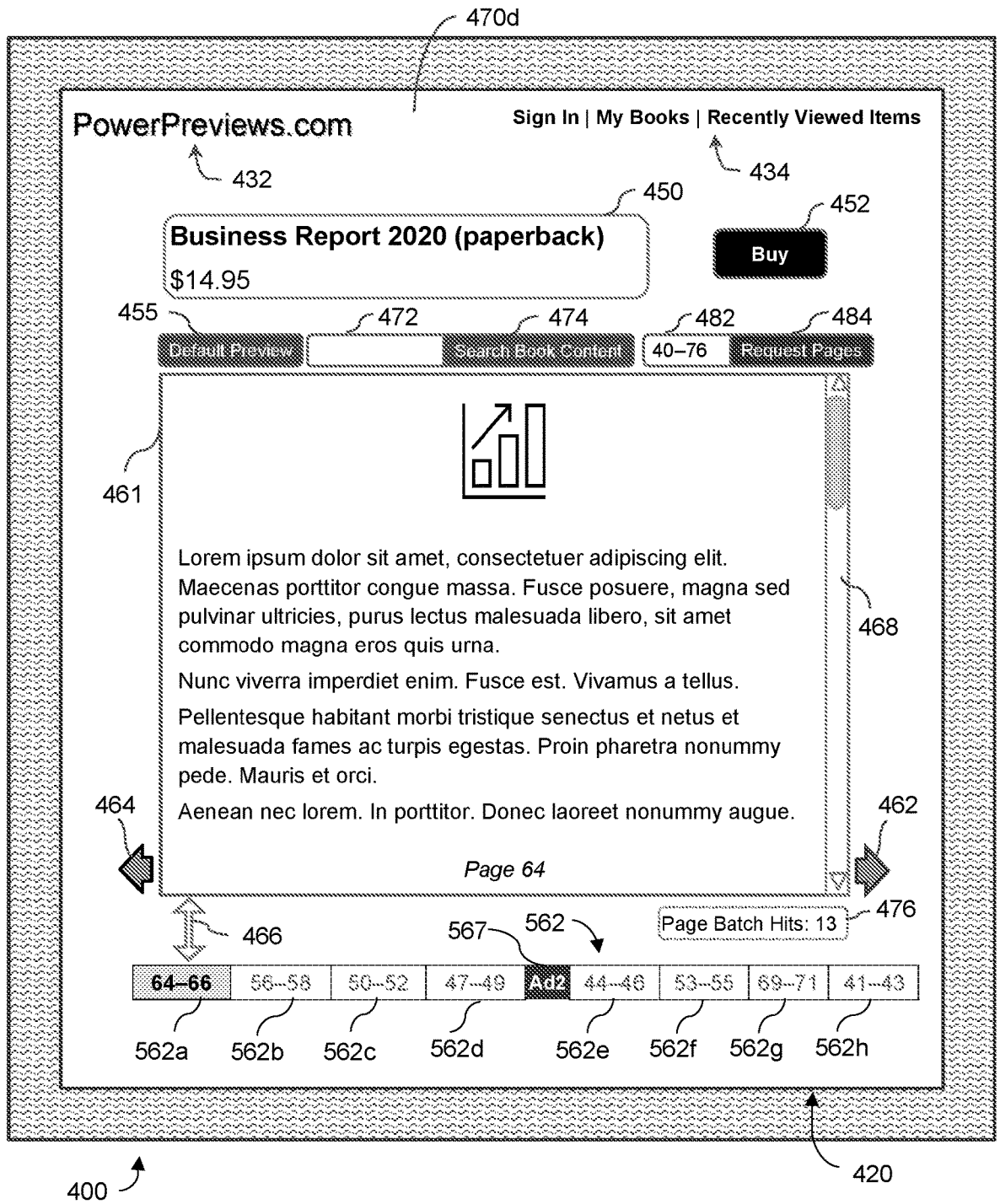
FIG. 34 illustrates an exemplary webpage showing yet another customized preview version of the selected book 450, wherein a user or reader can request a specific range of book pages, with the page batches corresponding to the page-range request being arranged in a shuffled configuration and the preview version includes an advertisement.

FIG. 34 shows an exemplary webpage 470d according to another embodiment of the invention featuring enhanced customization functionality and enabling an even more personalized and comprehensive preview of the book 450 to a user or reader. The user can customize the preview content by inputting a search term or topic in the first input box 472 and clicking on the Search-Book-Content button 474. In addition, the user has the option of requesting a specific section of the book for review by inputting a page range in the second input box 482 and clicking on the Request-Pages button 484 for retrieving a specified section of the book 450 for preview. Search based customization of the preview version with search term input in box 472 was described above in conjunction with FIGS. 31-33. In FIG. 34, the custom preview version of the book is based on the user requesting a specific section of the book. Accordingly, the input box 482 is shown populated with the exemplary page range 40-76 to retrieve the content segments or page-batches that include or cover the requested page range. Block 476 displays the total number of page-batch hits corresponding to the requested page range entered in input box 482. The page-batches corresponding to the requested page range are listed in the page-array 562 that is placed proximately below the content display window 461 and features a plurality of cells indicated by alphanumeric designations 562a to 562h, wherein cells 562a-562h are shown populated with eight of the thirteen page-batch hits corresponding to the requested page range. The page-batches are arranged in a shuffled configuration and the page-batch 64-66 domiciled in highlighted cell 562a is loaded in the content display window 461. For illustration purposes, an advertisement represented by Ad block 567 is positioned between cells 562d and 562e.

As the user continues the preview of the book, the user will be shown an advertisement, depicted by Ad block 567, prior to being able to preview the page-batch 44-46 domiciled in cell 562e. Advertisements, commercial messages, surveys, feedback forms, interactive objects, etc. may be inserted or included during a preview session with some frequency that is either time based, or action based. For example, ads may be shown at the beginning of the preview session, and/or after every fourth click of the forward button 462, and/or after every three minutes during the preview session. Ad block 567 may represent one or more commercial activities including at least one of—watching an advertisement, completing a survey, providing feedback on purchased items, expressing appreciation or rating a book title or its content, and writing a book review. It will be realized that other types of commercial activities could be offered to the user and the exemplary listing is not meant to be exhaustive.

It will be realized that the page batches populating page-array 562 correspond to the page range input entered in box 482 and are presented to the user in a shuffled format. The user or reader may specify a wider or a narrower page range depending on their specific needs and preferences for previewing the book 450. The content provider may also set a page limit for the number of pages that can be specified by a user for a given title. The content provider may also set a limit for pages or content segments that may be previewed in between advertisements, for example the content provider can set a limit of about ten pages of preview followed by an advertisement. The content provider may also establish rules for the scope of preview wherein various content providers may handle preview allowances differently. For instance, content providers may establish a maximum limit for the preview(s) that are available to a user or reader on a cumulative basis with criteria based on—number of pages, number of page batches, percentage of overall page-batches, and/or temporal length of the preview session.

Figure 35:
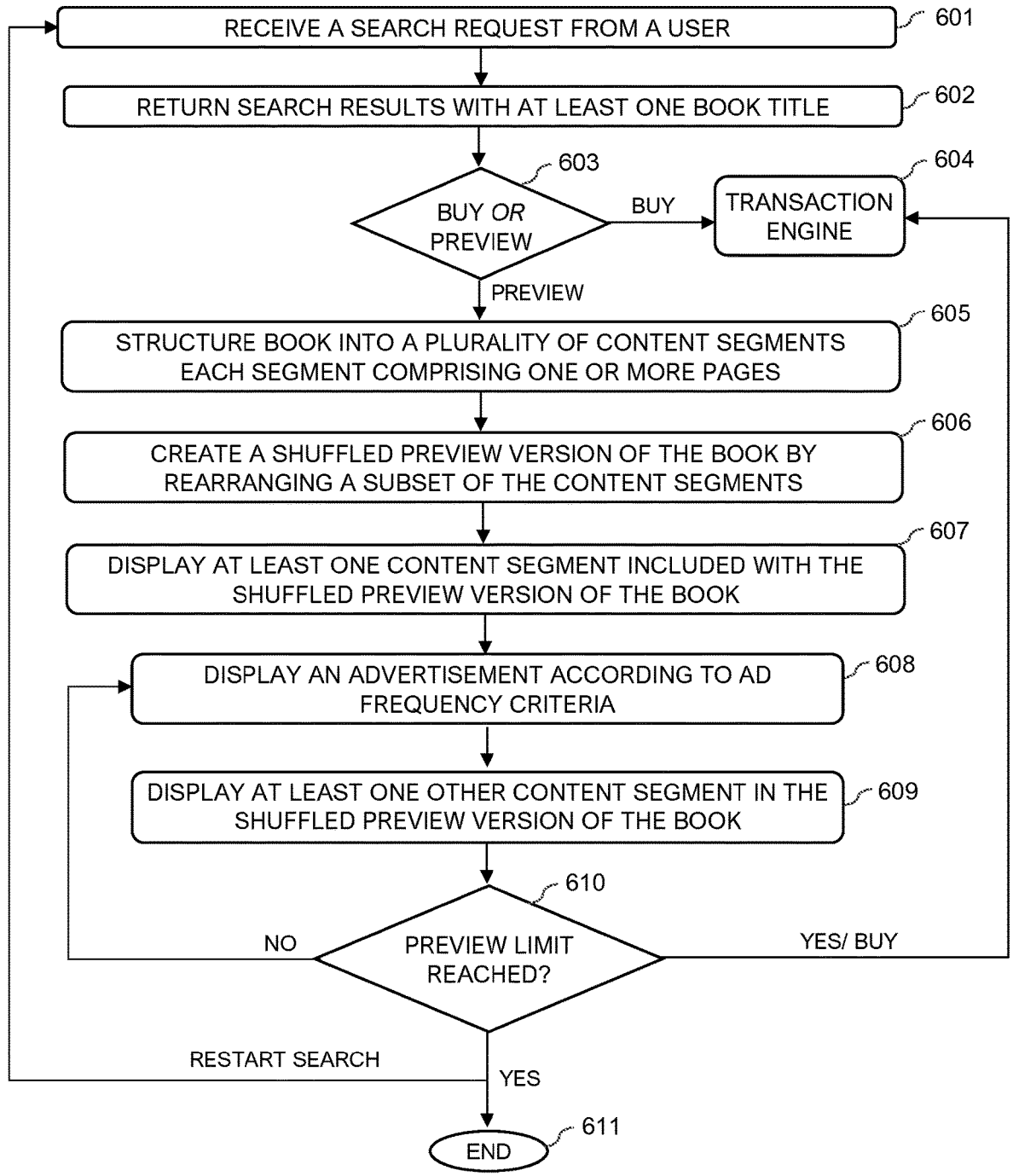
FIG. 35 is a flowchart summarizing the method steps for practicing the invention according to an embodiment thereof in displaying a shuffled preview version of a book with an advertisement over a computer network.

FIG. 35 shows an exemplary method for commercially employing the principles of the invention in the form of a flow chart, describing the steps in displaying a default preview version of a book or an information product, in shuffled configuration, over a computer network to a potential customer or user. The process or method depicted in FIG. 35 is initiated by receiving a search request from a user for receiving book titles (step 601) that can be entered in the search box on a website, or mobile application, via keyboard, touch screen, or through a voice command.

In step 602, the system returns search result(s) or at least one book title in response to the search request entered in step 601. The book title may be shown with meta data relating to the book title including book format, edition, author, publisher, year of publication, preview availability, and purchase price.

The user is then provided the option of either buying the book or previewing the book via selection objects or links (step 603). If the user decides to purchase the book the user is directed to an ecommerce transaction engine to complete the purchase transaction (step 604).

If the user opts to preview the book prior to purchasing it, the system configures the book into a plurality of content segments, with each segment therein comprising at least one page (step 605). In essence, the content segments may be in the form of page batches as detailed above in conjunction with the exemplary segment-tables shown above in several Figures.

Configuring the book into a plurality of content segments facilitates creation of a preview version of the book. In step 606, at least one of the content segments from the plurality of content segments (or a subset or a sub-plurality thereof) is rearranged or shuffled, thereby creating a shuffled preview version of the book.

In step 607, at least one of the content segments in the shuffled preview version of the book is displayed to the user for previewing, browsing, and purchase evaluation purposes. As the user continues browsing, during the preview session, and requests more content, an advertisement is displayed to the user according to ad frequency criteria (step 608). The advertisement may be displayed after elapse of a certain time-period, or after review of certain number of pages, or after a certain number of forward clicks for more content, or a combination thereof, or some other criteria established by the publishers by the content provider or publisher. After the ad has been viewed by the user, additional content segment(s) in the shuffled preview version of the book are released to the user for continued browsing (step 609).

The user can continue browsing the shuffled preview version of the book until the preview limit is reached (step 610) with intermittent showing of advertisements at periodic or irregular intervals based on criteria established by the content provider or publisher. Similarly, the preview limit may be based on limiting—the total time for an active preview session, or the number of content segments previewed by the user, or the membership status of the user, or other criteria established by the content provider or the publisher. After the preview limit is reached, the user can opt to—end the session (step 611), purchase the book via transaction engine (step 604), or restart another search for another book title (step 601).

Figure 36:
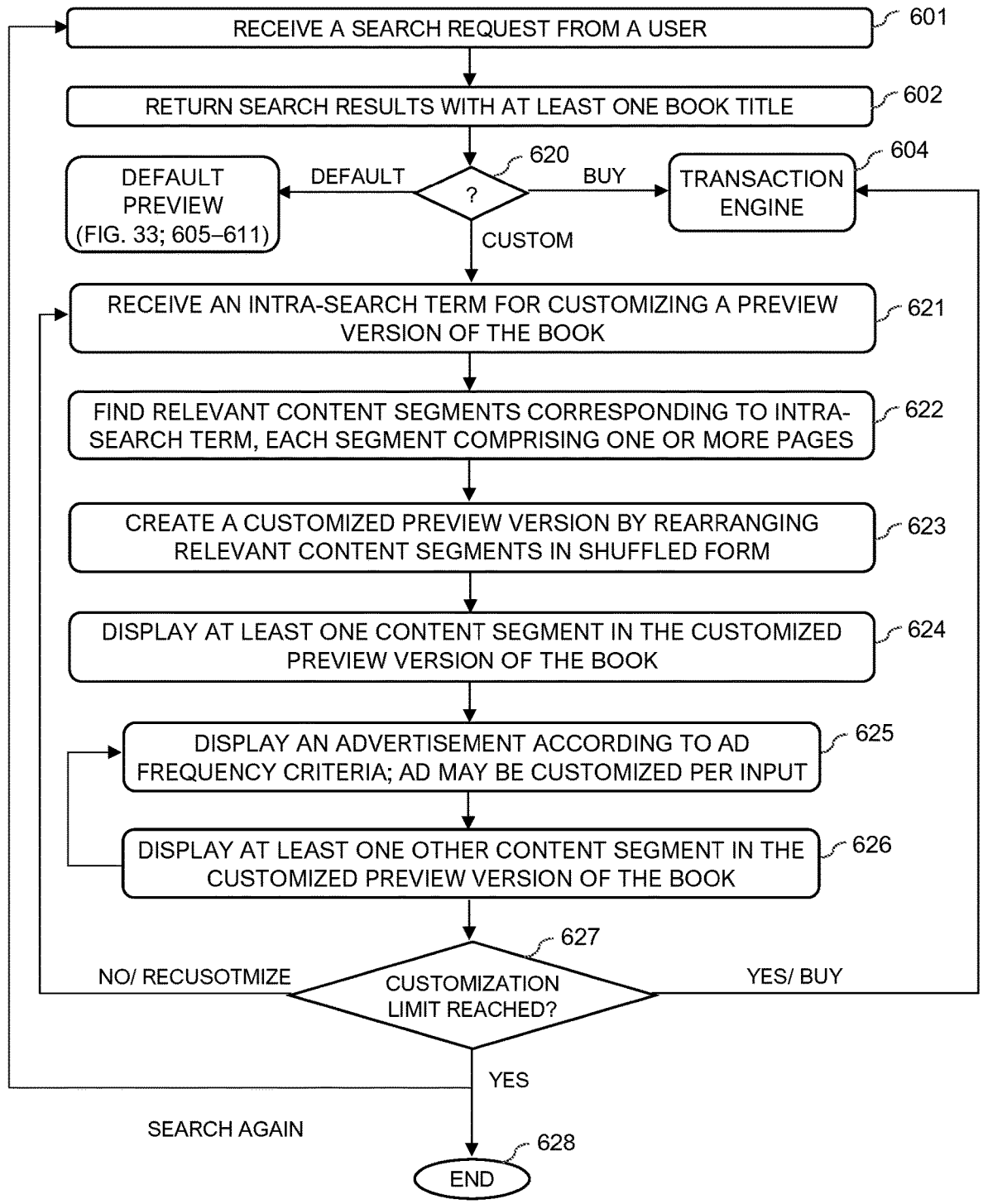
FIG. 36 is a flowchart summarizing the method steps for practicing the invention according to an embodiment thereof in displaying a customized preview version of a book, in a shuffled configuration, with an advertisement over a computer network.

FIG. 36 shows an exemplary method for commercially employing the principles of the invention in the form of a flowchart, describing the steps in displaying a customized preview version of a book or an information product, in a shuffled configuration, over a computer network to a potential customer or user. The method depicted in FIG. 36 is initiated by receiving a search request from a user for receiving book titles (step 601). Steps 601 and 602 have been discussed above with reference to FIG. 35. Once the system returns a book title, the user or potential customer may be presented with a few options at step 620, namely, to purchase the book via transaction engine (step 604), or to browse the default preview version as detailed in FIG. 35, or the user/customer may opt for customizing the preview version.

If the user opts for customizing the preview version, the user may provide an intra-search input for customizing the preview version of the book (step 621). The phrase "intra-search" refers to content search that is conducted within the selected book, as opposed to general search for a book title from a plurality of book titles (step 601). The intra-search input in step 621 for searching within the book may be in the form of a word, phrase, topic, section, or keyword that may be of interest to the user. The intra search-term input may also be in the form of specific page or section request. Once the system receives an intra-search input (step 621), the system finds relevant content segments that correspond to the intra-search input, wherein the content segments comprise one or more pages (step 622). It will be realized that the system may select the most relevant content segments from a pre-structured plurality of content segments, or it may redefine the content segments according to the intra-search input.

Once the relevant content segments have been identified or structured, a customized preview version is then created by rearranging the relevant content segments in a shuffled form (step 623). The system then displays at least one of the content segments in the customized preview version of the book (step 624). As the user continues browsing an advertisement is interjected in the preview session (step 625) that may be based on time, content size, or some other criteria as discussed above in relation to FIG. 35 and in other embodiments. After the advertisement has been displayed to the user, the system displays another content segment in the customized preview version of the book (step 626). The user can continue previewing the customized preview version of the book by viewing additional content segments and advertisements as they are intermittently shown until the customized preview version is made available or is displayed by the content provider. It will be realized that the user or potential customer can terminate the preview session at any time by electing to purchase the book, or starting a fresh search for another book title, or by ending the session.

At step 627, if the overall customization limit is not reached, the user may re-customize the preview version by providing a new intra-search input and restart at step 621, for browsing a re-customized preview version of the book generated in response the new intra-search input. If the customization limit has been reached: the user may opt to purchase the book via transaction engine (step 604); or the user can search again for a new book title (step 601); or the user can simply terminate the session (step 628).

Thus, it will be apparent from the above discussion of the various embodiments and features of the invention that a customized preview of a book or information product in a shuffled configuration can be made available to the user or reader, over a computer network, without compromising the sale value of the book.

It will be appreciated by those skilled in the art that a reader's preview of a physical or paper book at a brick-and-mortar store is indeed personalized as it is the reader who is flipping the pages of the book, however, search functionality is quite limited.

The method of providing a customized preview version according to the present invention, detailed above in conjunction with the Figures, featuring shuffled page-batch preview and search functionality, provides a synergistic effect benefitting both the reader and the content provider. It allows the content provider to make a larger portion of the content available to the reader for preview albeit in a shuffled form. The content search functionality provides the user an opportunity to identify and review relevant sections of the book in a shuffled configuration. The reader can utilize the content search functionality to customize the shuffled preview version of the book according to the reader's interest and preferences—a feature that cannot be availed by the reader when browsing a paper format book in a brick-and-mortar store. Furthermore, the user has the feasibility of conducting multiple searches and reviewing corresponding preview versions generated in response thereto, thus facilitating a reasonably confident YES/NO purchase decision by the user.

Additionally, the customized preview version also provides an opportunity to the content provider to monetize the preview of the book content through advertising, even when the user or reader does not purchase the book. The longer the user or reader reviews or inspects the preview version (or explores additional search terms), the more opportunity there is for the content provider to display or serve up advertisements. The customized shuffled preview version of the book may also facilitate faster decision making for purchase by providing a quick scan of the book content and opportunity for skim reading. This is rooted in the understanding that the reading for consumption is not the same as evaluating content for making a purchase decision for later consumption. While the shuffled preview version of a book may be deemed providing a preview in a fragmented manner; however, the fragmented mode of content perusal facilitates quick review, and also provides protection and defense against unauthorized distribution of copyrighted content. In addition, the content provider may include page-request functionality to allow a potential customer even more targeted exposure to the specific sections of the book.

As discussed previously, granting access to the entire book online for preview (i.e., for free) practically precludes the need for purchasing the book and is not commercially sustainable, as it eliminates all reward mechanisms and due compensation to the content creators, content owners, authors, and publishers. The enormous distribution capabilities of the internet allow mass distribution of content easily but also facilitate unauthorized distribution of content thereby diminishing the need for purchasing content even when it is made available for previewing purposes. The shuffled preview version of the book synergistically allows content providers and publishers to offer and market book content in a protected manner so that it will not eliminate the need to purchase the book, while also enabling a reader or user to preview the book in a sufficiently comprehensive manner to make a sound purchase decision.

While the drawings and the specification detail certain exemplary embodiments of the invention, it should be recognized that these are provided in a generic and descriptive sense for the purposes of illustration and not for purposes of limitation. The description of features and examples is not meant to be exhaustive, and features illustrated or described as part of one embodiment may be combined with another embodiment, unless prohibited by context, to yield a still further embodiment. Accordingly, many other variants embodying the principles of the invention shall become apparent to those of ordinary skill in the art and are deemed within the purview and scope of the invention as defined by the appended claims and corresponding equivalents.

What is claimed is:

1. A computer implemented method for providing a preview version of a book by a content provider, over a computer network, said method comprising the steps of:
   receiving a request from a user, over said computer network, for examining said preview version of the book on a user device;
   structuring said book into a plurality of content segments, each content segment in the plurality of content segments comprising at least one page, wherein a sequential arrangement of the plurality of content segments defining an original configuration of the book, said plurality of content segments being stored on a preview server;
   modifying said original configuration of the book by rearranging at least a subset of the plurality of content segments stored on said preview server to create a shuffled configuration of the book, said shuffled configuration of the book comprising a shuffled arrangement of said plurality of content segments;
   initiating a preview session and displaying at least one content segment from said shuffled configuration of the book in a preview window on said user device in response to said request;
   displaying another content segment from said shuffled configuration of the book on said user device, subject to at least one preview criterion, during said preview session upon receiving a prompt from the user to continue browsing;
   controlling availability of said shuffled configuration of the book on said user device, over said computer network, during said preview session.

2. The method of claim 1, wherein said subset of the plurality of content segments is randomly rearranged to create said shuffled configuration of the book.

3. The method of claim 1, where said shuffled configuration of the book being generated by randomly selecting said subset of the plurality of content segments from said plurality of content segments.

4. The method of claim 1, wherein said shuffled configuration of the book being created by at least one of—relocating, substituting, swapping, and randomizing any of the pages comprising said original configuration of the book.

5. The method of claim 1, wherein said shuffled configuration of the book being created by a cumulative rearranging comprising any combination of—relocating, swapping, substituting, and randomizing of content segments, subsegments, and pages comprising said plurality of content segments.

6. The method of claim 1, wherein at least one content segment in said shuffled configuration of the book is retained in an original position in accordance with said original configuration of the book.

7. The method of claim 1, wherein at least one content segment in said shuffled configuration of the book comprising a plurality of pages arranged in a sequential order.

8. The method of claim 1, wherein at least one content segment in said shuffled configuration of the book comprising a plurality of pages arranged in a shuffled order.

9. The method of claim 1, wherein each page in said preview version of the book is represented by a corresponding image.

10. The method of claim 1, wherein a major portion of said shuffled configuration of the book is made available to the user during said preview session.

11. The method of claim 1, wherein said preview session includes at least one of—an advertisement, an infomercial, a commercial offer, a campaign message, and a sales promotion.

12. The method of claim 1, wherein a group of content segments in said plurality of content segments being stipulated as unavailable-for-preview by a content owner.

13. The method of claim 1, wherein at least one content segment in said shuffled configuration of the book being tagged for display with an advertisement.

14. The method of claim 1, wherein the preview session for inspecting said preview version of the book being subject to a time limitation.

15. The method of claim 1, wherein the preview session for inspecting said preview version of the book being subject to a preview limitation with respect to a maximum content percentage of the book that can be made available to the user during the preview session.

16. The method of claim 1, further comprising the step of:
   providing a permissions protocol for defining said preview version of the book, said permissions protocol comprising a set of attributes including at least one of—previewing permissions for each content segment in said shuffled configuration of the book; arrangement of constituent pages in each content segment in said shuffled configuration of the book; tagging an advertisement with a first group of content segments in said shuffled configuration of the book; and requiring completion of a qualifying activity for showing a second group of content segments in said shuffled configuration of the book.

17. The method of claim 1, further comprising the step of:
extending said preview session after a preview limitation is reached upon completion of a qualifying activity, said qualifying activity comprising at least one of— watching an advertisement, participating in a survey, writing a book review, recommending a book, responding to a sales promotion, accepting a marketing offer, making a purchase, buying a subscription, redeeming a coupon, redeeming an award, redeeming loyalty points, and redeeming a credit.

18. The method of claim 1, wherein each content segment in said sequential arrangement of the plurality of content segments being assigned a numerical value corresponding to its position in said original configuration of the book, said sequential arrangement of the plurality of content segments being represented by a consecutive numerical series; and wherein, at least a subset of said consecutive numerical series being subjected to a computer-generated randomization to derive a shuffled numerical series, said shuffled numerical series representing said shuffled arrangement of said plurality of content segments.

19. The method of claim 1, wherein said shuffled configuration of the book representing one of a plurality of permutations for modifying said original configuration of the book.

20. The method of claim 1, wherein said original configuration of the book being configured for rearrangement in a plurality of shuffled permutations, said plurality of shuffled permutations defining a plurality of shuffled configurations of the book.

21. The method of claim 1, wherein said plurality of content segments comprising a first subplurality of content segments and a second subplurality of content segments, and wherein said shuffled configuration of the book being created by swapping relative positions of said first subplurality of content segments with said second subplurality of content segments.

22. The method of claim 1, wherein said shuffled configuration of the book is customized in accordance with an input received from said user.

23. The method of claim 1, further comprising the steps of:
receiving a search term input from said user for searching through said shuffled configuration of the book;
identifying a set of relevant content segments corresponding to said search term input and creating a customized shuffled configuration of the book;
displaying at least one relevant content segment from said customized shuffled configuration of the book in response to said search term input.

24. The method of claim 23, wherein said customized shuffled configuration of the book includes an advertisement.

25. The method of claim 1, further comprising the steps of:
identifying a set of anticipatory search terms of potential interest to the user with reference to said book;
creating a set of customized shuffled configurations of the book corresponding to said set of anticipatory search terms;
displaying at least one customized shuffled configuration of the book in response to a selection by the user of a corresponding search term from said set of anticipatory search terms.

26. The method of claim 1, further comprising the steps of:
receiving a content-range input from said user for inspecting a specific section from the book, the content-range input comprising a beginning page and an ending page;
identifying a set of relevant content segments corresponding to the content-range input from said shuffled configuration of the book;
displaying at least one relevant content segment from said set of relevant content segments to the user in response to said content-range input.

27. The method of claim 1, wherein said preview version of the book is made available to the user in accordance with a preview map, said preview map integrating—a permitted portion of said shuffled configuration of the book, a predefined arrangement of constituent pages for each content segment included in said preview session, and a schedule for displaying advertisements during said preview session.

28. The method of claim 1, wherein said preview criterion being one of—displaying an advertisement prior to displaying the next content segment, displaying advertisements according to a predetermined schedule during said preview session, enforcing preview session limits by terminating the preview session; and enforcing preview session limits by requiring a qualifying action from the user.

29. The method of claim 1, wherein said plurality of content segments comprising a subplurality of odd-numbered content segments and a subplurality of even-numbered content segments.

30. The method of claim 1, wherein each content segment in said plurality of content segments is stored in a corresponding data container in a plurality of data containers, and wherein the shuffled configuration of the book being represented by a shuffled index defining a shuffled arrangement of the plurality of data containers.

31. A computer implemented method for providing a preview version of a book by a content provider, over a computer network, said method comprising the steps of:
deconstructing said book into a plurality of content segments, each content segment in said plurality of content segments comprising at least one page, wherein a sequential arrangement of the plurality of content segments representing an original configuration of the book;
storing each content segment in the plurality of content segments in a data container, said plurality of content segments being stored in a plurality of data containers on a preview server, wherein a sequential arrangement of the plurality of data containers being represented by a sequential data index, said sequential data index referentially indicating said sequential arrangement of the plurality of content segments representing the original configuration of the book;
providing a shuffled data index representing a shuffled arrangement of the plurality of data containers, said shuffled arrangement of the plurality of data containers referentially denoting a shuffled arrangement of the plurality of content segments, wherein said shuffled arrangement of the plurality of content segments representing a shuffled configuration of the book;
receiving a request from a user, over said computer network, for examining the preview version of the book on a user device;
initiating a preview session and displaying at least one content segment, stored in a corresponding data container on said preview server from said shuffled configuration of the book, in a preview window on said user device for browsing by said user;

controlling the availability of a next set of content segments from said shuffled configuration of the book, on said user device, during said preview session.

32. The method of claim 31, wherein said plurality of data containers is stored in a cloud repository.

33. The method of claim 31, wherein said shuffled data index denoting a randomized arrangement of at least a subset of the plurality of content segments.

34. The method of claim 31, wherein a subgroup of content segments in the plurality of content segments being tagged to display at least one of—an advertisement, an infomercial, a commercial offer, a campaign message, and a sales promotion.

35. The method of claim 31, wherein each data container in said plurality of data containers is assigned a numerical identifier corresponding to its position according to said sequential data index, the sequential arrangement of the plurality of data containers according to said sequential data index being represented by a consecutive series of numerical identifiers; and wherein, at least a subset of said consecutive series of numerical identifiers being subjected to a computer-generated randomization to derive a shuffled series of numerical identifiers corresponding to said shuffled data index.

36. The method of claim 31, wherein said sequential data index being configured for rearrangement into a plurality of shuffled data indices, said plurality of shuffled data indices representing a plurality of shuffled configurations of the book.

37. The method of claim 31, wherein said shuffled configuration of the book is customized in accordance with a search term input received from said user.

38. The method of claim 31, wherein said shuffled configuration of the book is customized in accordance with a content-section request received from said user.

39. The method of claim 31, wherein said shuffled data index is configured as a searchable index.

40. The method of claim 31, further comprising the step of:

extending said preview session after a preview limitation is reached upon completion of a qualifying activity, said qualifying activity comprising at least one of— participating in a survey, writing a book review, watching an advertisement, recommending a book, responding to a sales promotion, accepting a marketing offer, making a purchase, subscribing to a service, redeeming a coupon, redeeming an award, redeeming loyalty points, and redeeming a credit.

41. The method of claim 31, further comprising the steps of:

identifying a set of anticipatory search terms of potential interest to the user with reference to said book;

creating a set of customized shuffled configurations of the book corresponding to said set of anticipatory search terms;

displaying at least one customized shuffled configuration of the book in response to a selection of a corresponding search term from said set of anticipatory search terms by said user.

42. A computer implemented method for providing a preview version of a book by a content provider, over a computer network, said method comprising the steps of:

receiving a request from a user, over said computer network, for examining said preview version of the book on a user device;

structuring said book into a plurality of content segments, each content segment in the plurality of content segments comprising at least one page, said plurality of content segments being stored on a preview server, wherein a sequential arrangement of the plurality of content segments defining an original configuration of the book, and a non-sequential arrangement of the plurality of content segments defining a shuffled configuration of the book;

initiating a preview session and displaying a first-selected content segment from said plurality of content segments stored on said preview server in a preview window on said user device in response to said request;

displaying a second-selected content segment from said plurality of content segments on said user device, subject to at least one preview criterion, during said preview session upon receiving a prompt from the user to continue browsing;

controlling the availability of a next set of successively-selected content segments from said non-sequential arrangement of the plurality of content segments during said preview session.

43. The method of claim 42, wherein said first-selected content segment is randomly selected from said plurality of content segments.

44. The method of claim 42, wherein said second-selected content segment is randomly selected from said plurality of content segments.

45. The method of claim 42, wherein said second-selected content segment is not in sequential order to said first-selected content segment according to said original configuration of the book.

46. The method of claim 42, wherein said second-selected content segment is consecutive to said first-selected content segment according to said original configuration of the book.

47. The method of claim 42, wherein said at least one preview criterion comprising displaying an advertisement.

48. The method of claim 42, wherein said at least one preview criterion comprising completion of a qualifying activity; said qualifying activity comprising at least one of—watching an advertisement, participating in a survey, writing a book review, recommending a book, responding to a sales promotion, accepting a marketing offer, making a purchase, buying a subscription, redeeming a coupon, redeeming an award, redeeming loyalty points, and redeeming a credit.

* * * * *